(12) United States Patent
Taguchi et al.

(10) Patent No.: US 12,427,898 B2
(45) Date of Patent: Sep. 30, 2025

(54) VEHICLE SEAT

(71) Applicant: TS TECH CO., LTD., Asaka (JP)

(72) Inventors: Kohei Taguchi, Tochigi (JP); Takako Miyoshi, Tochigi (JP); Takayoshi Ito, Tochigi (JP); Kazuya Miyawaki, Tochigi (JP); Kazuaki Mima, Tochigi (JP); Yuki Yoshioka, Tochigi (JP); Akira Miyoshi, Tochigi (JP); Tomoyuki Kurimoto, Tochigi (JP); Keiichi Kitayama, Tochigi (JP); Yasuhiro Furuichi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 80 days.

(21) Appl. No.: 18/552,821

(22) PCT Filed: Mar. 30, 2022

(86) PCT No.: PCT/JP2022/016041
§ 371 (c)(1),
(2) Date: Sep. 27, 2023

(87) PCT Pub. No.: WO2022/210892
PCT Pub. Date: Oct. 6, 2022

(65) Prior Publication Data
US 2024/0166104 A1    May 23, 2024

Related U.S. Application Data

(60) Provisional application No. 63/212,355, filed on Jun. 18, 2021, provisional application No. 63/193,148,
(Continued)

(30) Foreign Application Priority Data

Apr. 27, 2021  (JP) ................................ 2021-074688
Feb. 3, 2022   (JP) ................................ 2022-015761
(Continued)

(51) Int. Cl.
*B60N 2/30*    (2006.01)
*B60N 2/36*    (2006.01)
*B60N 2/06*    (2006.01)

(52) U.S. Cl.
CPC ............. *B60N 2/36* (2013.01); *B60N 2/3065* (2013.01); *B60N 2/3079* (2013.01); *B60N 2/065* (2013.01); *B60N 2/3011* (2013.01); *B60N 2/309* (2013.01)

(58) Field of Classification Search
CPC .... B60N 2/309; B60N 2/3072; B60N 2/3077; B60N 2/3011; B60N 2/3065; B60N 2/065; B60N 2/3075; B60N 2/3079; B60N 2/36
See application file for complete search history.

(56) References Cited

U.S. PATENT DOCUMENTS 7,014,260 B2 *  3/2006  Moriyama ........... B60N 2/3011
                                              296/65.09
7,594,699 B2 *  9/2009  Satta .................... B60N 2/3075
                                              297/378.1
(Continued)

FOREIGN PATENT DOCUMENTS

JP    S6266600    4/1987
JP    H0292800    7/1990
(Continued)

OTHER PUBLICATIONS

Japanese Office Action (w/English translation) for corresponding Application No. 2021-074688, dated Mar. 25, 2025, 8 pages.
(Continued)

*Primary Examiner* — Syed A Islam
(74) *Attorney, Agent, or Firm* — Dority & Manning, P.A.

(57) ABSTRACT

A vehicle seat includes a support leg connected to a floor to be pivotable about a first axis extending in a horizontal direction; a seat cushion connected to the support leg to be pivotable about a second axis which is parallel to the first axis; a first coupling device provided on the support leg and configured to be detachably coupled with a first coupling part provided on the floor; and a second coupling device provided on the seat cushion and configured to be detachably coupled with a second coupling part provided on the floor. The seat cushion is movable between a stowed position in which the seat cushion is in a lowest position, a first use position in which the first coupling device is coupled with the first coupling part, and a second use position in
(Continued)

which the second coupling device is coupled with the second coupling part.

8 Claims, 57 Drawing Sheets

Related U.S. Application Data filed on May 26, 2021, provisional application No. 63/175,732, filed on Apr. 16, 2021, provisional application No. 63/171,177, filed on Apr. 6, 2021, provisional application No. 63/200,802, filed on Mar. 30, 2021.

(30) Foreign Application Priority Data

Feb. 3, 2022 (JP) .................................. 2022-015768
Feb. 3, 2022 (JP) .................................. 2022-015781

(56) References Cited

U.S. PATENT DOCUMENTS

| | | | | |
|---|---|---|---|---|
| 7,828,358 B2 * | 11/2010 | Mitsuhashi | ............ | B60N 2/309 |
| | | | | 296/65.05 |
| 8,123,272 B2 * | 2/2012 | Ito | ........................ | B60N 2/3011 |
| | | | | 296/65.09 |
| 8,186,753 B2 * | 5/2012 | Fujisawa | .............. | B60N 2/3065 |
| | | | | 297/331 |
| 8,297,678 B2 * | 10/2012 | Nakao | .................. | B60N 2/3065 |
| | | | | 296/65.09 |
| 8,882,203 B2 | 11/2014 | Takehara et al. | | |
| 9,381,837 B2 * | 7/2016 | Tone | ........................ | B60N 2/36 |
| 9,789,793 B2 * | 10/2017 | Abe | .................... | B60N 2/3009 |
| 10,625,608 B2 | 4/2020 | Akaike et al. | | |
| 11,370,347 B2 | 6/2022 | Nishikawa et al. | | |
| 12,172,558 B2 * | 12/2024 | Miyoshi | ............... | B60N 2/3031 |

FOREIGN PATENT DOCUMENTS

| | | |
|---|---|---|
| JP | H04113234 | 10/1992 |
| JP | 2000108744 | 4/2000 |
| JP | 2010125935 | 6/2010 |
| JP | 2016060386 | 4/2016 |
| JP | 2019104315 | 6/2019 |
| JP | 2020192829 | 12/2020 |
| WO | WO2010110042 A1 | 9/2010 |

OTHER PUBLICATIONS

PCT International Search Report (with English translation) for corresponding PCT Application No. PCT/JP2022/016041, mailed Jun. 14, 2022, 6 pages.
Written Opinion for corresponding PCT Application No. PCT/JP2022/016041, mailed Jun. 14, 2022, 3 pages.

* cited by examiner

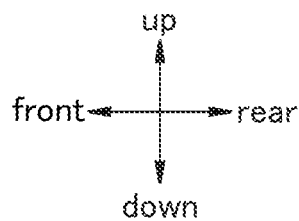
Fig.5
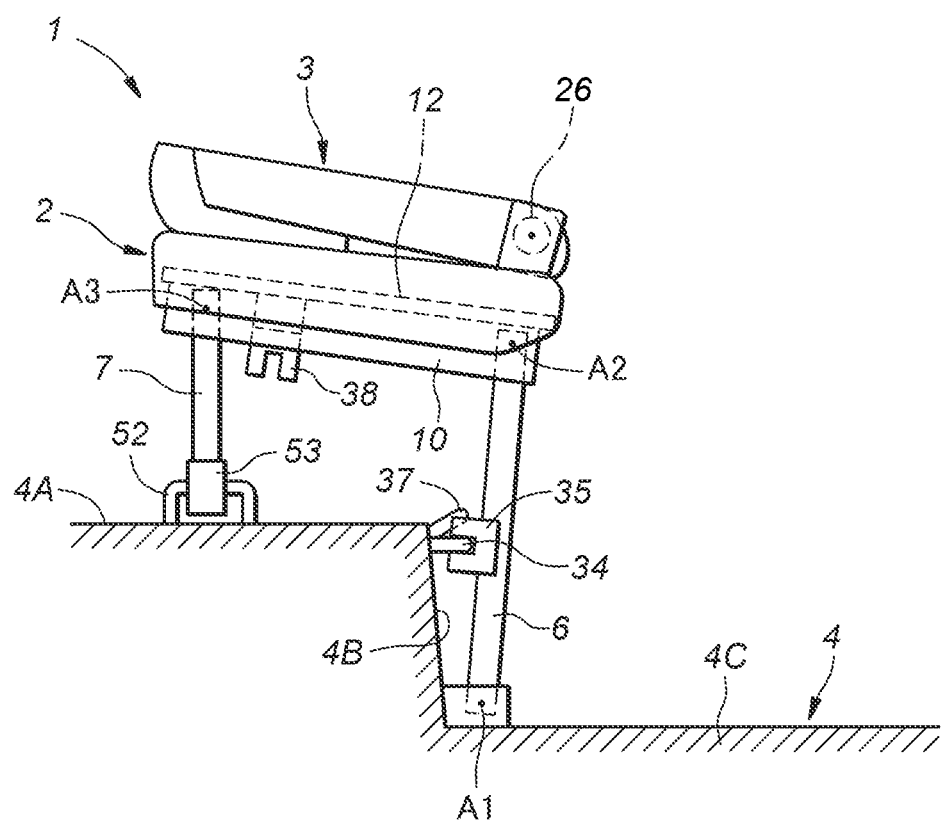

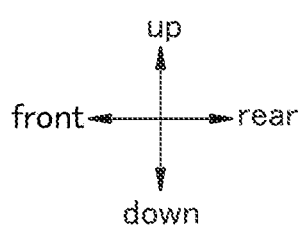
*Fig.6*
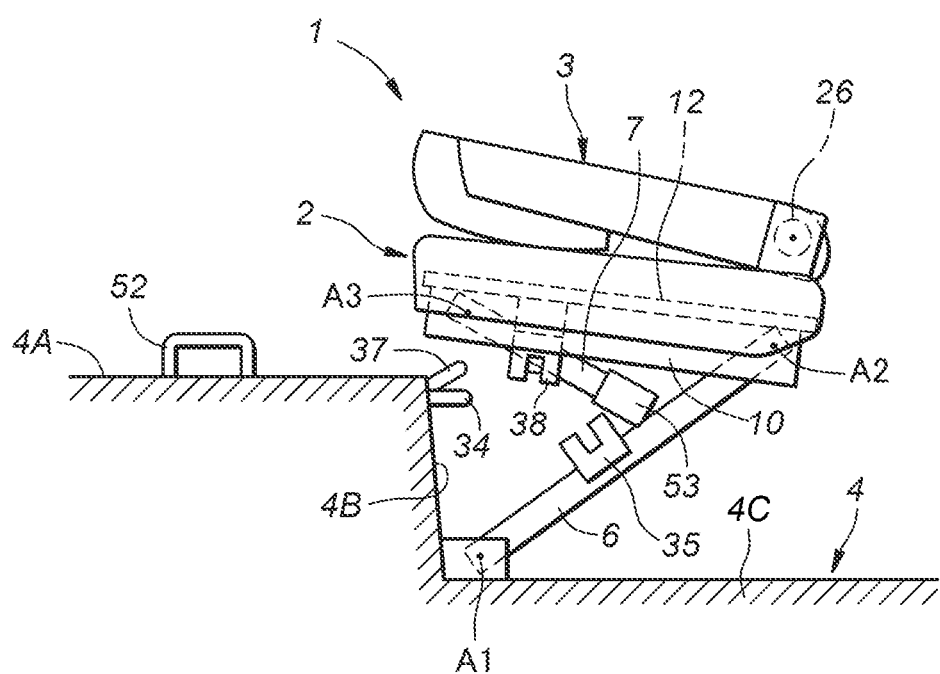

Fig.7
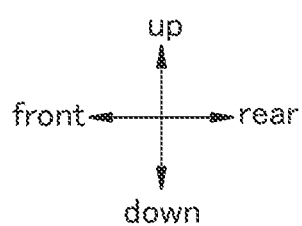
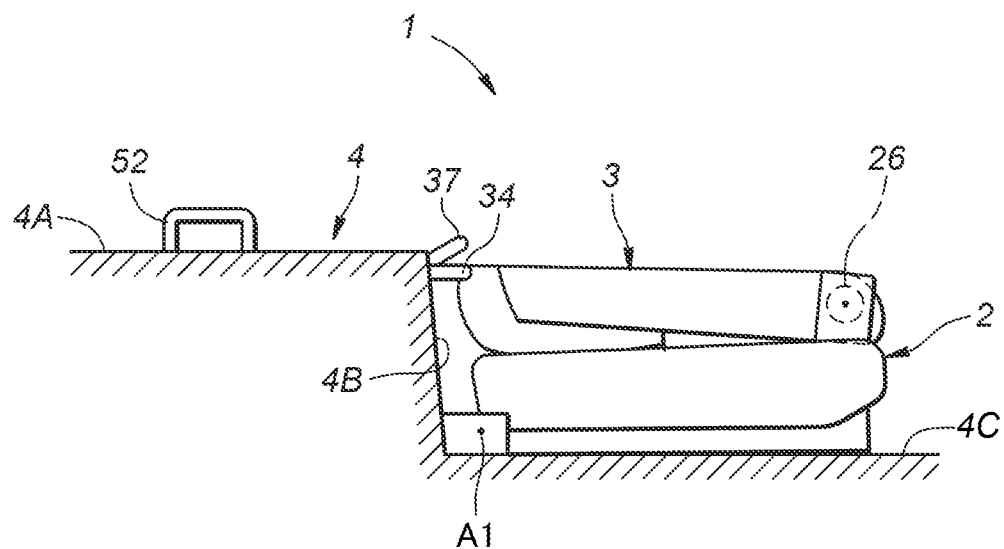

Fig.39
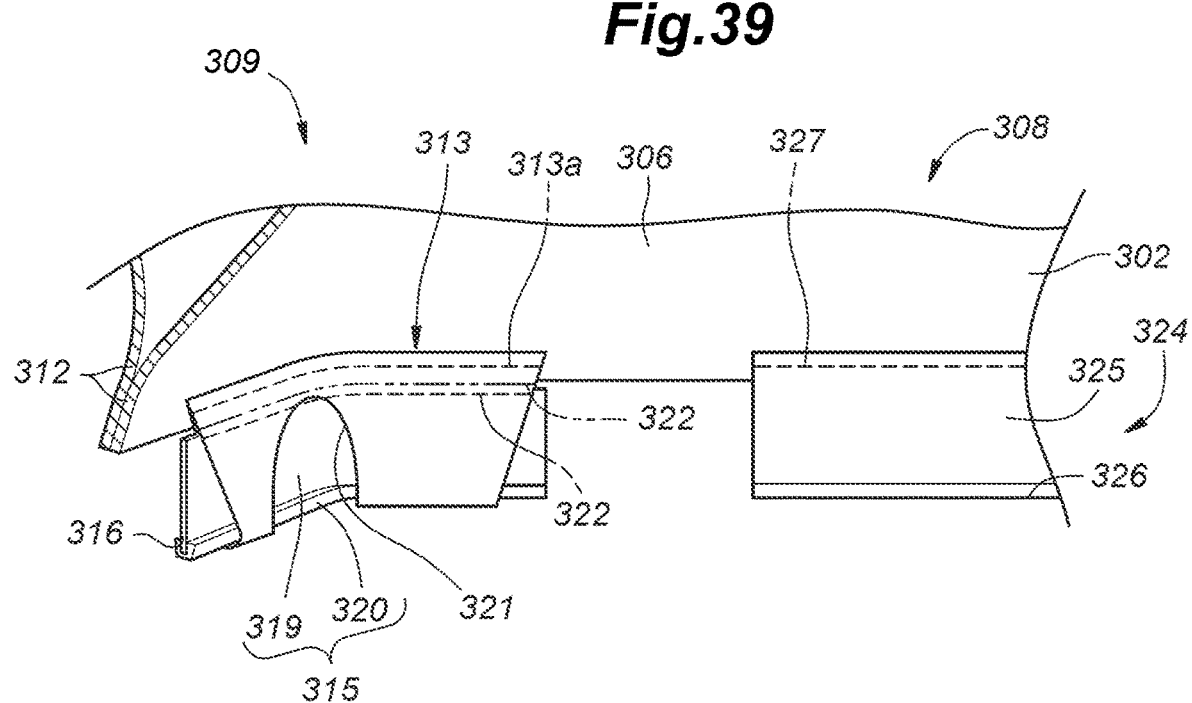
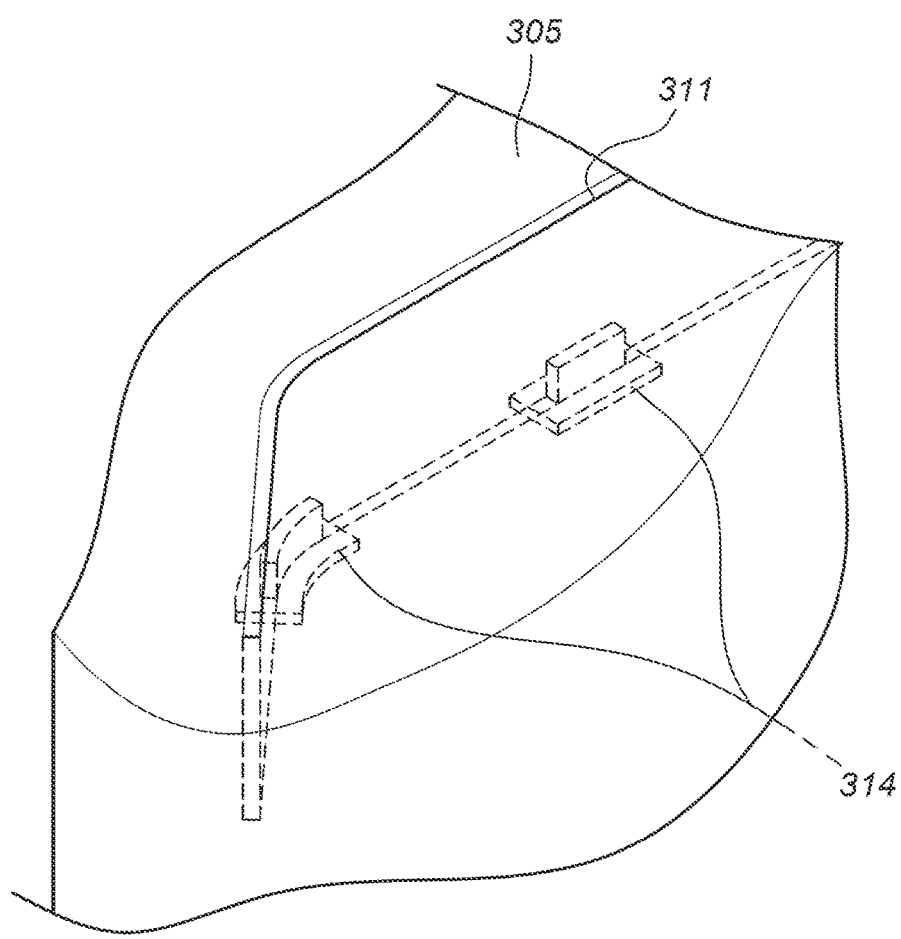

VEHICLE SEAT

CROSS REFERENCE TO RELATED APPLICATIONS

This application is the U.S. National Stage entry of International Application No. PCT/JP2022/016041, filed on Mar. 30, 2022, which, in turn, claims priority to U.S. Provisional Patent Application No. 63/200,802, filed on Mar. 30, 2021; U.S. Provisional Patent Application No. 63/171,177, filed on Apr. 6, 2021; U.S. Provisional Patent Application No. 63/175,732, filed on Apr. 16, 2021; Japanese Patent Application No. 2021-074688, filed on Apr. 27, 2021; U.S. Provisional Patent Application No. 63/193,148, filed on May 26, 2021; U.S. Provisional Patent Application No. 63/212,355, filed on Jun. 18, 2021; Japanese Patent Application No. 2022-015761, filed on Feb. 3, 2022; Japanese Patent Application No. 2022-015768, filed on Feb. 3, 2022; and Japanese Patent Application No. 2022-015781, filed on Feb. 3, 2022, all of which are hereby incorporated herein by reference in their entireties for all purposes.

TECHNICAL FIELD

The present invention relates to a vehicle seat.

BACKGROUND ART

Patent Document 1 discloses a vehicle seat configured to move rearward and downward relative to the floor to be stored in a storage recess formed in the floor. The vehicle seat includes a support leg pivotably connected to the floor, a seat cushion pivotably supported on the support leg, and a coupling device configured to be detachably coupled with a striker provided on the floor. By pivoting of the support leg, the vehicle seat moves between a use position and a stowed position. With the coupling device coupled with the striker, the vehicle seat is maintained in the use position.

PRIOR ART DOCUMENT(S)

Patent Document(s)

Patent Document 1: JP2016-60386A

SUMMARY OF THE INVENTION

Task to be Accomplished by the Invention

With the vehicle seat of Patent Document 1, a user can be seated on the vehicle seat only when the vehicle seat is in the use position. Therefore, if the vehicle seat has multiple forms for seating, the commercial value of the vehicle seat will improve.

In view of the foregoing background, an object of the present invention is to provide a vehicle seat having multiple forms for seating.

Means to Accomplish the Task

To achieve the above object, the present invention provides a vehicle seat (1), comprising: a support leg (6) connected to a vehicle body to be pivotable about a first axis (A1) extending in a horizontal direction; a seat cushion (2) connected to the support leg to be pivotable about a second axis (A2) which is parallel to the first axis; a first coupling device (35) provided on the support leg and configured to be detachably coupled with a first coupling part (34) provided on the vehicle body; and a second coupling device (38) provided on the seat cushion and configured to be detachably coupled with a second coupling part (37) provided on the vehicle body, wherein the seat cushion is movable between a stowed position in which the seat cushion is in a lowest position, a first use position in which the first coupling device is coupled with the first coupling part, and a second use position in which the second coupling device is coupled with the second coupling part.

According to this aspect, a vehicle seat having multiple forms for seating can be provided. Since the seat cushion can be disposed in the first use position and the second use position in addition to the stowed position, the number of seat arrangements that can be selected by the user increases.

In the above aspect, the seat cushion in the second use position may be disposed higher than the seat cushion in the stowed position, and the seat cushion in the first use position may be disposed higher than the seat cushion in the second use position.

According to this aspect, by moving the seat cushion from the first use position to the second use position, the height and the front-rear position of the seat cushion are changed.

In the above aspect, the vehicle body may include a floor (4), the floor may include a floor front portion (4A), a floor middle portion (4B) which extends downward from a rear end of the floor front portion, and a floor rear portion (4C) which extends rearward from a lower end of the floor middle portion and is disposed lower than the floor front portion, a lower end of the support leg may be connected to the floor rear portion to be pivotable about the first axis which extends laterally, the first coupling part may be provided on the floor middle portion, and a large part of the seat cushion may be disposed above the floor rear portion when in the stowed position and be disposed above the floor front portion when in the first use position.

According to this aspect, in the stowed position, the seat cushion can be disposed on the floor rear portion which is recessed downward relative to the floor front portion.

In the above aspect, the second coupling part may be provided on a rear end part of the floor front portion or an upper end part of the floor middle portion.

According to this aspect, the distance between the seat cushion and the second coupling part becomes close, and thus, the stability of the seat cushion improves.

In the above aspect, the seat cushion may include a base member (10) connected to the support leg and an upper member (12) supported on the base member, and the second coupling device may be movable in a front-rear direction relative to the base member.

According to this aspect, in the first use position and the second use position, the seating position can be moved forward and backward.

In the above aspect, the upper member may be supported on the base member via a slide device (11) to be movable in the front-rear direction, and the second coupling device may be provided on the upper member.

According to this aspect, the second coupling part can be moved forward and backward together with the seat cushion.

In the above aspect, the second coupling device may be configured to be coupled with the second coupling part when the second coupling device is in a predetermined coupling position with respect to the base member and the seat cushion is in the second use position, and the second coupling device may be configured not to be coupled with the second coupling part when the second coupling device is not in the coupling position and the seat cushion is in the second use position.

According to this aspect, it is possible to select whether or not to fix the seat cushion to the second use position by moving the seat cushion forward or backward.

In the above aspect, when the seat cushion is in the stowed position, an upper surface of the seat cushion may be positioned lower than an upper surface of the floor front portion, and when the seat cushion is in the second use position, the upper surface of the seat cushion may be positioned higher than the upper surface of the floor front portion.

According to this aspect, in the stowed position, the seat cushion can be disposed lower than the floor front portion.

Another aspect provides a vehicle seat (1), comprising: a support leg (6) connected to a vehicle body to be pivotable about a first axis (A1) extending in a horizontal direction; a seat cushion (2) connected to the support leg to be pivotable about a second axis (A2) which is parallel to the first axis; a first coupling device (35) provided on the support leg and configured to be detachably coupled with a first coupling part (34) provided on the vehicle body; and a second coupling device (38) provided on the seat cushion and configured to be detachably coupled with a second coupling part (37) provided on the vehicle body, wherein the seat cushion is movable between a stowed position in which the seat cushion is in a lowest position, a first use position in which the first coupling device is coupled with the first coupling part, and a second use position in which the second coupling device is coupled with the second coupling part, and the first coupling part and the second coupling part are provided to be adjacent to each other.

According to this aspect, a vehicle seat having multiple forms for seating can be provided. Since the seat cushion can be disposed in the first use position and the second use position in addition to the stowed position, the number of seat arrangements that can be selected by the user increases. Also, since the first coupling part and the second coupling part are provided to be adjacent to each other, the first coupling part and the second coupling part can be disposed on the vehicle body in an aggregated manner.

In the above aspect, each of the first coupling part and the second coupling part may be a striker.

According to this aspect, the first coupling part and the second coupling part can be made simple in structure.

In the above aspect, the vehicle body may include a floor (4), the floor may include a floor front portion (4A), a floor middle portion (4B) which extends downward from a rear end of the floor front portion, and a floor rear portion (4C) which extends rearward from a lower end of the floor middle portion and is disposed lower than the floor front portion, a lower end of the support leg may be connected to the floor rear portion to be pivotable about the first axis which extends laterally, and the first coupling part and the second coupling part may be provided on a rear end part of the floor front portion or an upper end part of the floor middle portion.

According to this aspect, the distance between the seat cushion and each of the first coupling part and the second coupling part becomes close, and thus, the stability of the seat cushion improves.

In the above aspect, the first coupling part and the second coupling part may be disposed side by side in a left-right direction and be joined to each other.

According to this aspect, interference between the first coupling device and the second coupling part can be avoided. Also, interference between the second coupling device and the first coupling part can be avoided.

In the above aspect, the second coupling part may extend rearward and upward from a boundary part of the floor front portion and the floor middle portion.

According to this aspect, the stiffness of the first coupling part and the second coupling part can be enhanced.

In the above aspect, the vehicle seat may further comprise: a first reinforcement plate (41) including a horizontal plate part (41A) joined to the rear end part of the floor front portion and a vertical plate part (41B) connected to the horizontal plate part and joined to the upper end part of the floor middle portion; and a reinforcement member (42) joined to the horizontal plate part and extending rearward, wherein the first coupling part may be joined to the vertical plate part and the reinforcement member to protrude more rearward than the reinforcement member, and the second coupling part may be joined to the floor middle portion and the reinforcement member to extend rearward and upward.

According to this aspect, the stiffness of the first coupling part and the second coupling part can be enhanced.

In the above aspect, the vehicle seat may further comprise a second reinforcement plate (44) which extends in a left-right direction and is joined to the vertical plate part of the first reinforcement plate, the first coupling part, the floor middle portion, and the second coupling part.

According to this aspect, the stiffness of the first coupling part and the second coupling part can be enhanced.

In the above aspect, a third reinforcement plate (45) may be joined to the second coupling part, and the third reinforcement plate may be orthogonal to the second reinforcement plate and be joined to the second reinforcement plate.

According to this aspect, the stiffness of the first coupling part and the second coupling part can be enhanced.

In the above aspect, a large part of the seat cushion may be disposed above the floor rear portion when in the stowed position and be disposed above the floor front portion when in the first use position, the seat cushion in the second use position may be disposed higher than the seat cushion in the stowed position, and the seat cushion in the first use position may be disposed higher than the seat cushion in the second use position.

According to this aspect, it is possible to change the height of the seat cushion by moving the seat cushion from the first use position to the second use position.

In the above aspect, when the seat cushion is in the stowed position, an upper surface of the seat cushion may be positioned lower than an upper surface of the floor front portion, and when the seat cushion is in the second use position, the upper surface of the seat cushion may be positioned higher than the upper surface of the floor front portion.

According to this aspect, in the stowed position, the seat cushion can be disposed lower than the floor front portion.

To achieve the above object, the present invention provides a vehicle seat (1), comprising: a support leg (6) connected to a vehicle body to be pivotable about a first axis (A1) extending in a horizontal direction; a seat cushion (2) connected to the support leg to be pivotable about a second axis (A2) which is parallel to the first axis; a first coupling device (35) provided on the support leg and configured to be detachably coupled with a first coupling part (34) provided on the vehicle body; and a second coupling device (38) provided on the seat cushion and configured to be detachably coupled with a second coupling part (37) provided on the vehicle body, wherein the seat cushion is movable between a stowed position in which the seat cushion is in a lowest position, a first use position in which the first coupling device is coupled with the first coupling part, and a second use position in which the second coupling device is coupled with the second coupling part, and the seat cushion includes a base member (10) connected to the support leg and an upper member (12) supported on the base member via a slide device (11) to be movable in a front-rear direction.

According to this aspect, a vehicle seat having multiple forms for seating can be provided. Since the seat cushion can be disposed in the first use position and the second use position in addition to the stowed position, the number of seat arrangements that can be selected by the user increases. Also, due to the slide device, the seating position can be moved forward and backward in the first use position and the second use position.

In the above aspect, the seat cushion in the second use position may be disposed higher than the seat cushion in the stowed position, and the seat cushion in the first use position may be disposed higher than the seat cushion in the second use position.

According to this aspect, by moving the seat cushion from the first use position to the second use position, the height and the front-rear position of the vehicle seat are changed.

In the above aspect, the vehicle body may include a floor (4), the floor may include a floor front portion (4A), a floor middle portion (4B) which extends downward from a rear end of the floor front portion, and a floor rear portion (4C) which extends rearward from a lower end of the floor middle portion and is disposed lower than the floor front portion, a lower end of the support leg may be connected to the floor rear portion to be pivotable about the first axis which extends laterally, the first coupling part may be provided on the floor middle portion, and when the seat cushion is in the second use position, the base member may be disposed at a same height as the floor front portion.

According to this aspect, in the second use position, the seat cushion can be disposed close to the floor front portion.

In the above aspect, a large part of the seat cushion may be disposed above the floor rear portion when in the stowed position and be disposed above the floor front portion when in the first use position.

According to this aspect, in the stowed position, the seat cushion can be disposed on the floor rear portion which is recessed downward relative to the floor front portion.

In the above aspect, the second coupling part may be provided on a rear end part of the floor front portion or an upper end part of the floor middle portion.

According to this aspect, the distance between the seat cushion and the second coupling part becomes close, and thus, the stability of the seat cushion improves.

In the above aspect, the second coupling device may be movable in a front-rear direction relative to the base member.

According to this aspect, in the first use position and the second use position, the seating position can be moved forward and backward.

In the above aspect, the second coupling device may be provided on the upper member.

According to this aspect, the second coupling part can be moved forward and backward together with the seat cushion.

In the above aspect, the second coupling device may be configured to be coupled with the second coupling part when the second coupling device is in a predetermined coupling position with respect to the base member and the seat cushion is in the second use position, and the second coupling device may be configured not to be coupled with the second coupling part when the second coupling device is not in the coupling position and the seat cushion is in the second use position.

According to this aspect, it is possible to select whether or not to fix the seat cushion to the second use position by moving the seat cushion forward or backward.

In the above aspect, when the seat cushion is in the stowed position, an upper surface of the seat cushion may be positioned lower than an upper surface of the floor front portion, and when the seat cushion is in the second use position, the upper surface of the seat cushion may be positioned higher than the upper surface of the floor front portion.

According to this aspect, in the stowed position, the seat cushion can be disposed lower than the floor front portion.

Effect of the Invention

According to the above aspect, a vehicle seat having multiple forms for seating can be provided.

BRIEF DESCRIPTION OF THE DRAWINGS

FIG. 5 is an explanatory diagram showing the seat in a folded form;

FIG. 6 is an explanatory diagram showing s movement process of the seat;

FIG. 7 is an explanatory diagram showing the seat in a stowed form;

FIG. 39 is an exploded perspective view showing the tuck-in structure according to the embodiment;

MODE(S) FOR CARRYING OUT THE INVENTION

In the following, with reference to the drawings, description will be made of an embodiment in which a vehicle seat according to the present invention is applied to a seat of an automobile. The seat according to the embodiment is suitable as a third row seat of a minivan vehicle.

Figure 1:
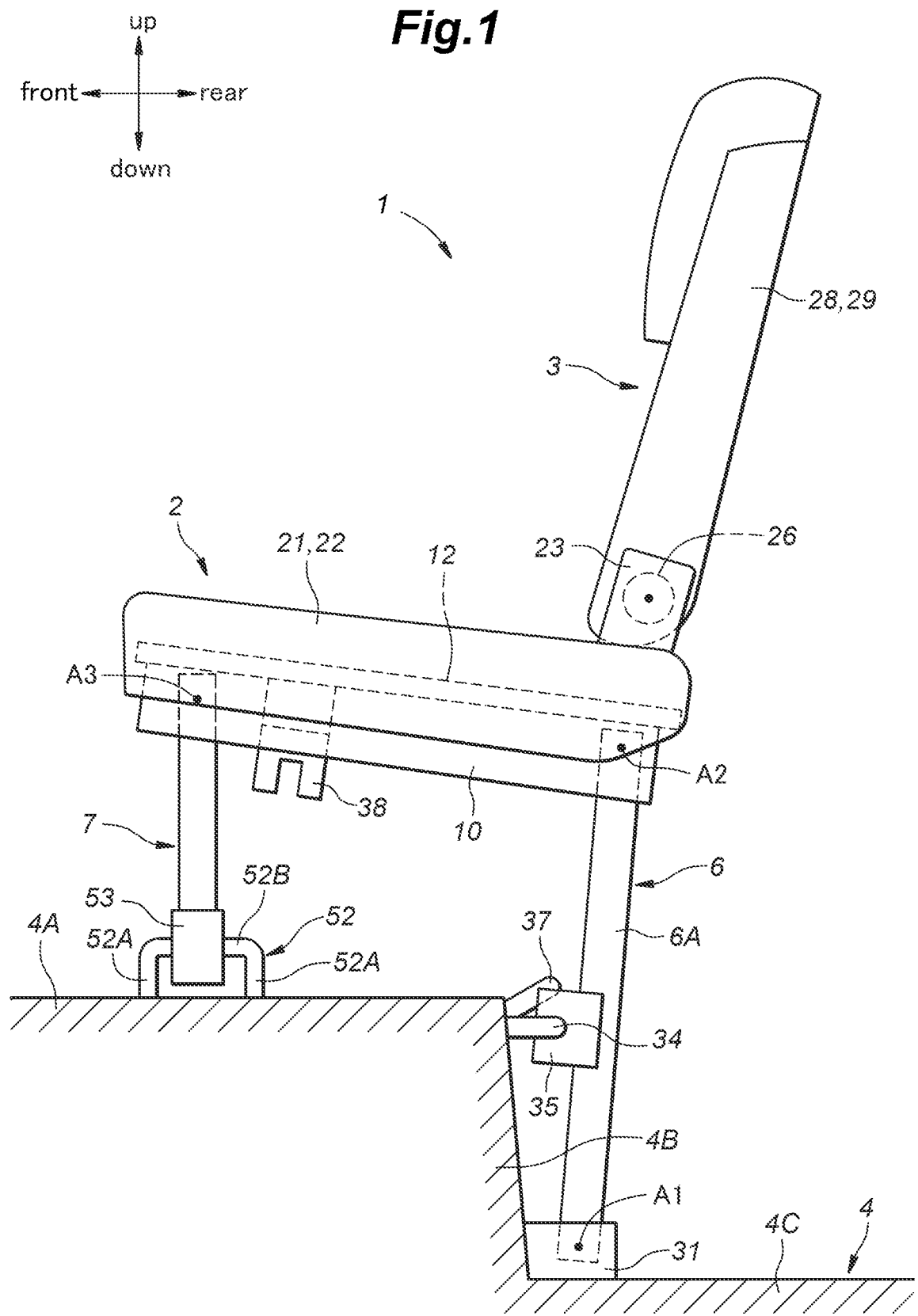
FIG. 1 is an explanatory diagram showing a first use form of a seat according to an embodiment.

As shown in FIG. 1, a seat 1 includes a seat cushion 2, a seatback 3, and a first support leg 6 and a second support leg 7 for connecting the seat cushion 2 to a floor 4 which constitutes a vehicle body of the automobile. The floor 4 includes a floor front portion 4A, a floor middle portion 4B extending downward from the rear end of the floor front portion 4A, and a floor rear portion 4C extending rearward from the lower end of the floor middle portion 4B and disposed lower than the floor front portion 4A. The floor front portion 4A and the floor rear portion 4C are disposed parallel to each other and extend horizontally. The floor middle portion 4B and the floor rear portion 4C may constitute a part of a recess that is recessed downward relative to the floor front portion 4A.

Figure 2:
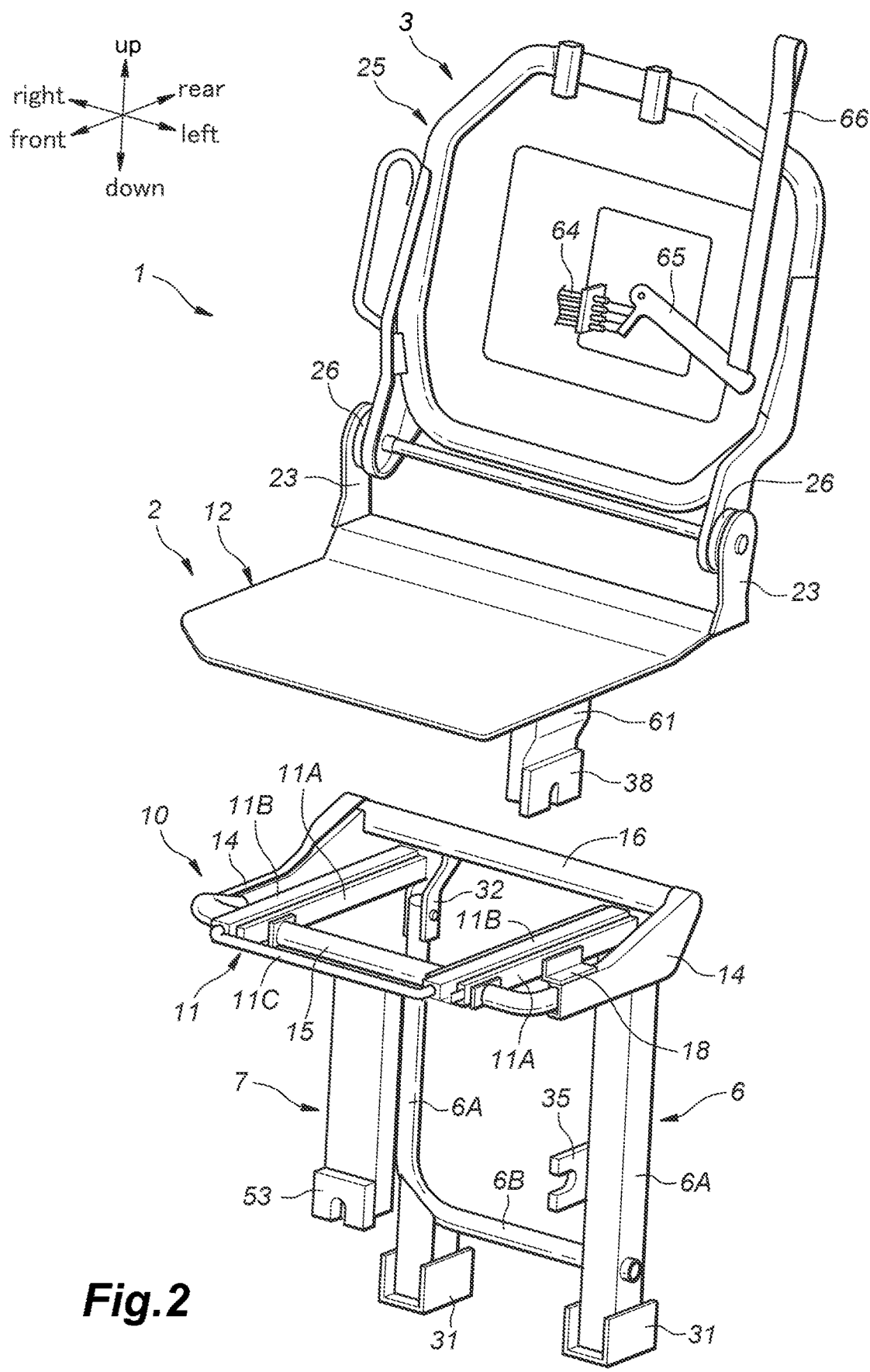
FIG. 2 is an exploded perspective view of a seat frame.

As shown in FIGS. 1 and 2, the seat cushion 2 includes a base member 10 and an upper member 12 supported on the base member 10 via a slide device 11 to be movable in the front-rear direction. The base member 10 includes left and right side members 14 extending in the front-rear direction, a front member 15 extending in the left-right direction and connected to the front ends of the left and right side members 14, and a rear member 16 extending in the left-right direction and connected to the rear ends of the left and right side members 14.

The slide device 11 includes left and right lower rails 11A and left and right upper rails 11B supported by the respective lower rails 11A to be slidingly movable. The left and right lower rails 11A extend in the fore and aft direction and are disposed on the inner side of the left and right side members 14. Each lower rail 11A is disposed to be spaced in the left-right direction from the laterally corresponding side member 14. A front portion of each lower rail 11A is joined to the front member 15. A middle portion and a rear portion of each lower rail 11A are joined to the laterally corresponding side member 14 via a stay 18 which extends laterally. The left and right upper rails 11B slidingly move forward and backward relative to the corresponding lower rails 11A. Between the lower rails 11A and the upper rails 11B, a slide lock device 11C for restricting the movement of the upper rails 11B relative to the lower rails 11A is provided. The slide lock device 11C includes an operation lever which protrudes forward from the left and right lower rails 11A.

The upper member 12 is formed in a plate shape having surfaces facing upward and downward. In another embodiment, the upper member 12 may be formed in a substantially quadrilateral frame shape. The upper member 12 is joined to the left and right upper rails 11B. The left and right upper rails 11B are joined to the lower surface of the upper member 12. A seat cushion pad 21 is placed on the upper surface of the upper member 12. Edge parts of the seat cushion pad 21 and the upper member 12 are covered with a skin material 22. The left and right ends of the rear end part of the upper member 12 are provided with left and right seatback support parts 23. Each seatback support part 23 extends upward from the upper member 12.

A seatback frame 25 forming a skeleton of the seatback 3 is pivotably supported by the left and right seatback support parts 23 via a reclining device 26. The seatback 3 pivots relative to the seat cushion 2 about a rotation axis that extends laterally. In the initial state, the reclining device 26 restricts the pivoting of the seatback 3 relative to the seat cushion 2, and in the operation state, the reclining device 26 allows the pivoting of the seatback 3 relative to the seat cushion 2. A seatback pad 28 is supported on the seatback frame 25. The seatback pad 28 and the seatback frame 25 are covered with a skin material 29.

The first support leg 6 is connected to the floor 4 to be pivotable about a first axis A1 extending in the horizontal direction. Preferably, the first axis A1 extends in the left-right direction. In the present embodiment, the first support leg 6 includes left and right pillar parts 6A and a connecting part 6B which extends laterally and connects the left and right pillar parts 6A. The lower ends of the left and right pillar parts 6A are connected to left and right first hinge brackets 31 provided on a lower part of the floor 4 to be rotatable about the first axis A1. The seat cushion 2 is connected to the first support leg 6 to be pivotable about a second axis A2 which is parallel to the first axis A1. The rear member 16 is provided with left and right second hinge brackets 32. The upper ends of the left and right pillar parts 6A are connected to the laterally corresponding second hinge brackets 32 to be pivotable about the second axis A2.

Figure 3:
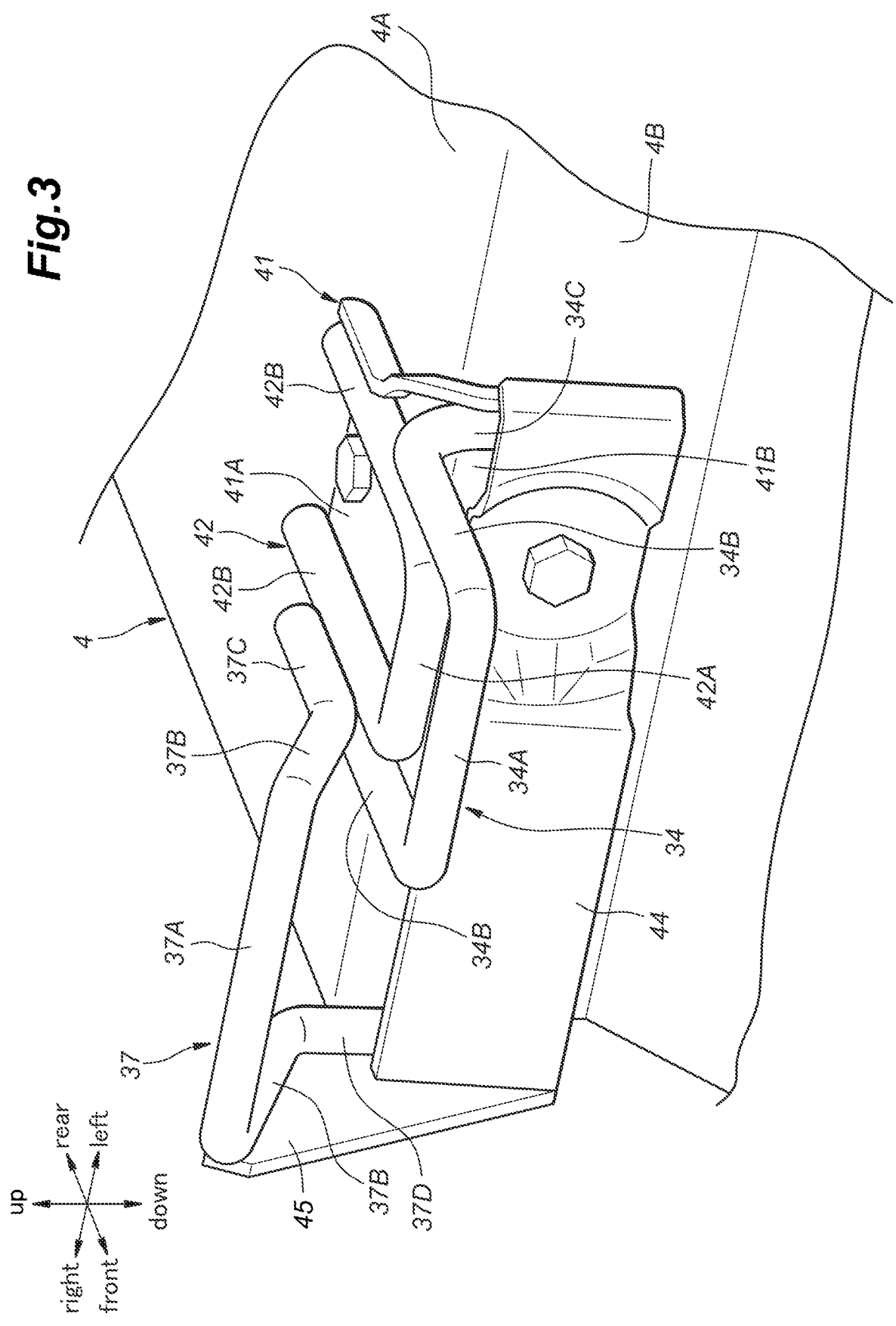
FIG. 3 is a perspective view of a first coupling part and a second coupling part.

As shown in FIGS. 1 and 3, the first support leg 6 is provided with a first coupling device 35 configured to be detachably coupled with a first coupling part 34 provided on the floor 4. The seat cushion 2 is provided with a second coupling device 38 configured to be detachably coupled with a second coupling part 37 provided on the floor 4. Each of the first coupling part 34 and the second coupling part 37 is a striker. This can make the first coupling part 34 and the second coupling part 37 simple in structure. The first coupling part 34 is provided on the floor middle portion 4B. The second coupling part 37 is provided on a rear end part of the floor front portion 4A or an upper end part of the floor middle portion 4B. The first coupling part 34 and the second coupling part 37 may be provided at the boundary part of the floor front portion 4A and the floor middle portion 4B.

In the present embodiment, the first coupling part 34 and the second coupling part 37 are provided to be adjacent to each other. Specifically, the first coupling part 34 and the second coupling part 37 are disposed side by side in the left-right direction and are joined to each other. The first coupling part 34 is disposed closer to the center of the seat 1 in the left-right direction than the second coupling part 37 is.

A first reinforcement plate 41 is joined to the boundary part of the floor front portion 4A and the floor middle portion 4B. Preferably, the first reinforcement plate 41 is joined to the floor front portion 4A and the floor middle portion 4B by fastening member, such as bolts, or by welding. The first reinforcement plate 41 includes a horizontal plate part 41A joined to the rear end part of the floor front portion 4A and a vertical plate part 41B connected to the horizontal plate part 41A and joined to the upper end part of the floor middle portion 4B. Preferably, an edge part of the first reinforcement plate 41 is bent. A reinforcement member 42 which extends rearward is joined to the horizontal plate part 41A. Preferably, the reinforcement member 42 is welded to the horizontal plate part 41A. The reinforcement member 42 is formed by bending a metal rod. The reinforcement member 42 includes a first part 42A which extends laterally and left and right second parts 42B which respectively extend forward from left and right ends of the first part 42A. The left and right second parts 42B of the reinforcement member 42 are joined to the horizontal plate part 41A, and the first part 42A of the reinforcement member 42 is disposed more rearward than the horizontal plate part 41A.

The first coupling part 34 is formed by bending a metal rod. The first coupling part 34 includes a first part 34A which extends laterally, left and right second parts 34B which respectively extend forward from left and right ends of the first part 34A, and left and right third parts 34C which respectively extend downward from the front ends of the left and right second parts 34B. The left and right third parts 34C of the first coupling part 34 are joined to the vertical plate part 41B of the first reinforcement plate 41. Also, the left and right second parts 34B of the first coupling part 34 are joined to the left and right second parts 42B of the reinforcement member 42. Preferably, the first coupling part 34 is welded to the first reinforcement plate 41 and the reinforcement member 42.

The second coupling part 37 is formed by bending a metal rod. The second coupling part 37 includes a first part 37A which extends laterally, left and right second parts 37B which respectively extend obliquely forward and downward from the left and right ends of the first part 37A, a third part 37C which extends forward from the front end of one of the left and right second parts 37B, and a fourth part 37D which extends downward from the front end of the other of the left and right second parts 37B. The third part 37C of the second coupling part 37 is joined to the second part 42B of the reinforcement member 42. Further, the third part 37C of the second coupling part 37 may be joined to the second part 34B of the first coupling part 34. The fourth part 37D of the second coupling part 37 is joined to the floor middle portion 4B. Preferably, the second coupling part 37 is welded to the first coupling part 34 and the reinforcement member 42.

The first coupling part 34 is joined to the vertical plate part 41B and the reinforcement member 42 and protrudes more rearward than the reinforcement member 42. Also, the first coupling part 34 extends rearward from the boundary part of the floor front portion 4A and the floor middle portion 4B. The second coupling part 37 is joined to the floor middle portion 4B and the reinforcement member 42 and extends rearward and upward. Also, the second coupling part 37 extends rearward and upward from the boundary part of the floor front portion 4A and the floor middle portion 4B.

The floor middle portion 4B is further provided with a second reinforcement plate 44. The second reinforcement plate 44 extends in the left-right direction and is joined to the vertical plate part 41B of the first reinforcement plate 41, the third part 34C of the first coupling part 34, the floor middle portion 4B, and the fourth part 37D of the second coupling part 37. Preferably, the second reinforcement plate 44 and the vertical plate part 41B sandwich the third part 34C of the first coupling part 34 from the front and rear. Also preferably, the second reinforcement plate 44 and the floor middle portion 4B sandwich the fourth part 37D of the second coupling part 37 from the front and rear. The second reinforcement plate 44 is preferably fastened to the vertical plate part 41B of the first reinforcement plate 41 and the floor middle portion 4B by fastening members such as bolts.

A third reinforcement plate 45 is joined to the second coupling part 37. The third reinforcement plate 45 is orthogonal to the second reinforcement plate 44 and is joined to the second reinforcement plate 44. Preferably, the third reinforcement plate 45 and the second reinforcement plate 44 are welded to each other. The third reinforcement plate 45 is joined to the second part 37B and the fourth part 37D of the second coupling part 37. Preferably, the third reinforcement plate 45 is welded to the second part 37B and the fourth part 37D of the second coupling part 37.

The second support leg 7 is provided on a front portion of the seat cushion 2. A third hinge bracket (not shown in the drawings) is provided on the front member 15. An upper end part of the second support leg 7 is supported by the third hinge bracket to be pivotable about a third axis A3 which is parallel to the first axis A1. The second support leg 7 is disposed at the center of the seat 1 in the left-right direction. As seen from front, the second support leg 7 is disposed between the left and right pillar parts 6A of the first support leg 6.

The floor front portion 4A is provided with a third coupling part 52, and the lower end of the second support leg 7 is provided with a third coupling device 53 configured to be detachably coupled with the third coupling part 52. The third coupling part 52 is a striker. The third coupling part 52 is formed by bending a metal rod. The third coupling part 52 includes front and rear vertical parts 52A which extend upward from the floor front portion 4A and a horizontal part 52B which extends in the fore and aft direction and is connected to the upper ends of the front and rear vertical parts 52A.

The second support leg 7 is connected to the first support leg 6 via a transmission device. When the first support leg 6 pivots relative to the seat cushion 2, the second support leg 7 pivots relative to the seat cushion 2 due to the transmission device (not shown in the drawings). Specifically, when the first support leg 6 pivots forward relative to the seat cushion 2 about the second axis A2, the transmission device causes the second support leg 7 to pivot rearward relative to the seat cushion 2 about the third axis A3. Preferably, the transmission device is a link connecting the first support leg 6 and the second support leg 7. The rear end of the link is connected to a part of the first support leg 6 lower than the second axis A2 to be pivotable about a laterally extending rotation axis. The front end of the link is connected to a part of the second support leg 7 higher than the third axis A3 to be pivotable about a laterally extending rotation axis.

Figure 4:
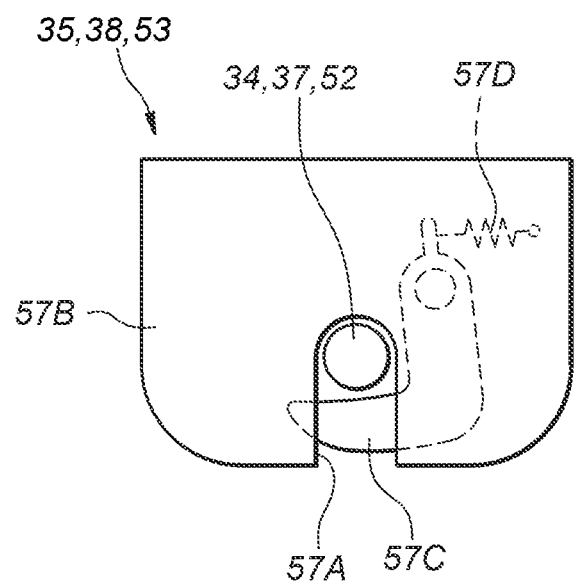
FIG. 4 is an explanatory diagram of a coupling device.

As shown in FIG. 4, the first coupling device 35, the second coupling device 38, and the third coupling device 53 each include a case 57B formed with a slot 57A that can receive the striker and a latch 57C pivotably provided in the case 57B. The latch 57C pivots between a coupling position in which the latch 57C protrudes into the slot 57A and a release position in which the latch 57C is retracted from the slot 57A. The latch 57C is urged toward the coupling position by an urging member 57D. When the latch 57C receives the user's operation, the latch 57C moves from the coupling position to the release position against the urging force. When the latch 57C is in the coupling position, the latch 57C is coupled with the striker and prevents the striker from being separated from the slot 57A. An outer surface of the latch 57C is formed with an inclined surface. When the inclined surface is pushed, the latch 57C moves from the coupling position to the release position. Thereby, when the latch 57C is in the coupling position, the striker can push the latch 57C aside and enter into the slot 57A from outside.

As shown in FIG. 2, the first coupling device 35 is joined to the front portion of one of the pillar parts 6A which extend vertically. The slot 57A of the first coupling device 35 opens forward and penetrates the case 57B of the first coupling device 35 in the left-right direction.

The second coupling device 38 is movable in the front-rear direction relative to the base member 10. In the present embodiment, the second coupling device 38 is provided on the upper member 12 of the seat cushion 2. The lower surface of the upper member 12 is provided with a support wall 61 which extends downward. The support wall 61 extends downward by passing between the side member 14 and the lower rail 11A on the laterally corresponding side. The second coupling device 38 is joined to the support wall 61. The slot 57A of the second coupling device 38 opens downward and penetrates the case 57B of the second coupling device 38 in the left-right direction. The slot 57A of the second coupling device 38 is disposed lower than the lower rail 11A and the side member 14.

The third coupling device 53 is joined to the lower end of the second support leg 7 which extends vertically. The slot 57A of the third coupling device 53 opens downward and penetrates the case 57B of the third coupling device 53 in the front-rear direction.

The reclining device 26, the first coupling device 35, the second coupling device 38, and the third coupling device 53 are each connected to a control lever 65 via control cables 64. The control lever 65 is pivotable between an initial position and an operation position. Preferably, the control lever 65 is provided on the seatback frame 25. The control lever 65 is urged toward the initial position. A strap 66 is connected to the control lever 65. An end portion of the strap 66 extends to the outside from the upper end part of the seatback 3. By pulling the strap 66, the user can make the control lever 65 pivot from the initial position to the operation position.

When the control lever 65 is in the initial position, the reclining device 26, the first coupling device 35, the second coupling device 38, and the third coupling device 53 are each placed in a locked state. While the user is pulling the strap 66, the control lever 65 is positioned in the operation position. At this time, operation parts of the reclining device 26, the first coupling device 35, the second coupling device 38, and the third coupling device 53 are respectively pulled by the control cables 64, and the reclining device 26, the first coupling device 35, the second coupling device 38, and the third coupling device 53 are each put in a release state.

As shown in FIG. 1, in a first use form of the seat 1, the first support leg 6 and the second support leg 7 extend vertically, the first coupling device 35 is coupled to the first coupling part 34, and the third coupling device 53 is coupled to the third coupling part 52. Due to the first coupling device 35 coupled to the first coupling part 34 and the third coupling device 53 coupled to the third coupling part 52, the positions of the first support leg 6, the second support leg 7, and the base member 10 with respect to the floor 4 are fixed. At this time, the seat cushion 2 is in a first use position.

In the first use form of the seat 1, the user can make the upper member 12 move forward and backward relative to the base member 10 by operating the slide lock device 11C. When the upper member 12 moves forward or backward relative to the base member 10, the second coupling device 38 provided on the upper member 12 also moves forward or backward. Thereby, the second coupling device 38 can be positioned in a predetermined coupling position with respect to the base member 10. Preferably, the coupling position is set at the front most end of the movement range of the second coupling device 38 in the front-rear direction. In the first use position, a large part of the seat cushion 2 is disposed above the floor front portion 4A.

Also, in the first use form of the seat 1, the user can make the seatback 3 pivot forward and backward relative to the base member 10 by directly operating the reclining device 26. Note that when the user directly operates the reclining device 26, the first coupling device 35, the second coupling device 38, and the third coupling device 53 are maintained in the locked state.

When, in the first use form of the seat 1, the user places the reclining device 26 in the release state by directly operating the reclining device 26 and makes the seatback 3 pivot forward, the seat 1 is brought into a folded form, as shown in FIG. 5. In FIG. 5, the second coupling device 38 is disposed rearward with respect to the coupling position.

When the user pulls the strap 66 in the folded form of the seat 1, the reclining device 26, the first coupling device 35, the second coupling device 38, and the third coupling device 53 are placed in the release state. Thereby, the first coupling device 35 becomes able to be separated from the first coupling part 34, and the third coupling device 53 becomes able to be separated from the third coupling part 52. As a result, as shown in FIG. 6, the seat cushion 2 and the seatback 3 can be moved rearward and downward. At this time, the first support leg 6 pivots about the first axis A1, and the base member 10 pivots about the second axis A2 relative to the first support leg 6. Thereby, the second support leg 7 is driven by the transmission device, and the lower portion of the second support leg 7 pivots rearward about the third axis A3.

As shown in FIG. 6, when the second coupling device 38 is not in the coupling position, the second coupling device 38 moves rearward and downward by passing a position separated rearward from the second coupling part 37. Therefore, the second coupling device 38 and the second coupling part 37 do not interfere with each other, and the rearward and downward movement of the seat cushion 2 is allowed. As a result of the rearward and downward movement of the seat cushion 2, the seat 1 is brought into a stowed form, as shown in FIG. 7. At this time, the seat cushion 2 is in a stowed position. In the stowed form of the seat 1, the first support leg 6 and the second support leg 7 extend in the front-rear direction. In the stowed form of the seat 1, preferably, the first support leg 6 is placed on the upper surface of the floor rear portion 4C, and the base member 10 is placed on the upper surface of the first support leg 6. In the stowed position, a large part of the seat cushion 2 is preferably disposed above the floor rear portion 4C. In the present embodiment, as seen from above, the entirety of the seat cushion 2 is positioned above the floor rear portion 4C when the seat cushion 2 is in the stowed position. When the seat cushion 2 is in the stowed position, the upper surface of the seat cushion 2 is positioned lower than the upper surface of the floor front portion 4A. When the seat cushion 2 is in the stowed position, the rear surface of the seatback 3 folded with respect to the seat cushion 2 is positioned at the same height as the floor front portion 4A.

Figure 8:
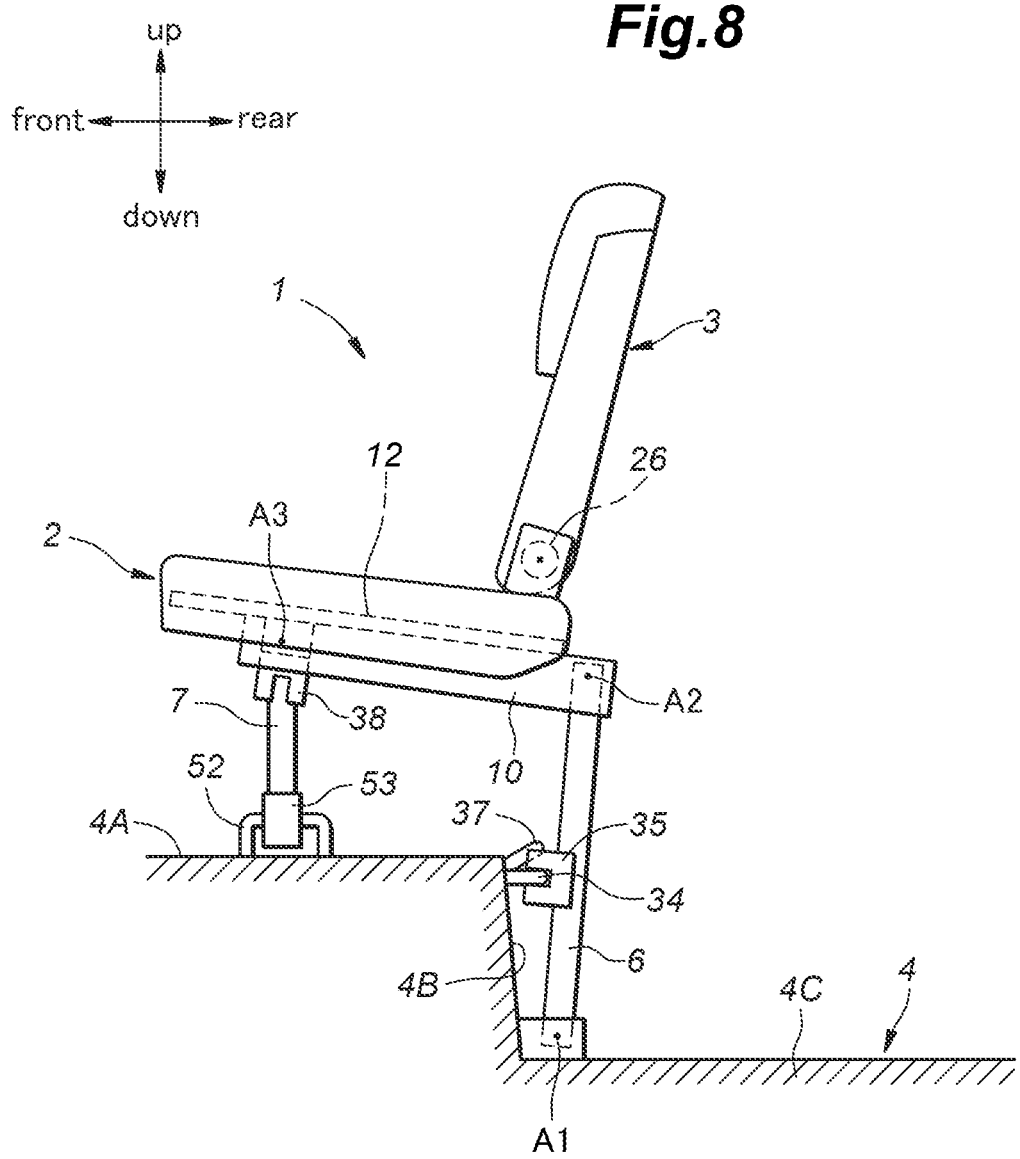
FIG. 8 is an explanatory diagram showing the seat in the first use form in which a second coupling device is in a coupling position.
Figure 9:
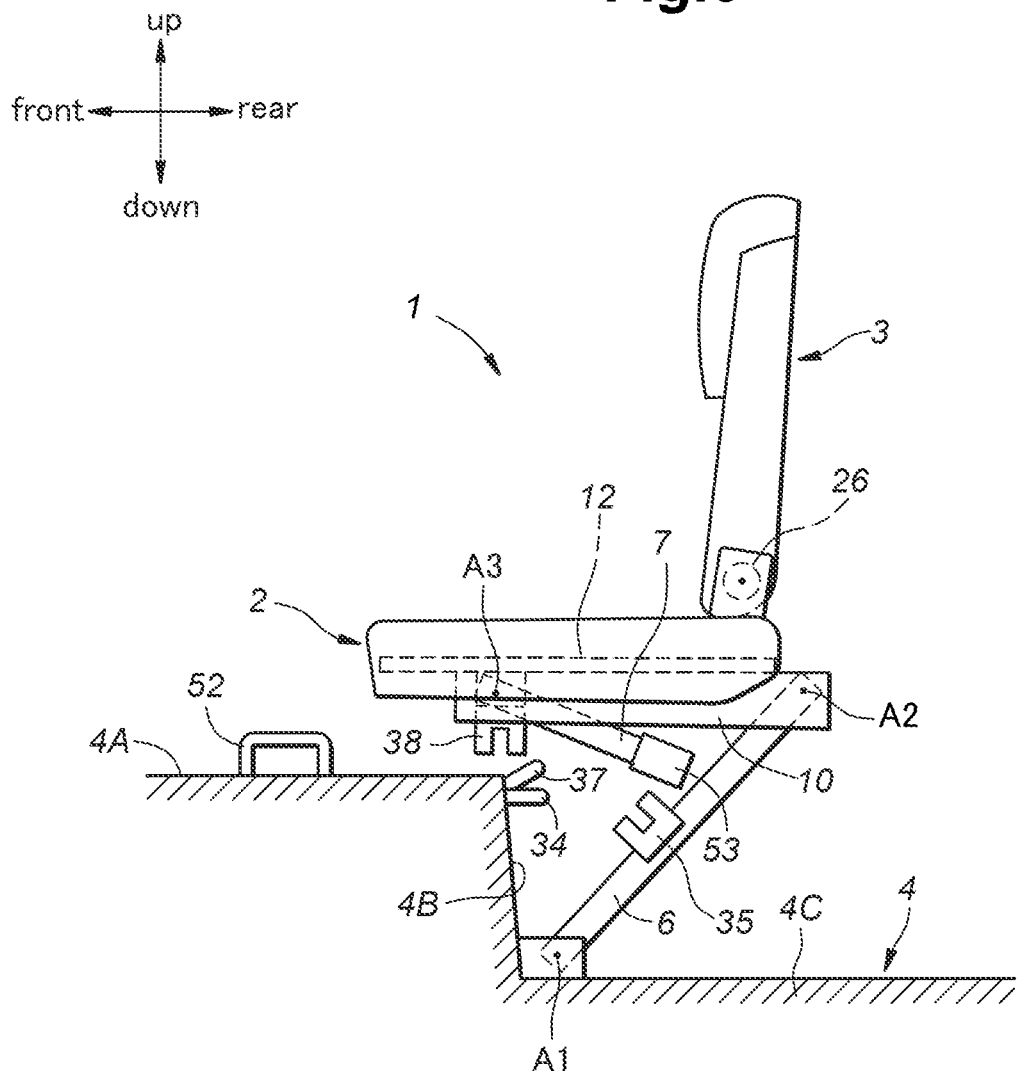
FIG. 9 is an explanatory diagram showing a movement process of the seat.
Figure 10:
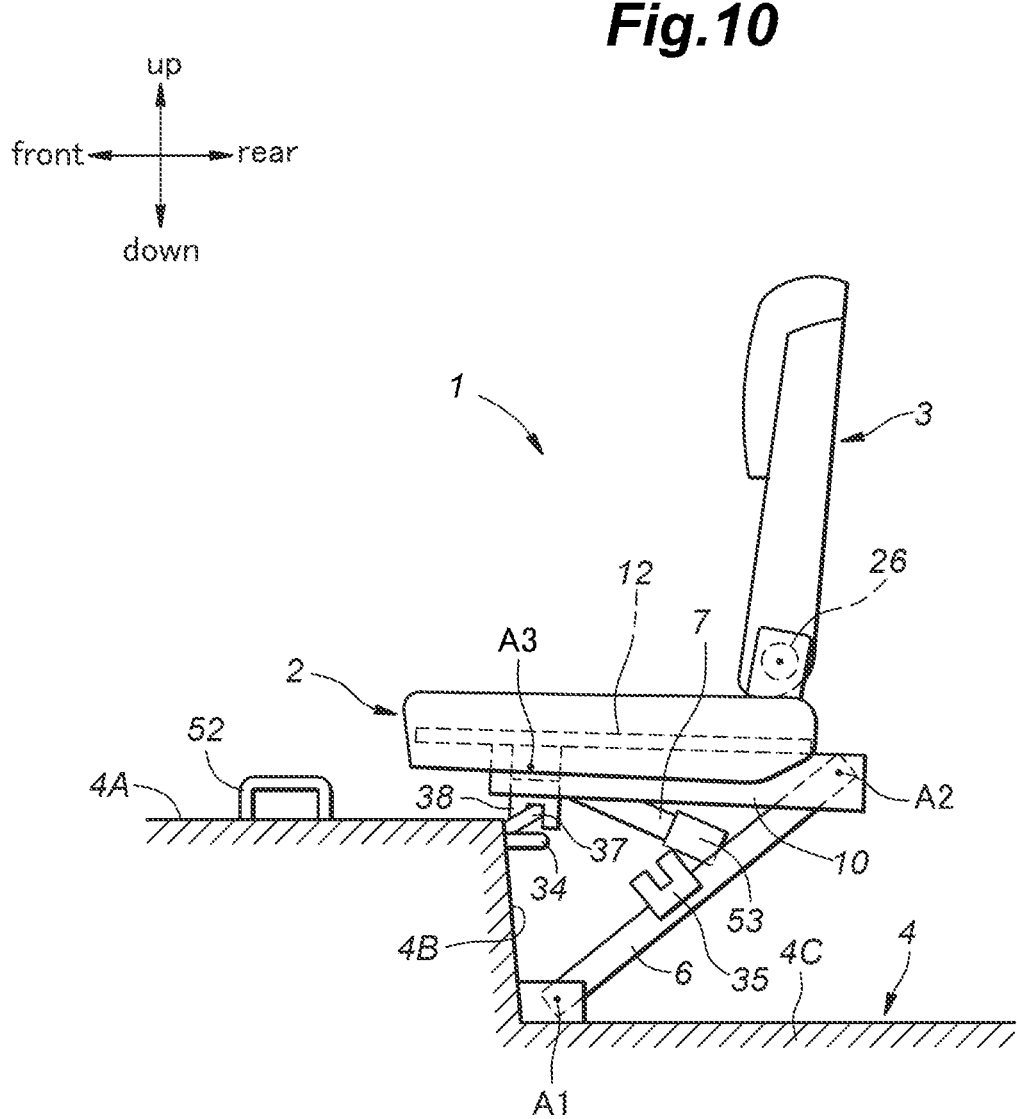
FIG. 10 is an explanatory diagram showing a second use form of the seat.

As shown in FIG. 8, in the first use form, the user can place the second coupling device 38 in the coupling position by slidingly moving the upper member 12 relative to the base member 10. When, in this state, the user operates the strap 66 and moves the seat cushion 2 and the seatback 3 rearward and downward, the second coupling device 38 moves toward the second coupling part 37, as shown in FIG. 9. As shown in FIG. 10, when the second coupling device 38 is coupled to the second coupling part 37, the positions of the first support leg 6 and the base member 10 are fixed, and the seat 1 is put into a second use form. The position of the seat cushion 2 when the seat 1 is in the second use form is referred to as a second use position. When the seat cushion 2 is in the second use position, the upper surface of the seat cushion 2 is positioned higher than the upper surface of the floor front portion 4A. When the seat cushion 2 is in the second use position, the base frame is disposed at the same height as the floor front portion 4A. Thereby, the user seated on the seat 1 can stretch the legs forward along the floor front portion 4A.

The seat cushion 2 is movable between the stowed position in which the seat cushion 2 is in the lowest position, the first use position in which the first coupling device 35 is coupled with the first coupling part 34, and the second use position in which the second coupling device 38 is coupled with the second coupling part 37. The seat cushion 2 in the second use position is disposed higher than the seat cushion 2 in the stowed position, and the seat cushion 2 in the first use position is disposed higher than the seat cushion 2 in the second use position.

The seat 1 according to the embodiment has multiple forms for seating. Since the seat cushion 2 can be disposed in the first use position and the second use position in addition to the stowed position, the number of arrangements of the seat 1 that can be selected by the user increases. By moving the seat cushion 2 from the first use position to the second use position, the height and the front-rear position of the seat cushion 2 are changed. When the seat cushion 2 is in the second use position, the user's line of sight is lowered and the space in front of and above the user becomes wider than when the seat cushion 2 is in the first use position. Therefore, the user can feel that the cabin is spacious. Also, since the user is positioned low with respect to the side windows of the vehicle, the privacy improves.

The front-rear position of the upper member 12 relative to the base member 10 when the seat 1 is in the second use form is more forward than the front-rear position of the upper member 12 relative to the base member 10 when the seat 1 is in the first use form. Therefore, in the case where there is a tailgate behind the seat 1, interference between the tailgate and the seatback 3 can be avoided. Also, since the seatback 3 leaves from the tailgate, the reclining angle of the seatback 3 can be made large.

When the seat 1 is in the stowed form, the seat 1 is disposed on the floor rear portion 4C which is recessed downward relative to the floor front portion 4A, and thus, the cabin can be widened.

Since the second coupling part 37 is provided on the rear end part of the floor front portion 4A or the upper end part of the floor middle portion 4B, the distance between the seat cushion 2 and the second coupling part 37 becomes close in the second use form of the seat 1. Therefore, the stability of the seat cushion 2 improves. Since the first reinforcement plate 41 and the second reinforcement plate 44 are provided at the parts where the first coupling part 34 and the second coupling part 37 are joined to the floor 4, the stiffness of the first coupling part 34 and the second coupling part 37 is increased. Also, since the first reinforcement plate 41 and the second reinforcement plate 44 are joined to each other, the stiffness of the first coupling part 34 and the second coupling part 37 is further increased. Further, the third reinforcement plate 45 increases the stiffness of the second coupling part 37.

Since the first coupling part 34 and the second coupling part 37 are disposed side by side in the left-right direction and are joined to each other, interference between the first coupling device 35 and the second coupling part 37 can be avoided. Also, interference between the second coupling device 38 and the first coupling part 34 can be avoided.

The present invention may be modified in various ways without being limited to the above embodiment. For example, the second coupling device 38 may be provided on the base member 10 via another slide device 91 to be movable in the front-rear direction. The slide device 91 is preferably joined to the side member 14, for example. According to this configuration, in the second use position, the upper member 12 can be slidingly moved forward and backward relative to the base member 10.

The first support leg 6, the second support leg 7, the first coupling part 34, and the second coupling part 37 may be provided on a side wall portion configuring the vehicle body, instead of on the floor 4. The first support leg 6, the second support leg 7, the first coupling part 34, and the second coupling part 37 may also be provided on another structural body provided on the floor 4 or the side wall portion configuring the vehicle body.

Figure 11:
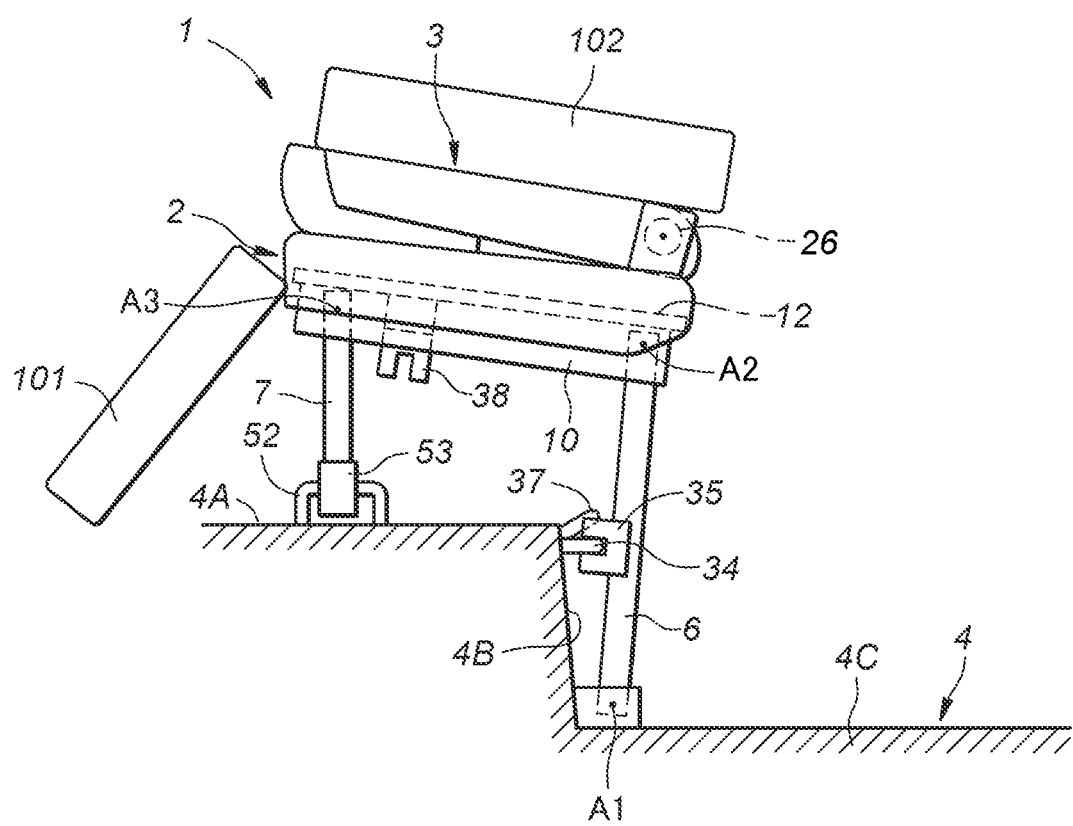
FIG. 11 is an explanatory diagram showing a seat according to a modification.

As shown in FIG. 11, an ottoman 101 may be provided on the front portion of the seat cushion 2. Preferably, an upper end of the ottoman 101 is supported at the front end of the seat cushion 2 to be pivotable about an axis extending laterally. The ottoman 101 is preferably disposed in a use position in which the ottoman 101 extends forward and downward from the front end of the seat cushion 2. In the use position, the lower end of the ottoman 101 is preferably disposed in front of the third coupling part 52. The ottoman 101 can cover the front of the third coupling part 52. Therefore, it is possible to prevent foreign matters from entering the third coupling part 52.

Also preferably, a back board 102 is provided on the back of the seatback 3. An upper end of the back board 102 is preferably supported by the upper end part of the back of the seatback 3 to be pivotable about an axis extending laterally. The back board 102 may also be detachably locked to the seatback 3 to extend along the seatback 3.

Figure 12:
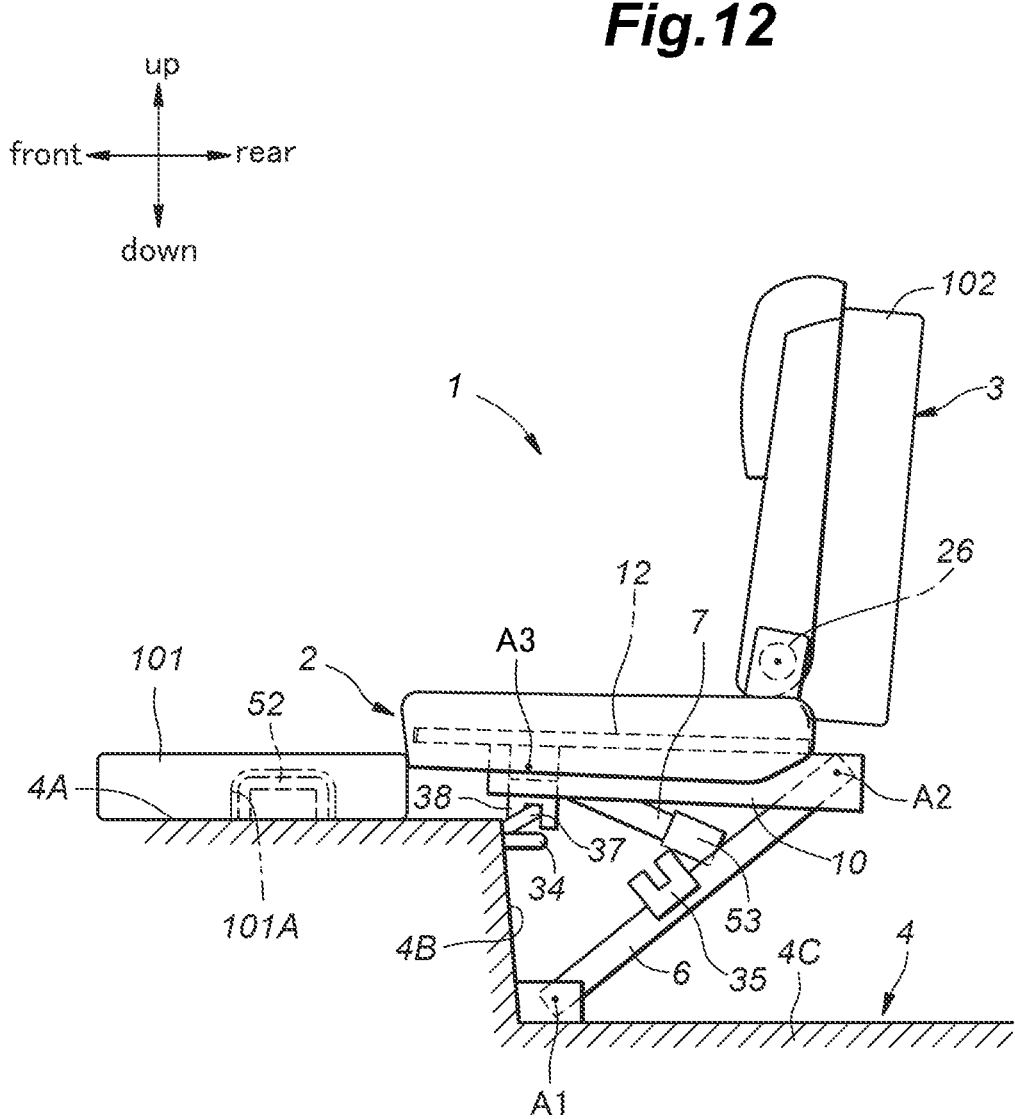
FIG. 12 is an explanatory diagram showing a seat according to a modification.

As shown in FIG. 12, when the seat 1 is in the second use form, preferably, the ottoman 101 extends in the fore and aft direction along the upper surface of the floor front portion 4A. At this time, the ottoman 101 is preferably supported from below by the upper surface of the floor front portion 4A. The lower surface (rear surface) of the ottoman 101 is preferably formed with a reception recess 101A for receiving the third coupling part 52. Thereby, the ottoman 101 is placed on the upper surface of the floor front portion 4A without interfering with the third coupling part 52. When the seat 1 is in the second use form, the ottoman 101 covers the third coupling part 52, and therefore, it is possible to avoid contact of the user's legs or the like with the third coupling part 52.

Figure 13:
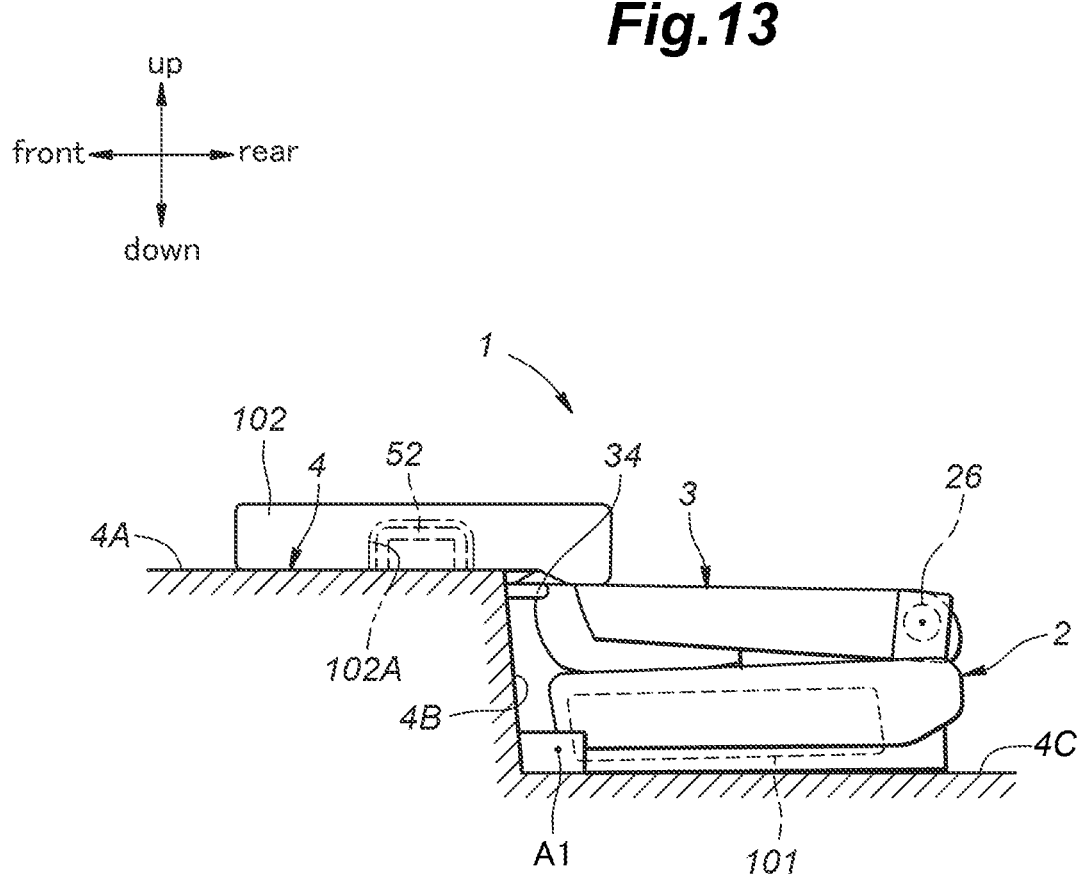
FIG. 13 is an explanatory diagram showing a seat according to a modification.

As shown in FIG. 13, when the seat 1 is in the stowed form, the ottoman 101 is disposed along the lower surface of the seat cushion 2. The second support leg 7 is preferably disposed between the lower surface of the seat cushion 2 and the ottoman 101. When the seat 1 is in the stowed form, the back board 102 preferably extends forward from the upper end of the seatback 3 and extends in the fore and aft direction along the upper surface of the floor front portion 4A. At this time, the back board 102 is preferably supported from below by the upper surface of the floor front portion 4A. Preferably, the lower surface the back board 102 is formed with a reception recess 102A for receiving the third coupling part 52. Thereby, the back board 102 is placed on the upper surface of the floor front portion 4A without interfering with the third coupling part 52. When the seat 1 is in the stowed form, the back board 102 can cover the third coupling part 52.

Figure 14:
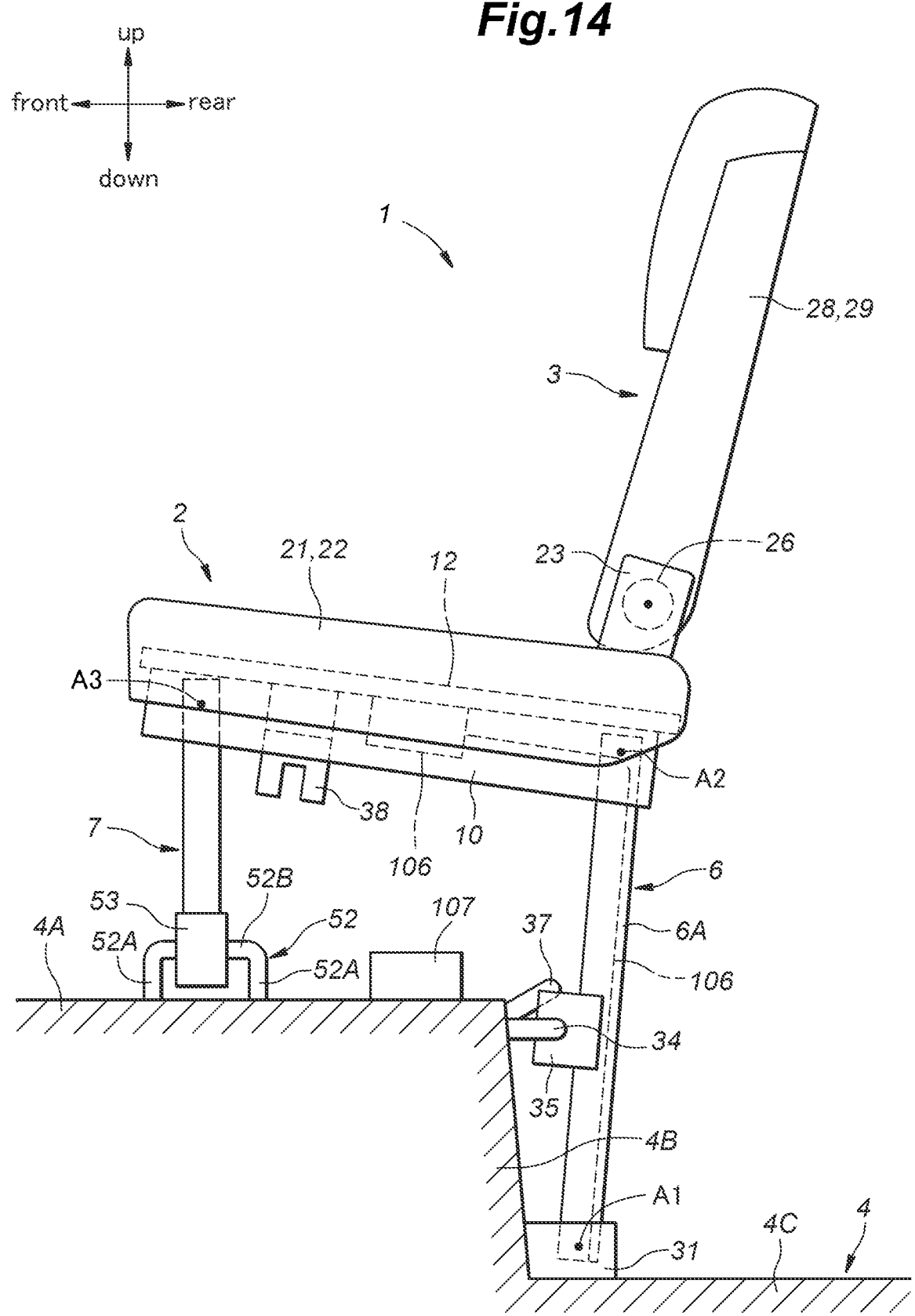
FIG. 14 is an explanatory diagram showing a seat according to a modification.

As shown in FIG. 14, an actuator 105 for driving the upper member forward and backward relative to the base member 10 may be provided. The actuator 105 preferably includes an electric motor and a driving mechanism. The driving mechanism may be a known mechanism such as a feed screw mechanism or a rack-and-pinion mechanism. The actuator 105 is preferably connected to the control device provided on the floor 4 via a harness 106. Preferably, the harness 106 extends from the seat cushion 2 to the floor 4 by passing inside the pillar part 6A of the first support leg 6. Also, the actuator 105 may receive supply of electric power from a wireless power supply device 108 by wireless power feeding. The wireless power supply device 108 is preferably disposed below the seat cushion 2 in the first use position. The wireless power supply device 108 is preferably disposed on the upper surface of the floor front portion 4A. The actuator 105 preferably includes a coil for receiving electric power from the wireless power supply device 108. The wireless power supply device 108 preferably transmits electric power and an actuator control signal to the actuator 105.

Figure 15:
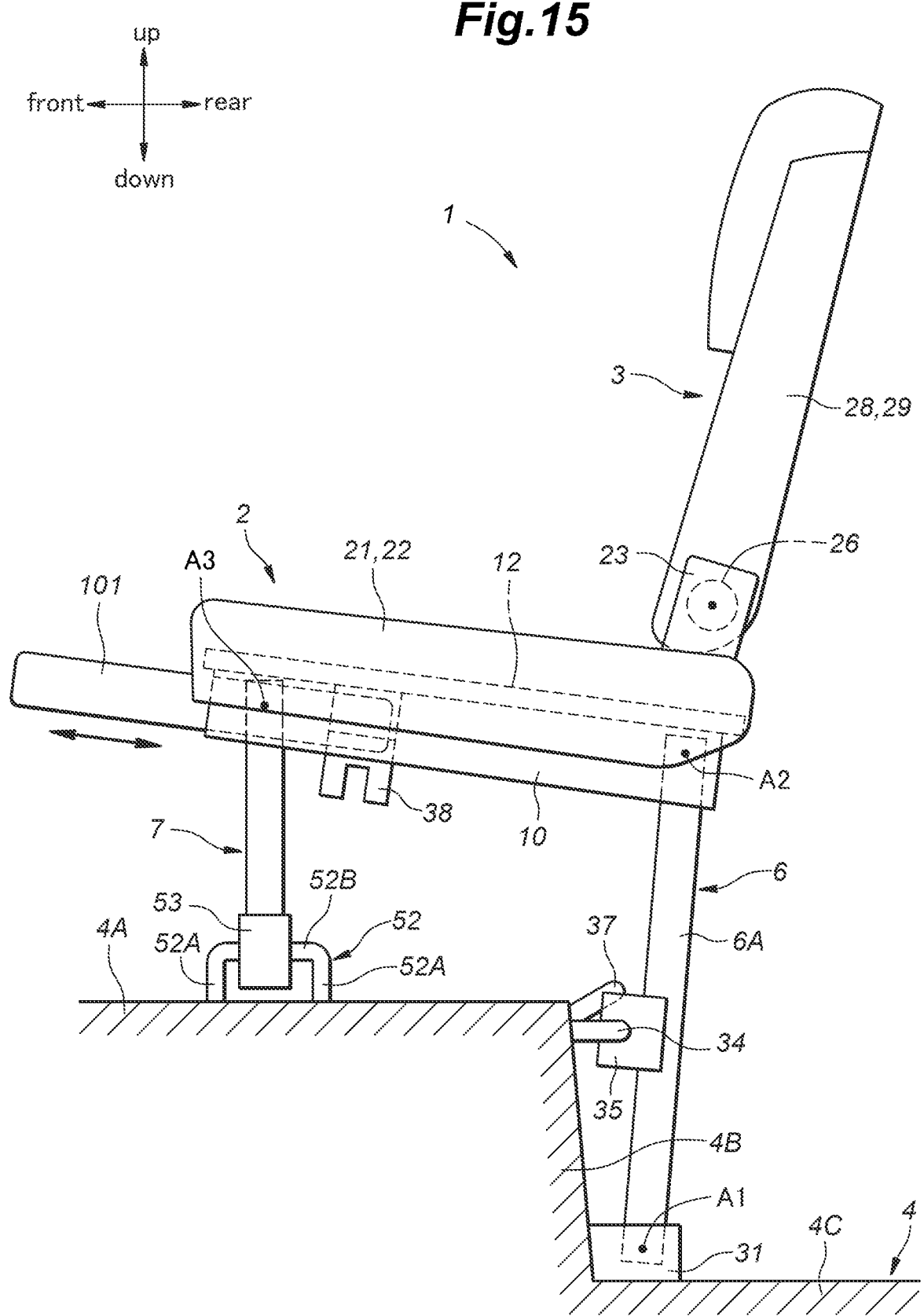
FIG. 15 is an explanatory diagram showing a seat according to a modification.

As shown in FIG. 15, the ottoman 101 may be supported on the seat cushion 2 to be slidingly movable in the front-rear direction. The ottoman 101 may also be supported on the upper member 12 to be slidingly movable in the front-rear direction. Preferably, the ottoman 101 is supported on the seat cushion 2 to be pivotable about the rear end part thereof in a state in which the ottoman 101 is pulled out forward relative to the seat cushion 2. The ottoman 101 may be divided into left and right parts to avoid interference with the second support leg 7. In this case, the second support leg 7 is preferably disposed between a pair of left and right ottomans 101 in the left-right direction.

Figure 16:
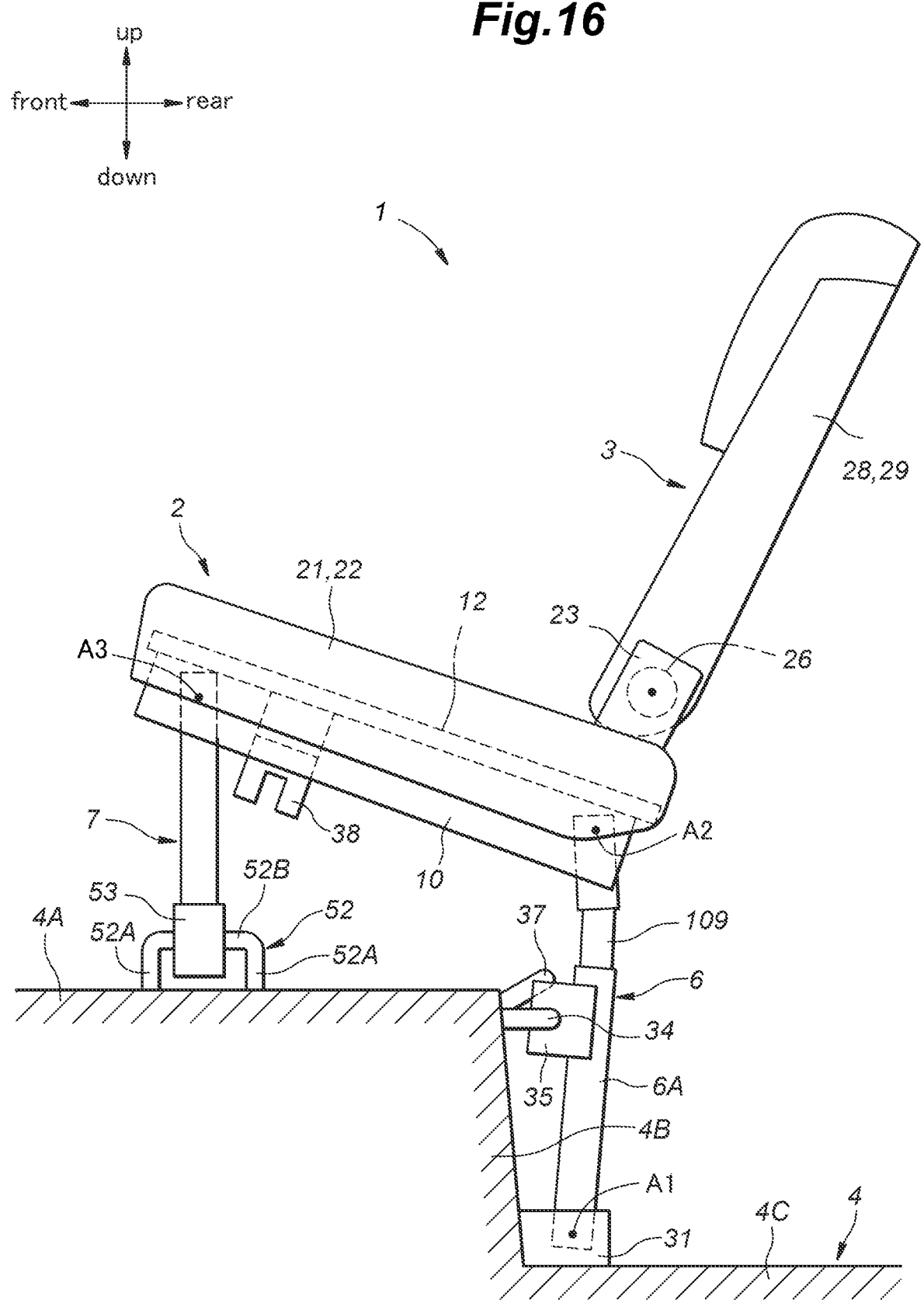
FIG. 16 is an explanatory diagram showing a seat according to a modification.

As shown in FIG. 16, the first support leg 6 preferably includes a length adjustment part 109. The length adjustment part 109 is provided to be capable of adjusting the length thereof in the longitudinal direction of the first support leg 6. For example, the length adjustment part 109 is preferably formed of a feed screw mechanism or a rack-and-pinion mechanism. Preferably, the length of the length adjustment part 109 is changed by manual operation of the user or by the driving force of an electric motor or the like. When the length adjustment part 109 is shortened, the seat cushion 2 and the seatback 3 tilt rearward. Thereby, the seat 1 can be put into a relax mode. Preferably, the first coupling device 35 becomes able to release the coupling with the first coupling part 34 in a state in which the length adjustment part 109 is stretched the most. Namely, in a state in which the length adjustment part 109 is contracted, the first coupling device 35 cannot release the coupling with the first coupling part 34. For example, in the contracted state, the length adjustment part 109 preferably contacts the latch 57C of the first coupling device 35 to prohibit pivoting of the latch 57C. Thereby, when the length adjustment part 109 is in the most stretched state, the seat 1 can transition from the first use form to the second use form or the stowed form. Thus, form change of the seat 1 is prevented in the state in which the length adjustment part 109 is contracted.

Figure 17:
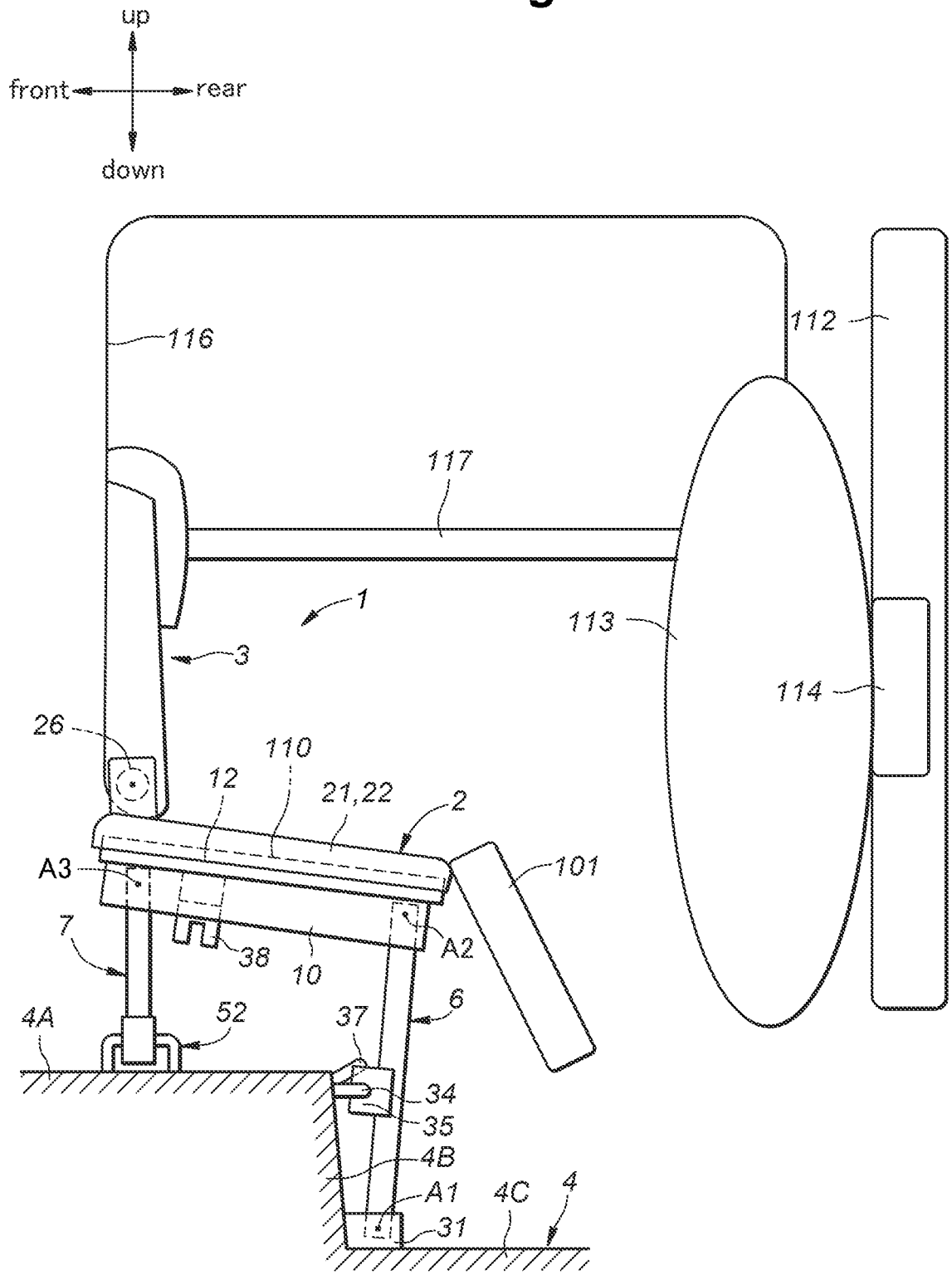
FIG. 17 is an explanatory diagram showing a seat according to a modification.

As shown in FIG. 17, preferably, a rotating member 110 is rotatably provided on the upper member 12. The rotating member 110 preferably rotates about an axis perpendicular to the upper member 12. Preferably, the rotating member 110 is formed in a plate shape and is disposed in parallel to the upper surface of the upper member 12. The rotating member 110 is preferably supported on the upper surface of the upper member 12 in a slidable manner. The seat cushion pad 21 is supported by the rotating member 110. Preferably, the seatback support part 23 is joined to the rotating member 110. Due to the rotating member 110, the seat cushion pad 21 and the seatback 3 rotate about the axis of the rotating member 110, which extends vertically. The seat 1 can assume a form facing rearward, as shown in FIG. 17.

A tailgate 112 of the vehicle is disposed behind the seat 1. The tailgate 112 is provided with an airbag storage part 114 for storing an airbag 113. The airbag 113 inflates toward the user seated on the seat 1 facing rearward. The airbag 113 may be provided in a side wall of the vehicle body instead of in the tailgate 112 and may inflate toward the front surface of the tailgate 112.

A window 116 is provided in a side portion of the vehicle. The window 116 may be provided with a sunshade 117. The sunshade 117 is provided so as to be capable of opening and closing the window 116. Preferably, the sunshade 117 is provided on a part of the side wall of the vehicle below the window 116 so as to be pulled out upward.

Figure 18:
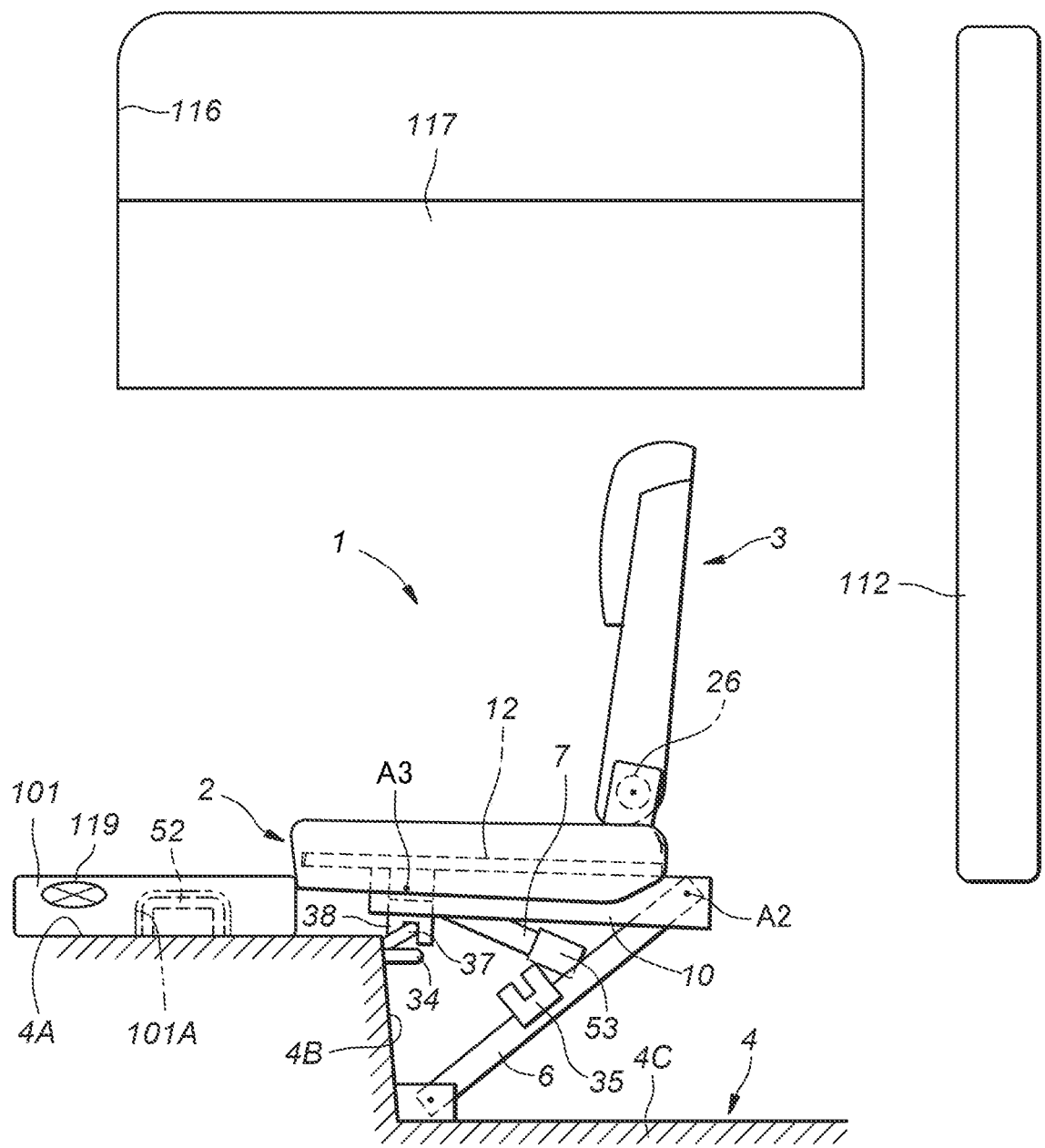
FIG. 18 is an explanatory diagram showing a seat according to a modification.

As shown in FIG. 18, the ottoman 101 may be provided with a blower 119 as an air conditioner. The blower 119 sends air toward the user from the support surface (the front surface, the upper surface) of the ottoman 101.

Figure 19:
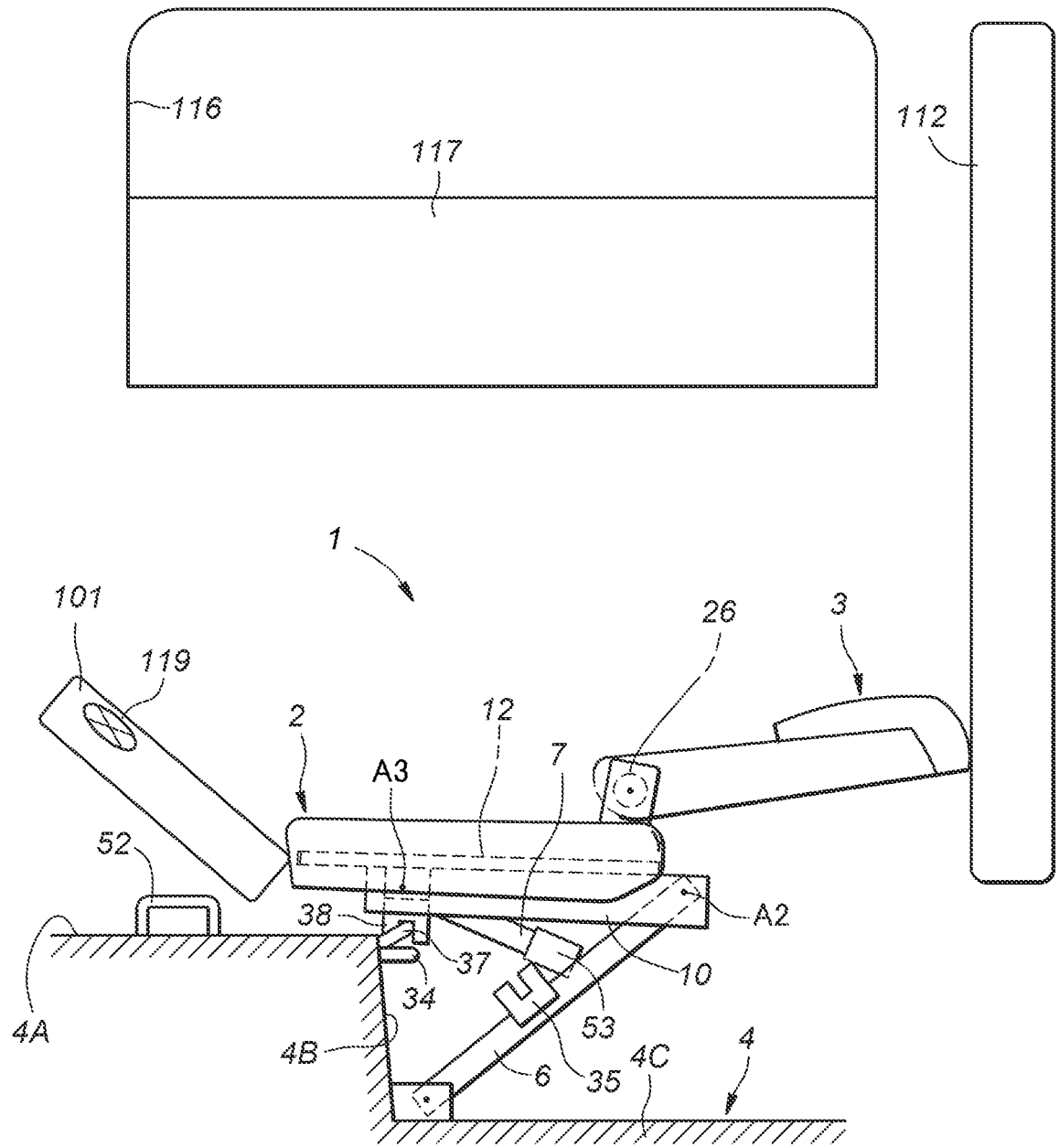
FIG. 19 is an explanatory diagram showing a seat according to a modification.

As shown in FIG. 19, the seat 1 can assume a lying-face-down use form. In the lying-face-down use form of the seat 1, the seatback 3 extends substantially horizontally, and the ottoman 101 extends obliquely upward from the seat cushion 2. When lying face down, the user preferably makes the abdomen contact the seat cushion 2, the chest contact the ottoman 101, and the legs contact the seatback 3. Also preferably, the user makes the armpits supported on the upper end of the ottoman 101 so that the head protrudes more forward than the ottoman 101. By changing the angle of the ottoman 101 relative to the seat cushion 2, it is possible to change the angle of the chest and head of the user.

Figure 20:
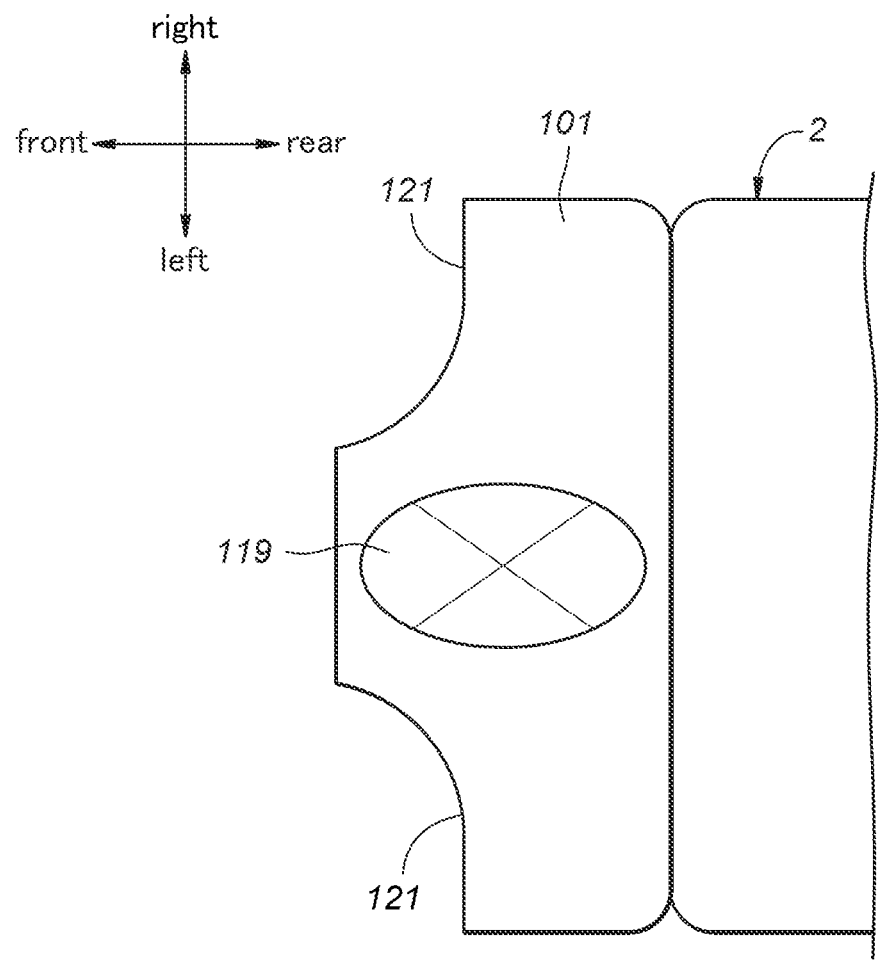
FIG. 20 is an explanatory diagram showing an ottoman of a seat according to a modification.

As shown in FIG. 20, the tip end portion of the ottoman 101 is preferably formed with a pair of left and right recesses 121. Each recess 121 is recessed from the tip end portion of the ottoman 101 toward the base end portion and reaches a left or right side edge. Each recess 121 penetrates the ottoman 101 in the thickness direction. Preferably, the blower 119 opposes the chest of the user lying face down and sends air toward the chest.

Figure 21:
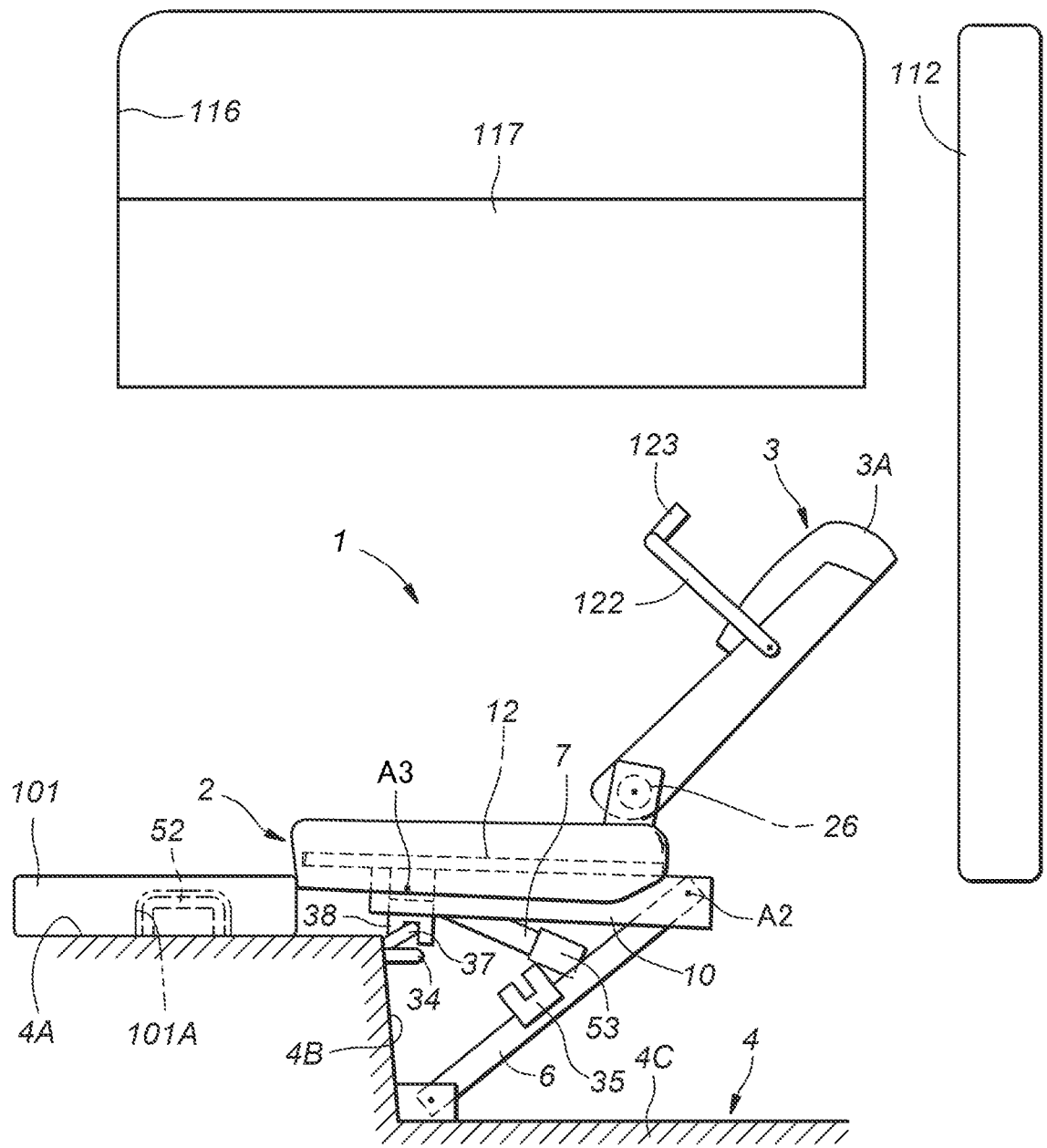
FIG. 21 is an explanatory diagram showing a seat according to a modification.

As shown in FIG. 21, the seatback 3 may be provided with a pair of left and right armrests 122. The rear end of each armrest 122 is preferably joined to the seatback 3 to be pivotable about an axis extending in the left-right direction. Also, the rear end of each armrest is preferably joined to the seatback 3 to be pivotable left and right about an axis extending in the extension direction of the seatback 3. Namely, the front end of each armrest 122 is preferably movable left/right and up/down relative to the rear end of the same. Preferably, each armrest 122 is provided with a fixing means for selectively fixing the position relative to. Also, each armrest 122 may be provided with a holder 123 for holding an article. For example, the holder 123 holds a mobile terminal such as a smartphone. Preferably, the tip of the armrest 122 is formed with a recess capable of accommodating the holder 123. The pivot axis of the armrest 122 relative to the seatback 3 is located closer to the upper end of the seatback 3 than the lower end of the headrest 3A provided on the upper portion of the seatback 3 is.

Figure 22:
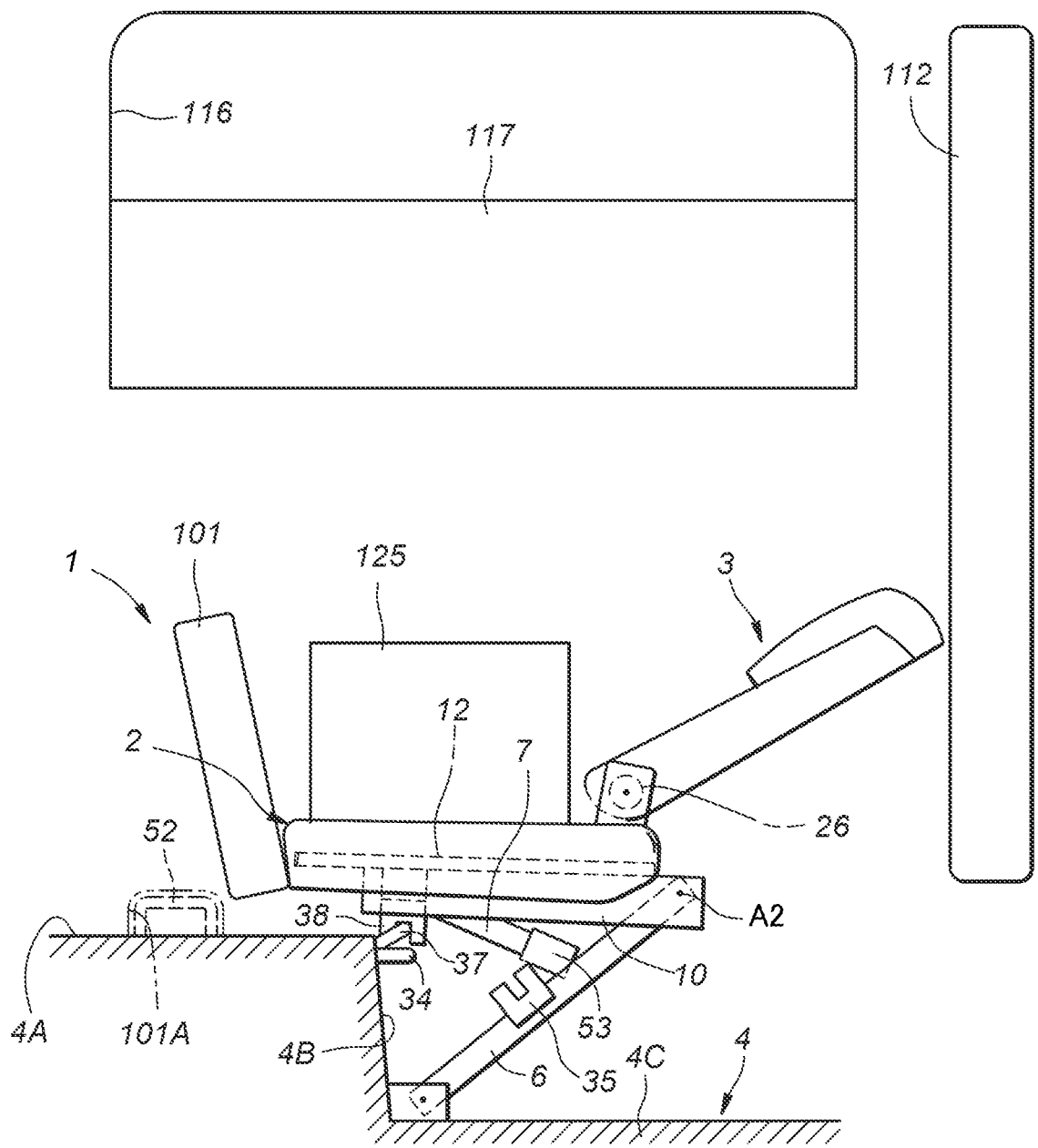
FIG. 22 is an explanatory diagram showing a seat according to a modification.

As shown in FIG. 22, in the second use form of the seat 1, by tilting the seatback 3 rearward and disposing the ottoman 101 substantially vertically, the seat 1 can be put into a luggage holding form. A piece of luggage 125 is placed on the seat cushion 2. The ottoman 101 restricts the forward movement of the luggage 125, and the seatback 3 restricts the rearward movement of the luggage 125. By making the rearward angle of the seatback 3 large, loading and unloading of the luggage 125 through the tailgate 112 becomes easy.

Figure 23:
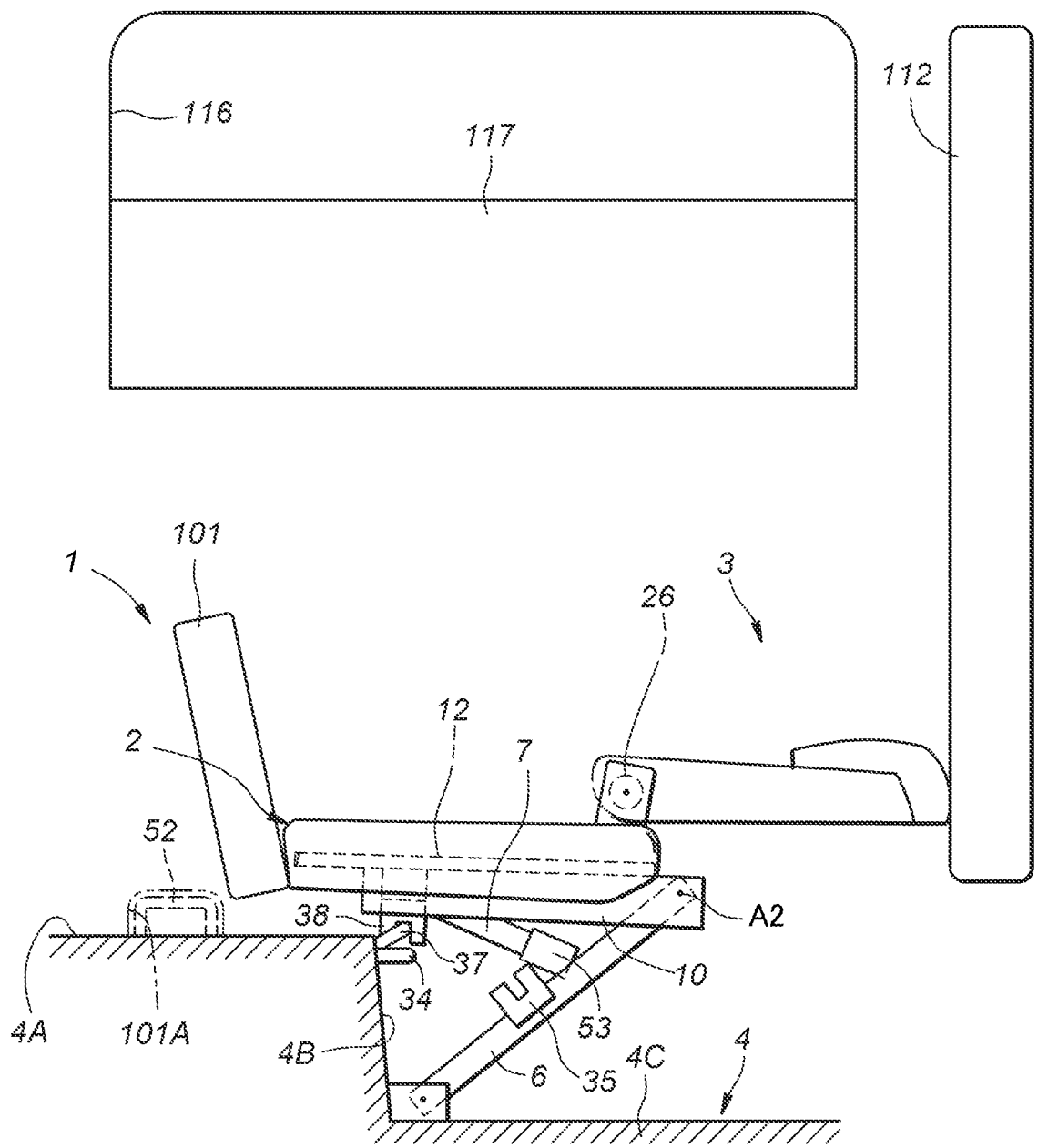
FIG. 23 is an explanatory diagram showing a seat according to a modification.

As shown in FIG. 23, in the second use form of the seat 1, by tilting the seatback 3 horizontally in the rearward direction and disposing the ottoman 101 substantially vertically, a rearward seating form can be achieved. The user is preferably seated on the seat 1 to face rearward, with the back supported on the ottoman 101 and the legs supported on the seatback 3.

Figure 24:
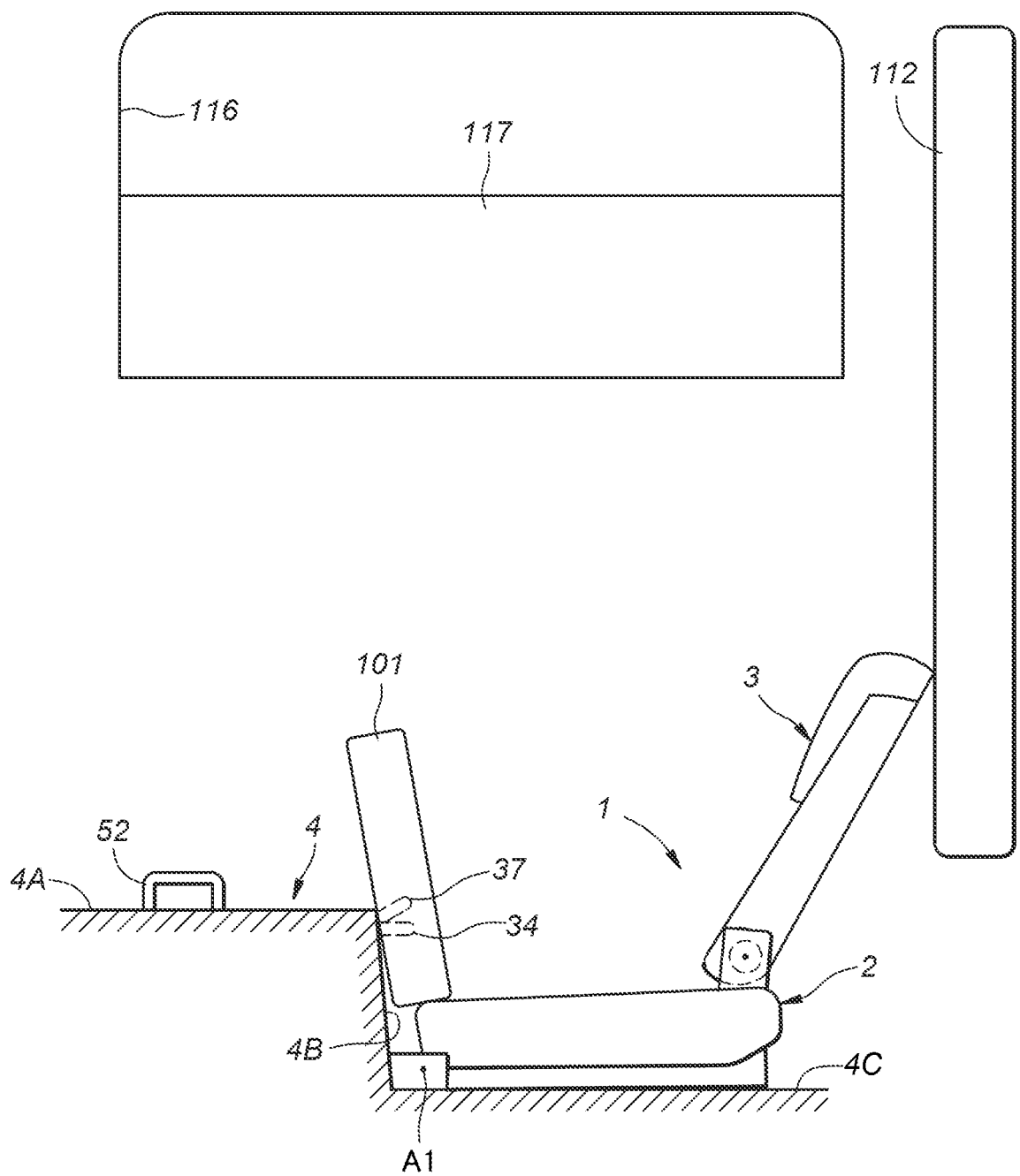
FIG. 24 is an explanatory diagram showing a seat according to a modification.

As shown in FIG. 24, in the stowed form of the seat 1, by placing the seatback 3 to extends rearward and upward from the rear end of the seat cushion 2 and disposing the ottoman 101 substantially vertically, a second luggage holding form can be achieved. The upper end of the seatback 3 may contact the front surface of the tailgate 112. The lower surface of the ottoman 101 is preferably formed with a recess for receiving the first coupling part 34 and the second coupling part 37. The ottoman 101 restricts the forward movement of the luggage 125, and the seatback 3 restricts the rearward movement of the luggage 125.

Figure 25:
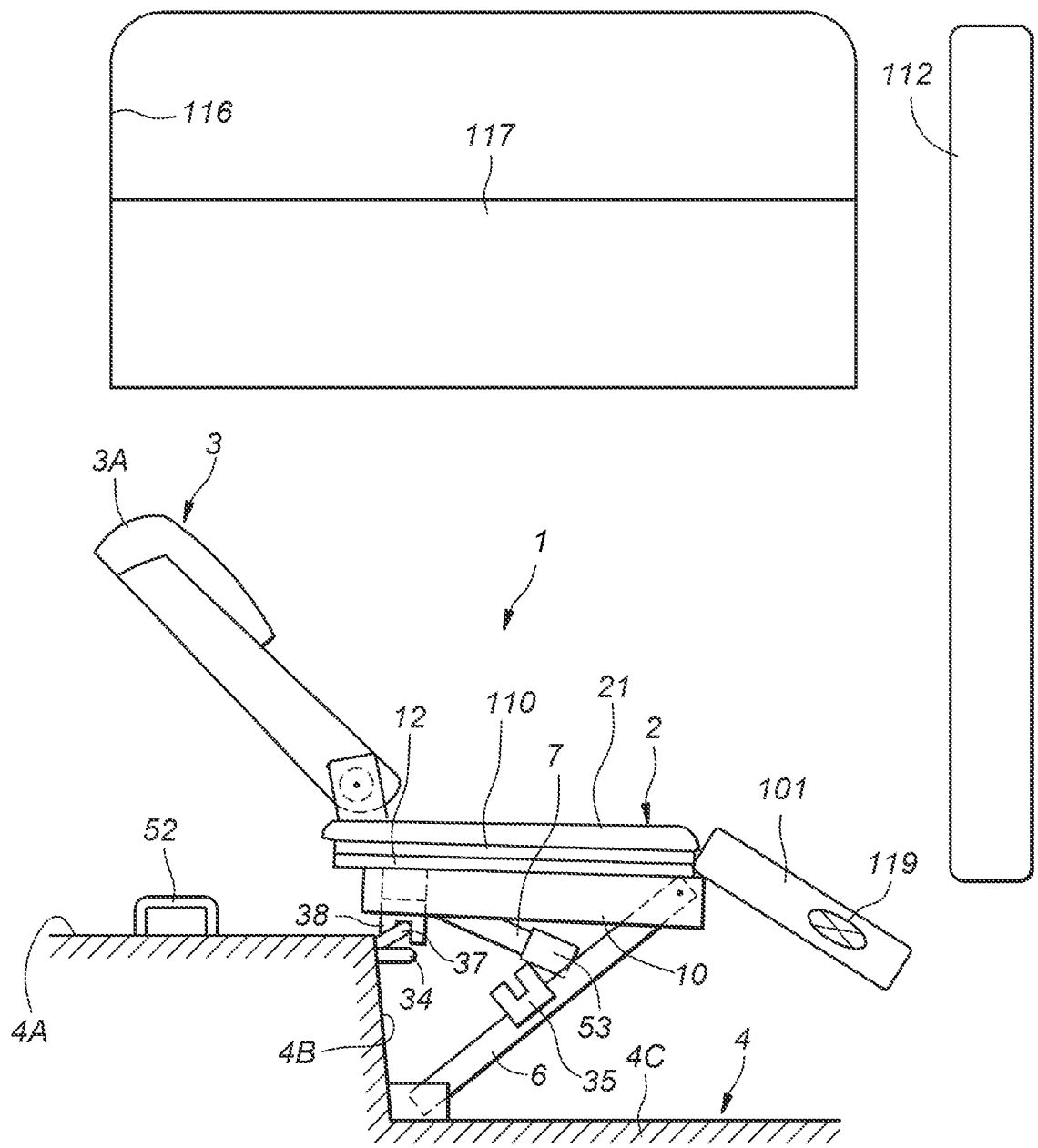
FIG. 25 is an explanatory diagram showing a seat according to a modification.
Figure 26:
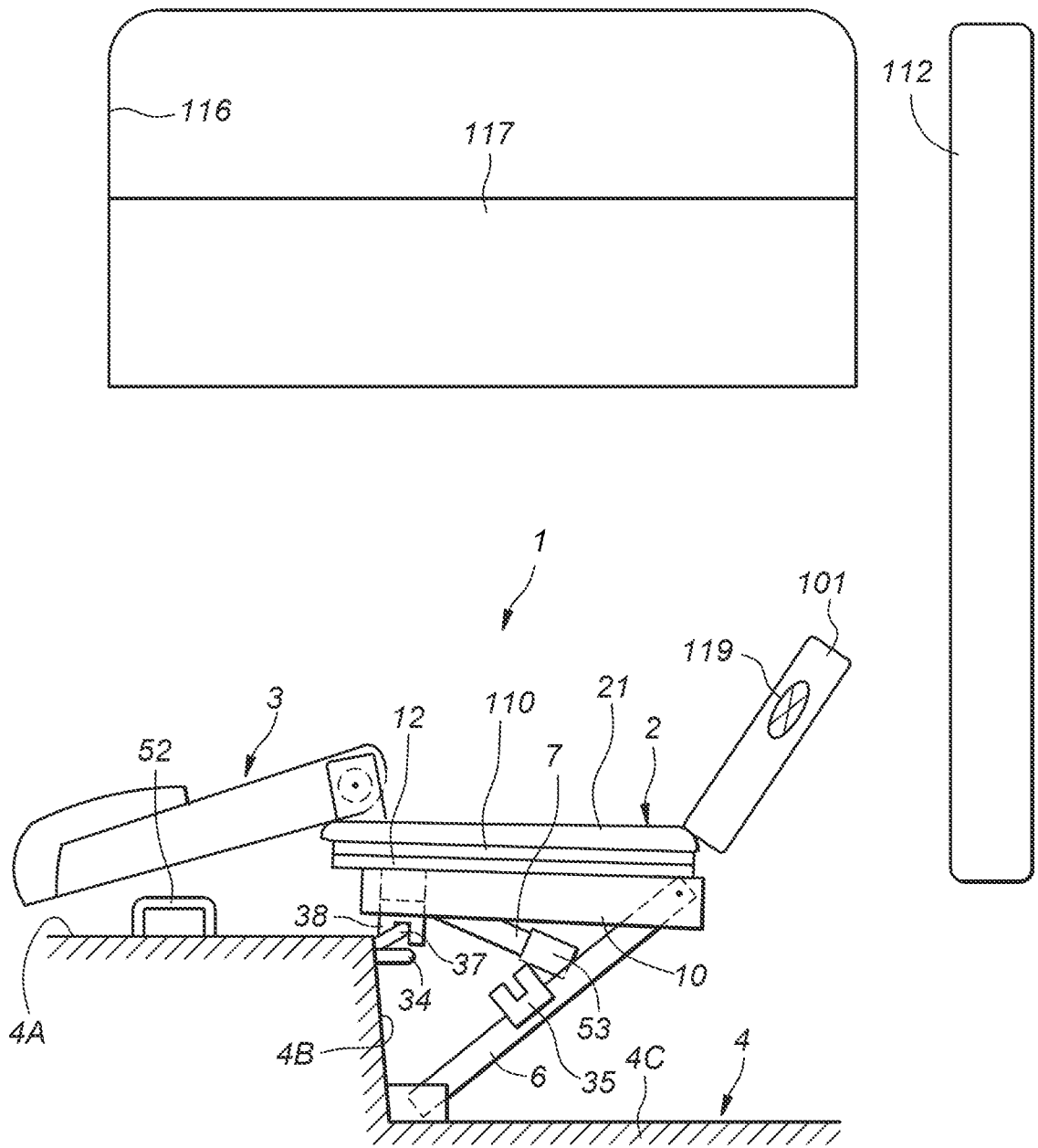
FIG. 26 is an explanatory diagram showing a seat according to a modification.

As shown in FIG. 25, in the second use form of the seat 1, the seat may be disposed to face rearward by the rotating member 110. The rotating member 110 rotates relative to the upper member 12 about an axis extending in the up-down direction. The seat cushion pad 21 and the seatback 3 rotate integrally with the rotating member 110. In the state in which the seat 1 is disposed to face rearward, the seatback 3 can be adjusted to an arbitrary angle relative to the seat cushion 2. Also, in the state in which the seat 1 is disposed to face rearward, the ottoman 101 can be adjusted to an arbitrary angle relative to the seat cushion 2. As shown in FIG. 26, the seatback 3 may be placed to extend forward from the seat cushion 2, and the ottoman 101 may be placed to extend rearward and upward from the seat cushion 2.

Figure 27:
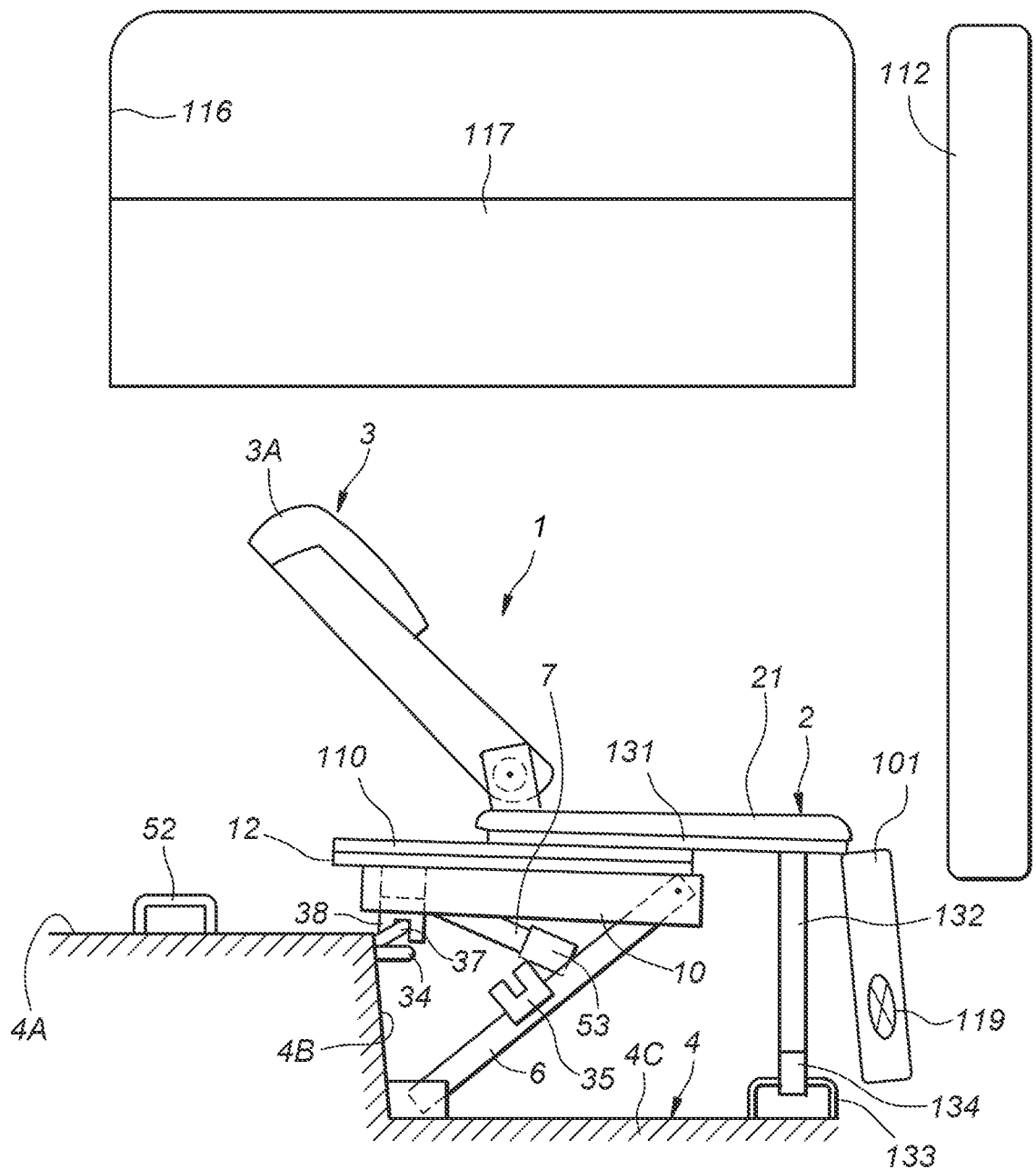
FIG. 27 is an explanatory diagram showing a seat according to a modification.

As shown in FIG. 27, the upper surface of the rotating member 110 supports thereon a slide member 131 which is slidingly movable relative to the rotating member. The seat cushion pad 21 and the seatback support part 23 are provided on the slide member 131. Thereby, in the second use form of the seat 1, the seat 1 faces rearward and can slidingly move rearward. The slide member 131 may be provided with a third support leg 132. The third support leg 132 extends downward from the slide member 131. The lower end of the third support leg 132 is provided with a fourth coupling device 134 configured to be coupled to a fourth coupling part 133 provided on the floor rear portion 4C. The fourth coupling part 133 may have the same configuration as the third coupling part 52. The fourth coupling device 134 may have the same configuration as the first coupling device 35. Preferably, the third support leg 132 is pivotably supported by the slide member 131. The third support leg 132 can pivot to a stowed position in which the third support leg 132 extends in parallel to the slide member 131.

Figure 28:
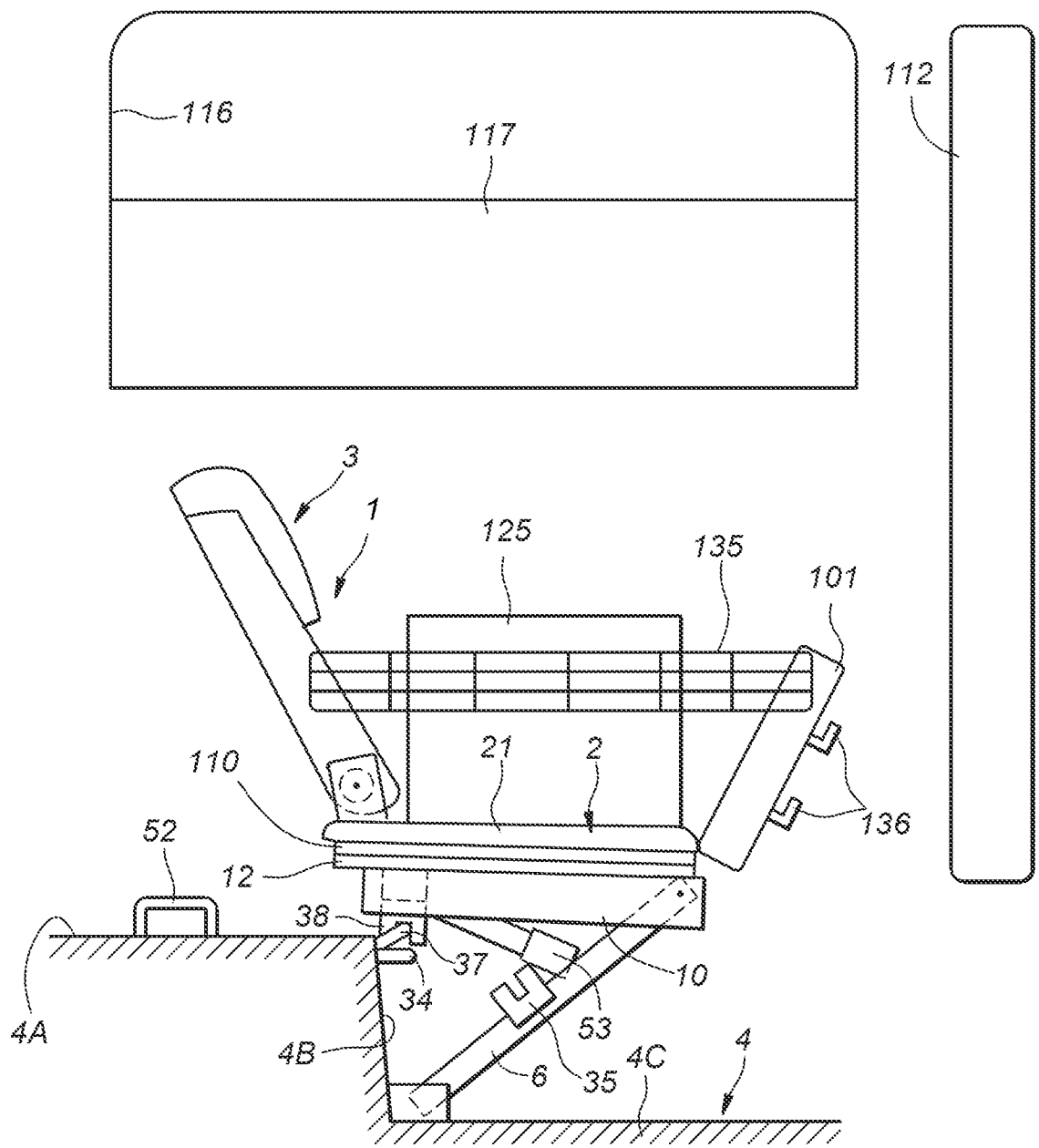
FIG. 28 is an explanatory diagram showing a seat according to a modification.

As shown in FIG. 28, in the second use form of the seat 1, by disposing the seat 1 to face rearward, placing the seatback 3 to extend upward from the seat cushion 2, and placing the ottoman 101 to extend upward from the seat cushion 2, the seat 1 is brought into the luggage holding form. The luggage 125 is placed on the upper portion of the seat cushion 2. The ottoman 101 restricts the rearward movement of the luggage 125, and the seatback 3 restricts the forward movement of the luggage 125. In the luggage holding form of the seat 1, a net 135 may be provided to span between the seatback 3 and the ottoman 101. The net 135 is preferably secured to the left ends of the seatback 3 and the ottoman 101 or to the right ends of the seatback 3 and the ottoman 101. The left ends and the right ends of the seatback 3 and the ottoman 101 are preferably provided with hooks for securing the net 135. The net 135 restricts the lateral movement of the luggage 125. Preferably, the lower surface of the ottoman 101 is provided with multiple hooks 136.

Figure 29:
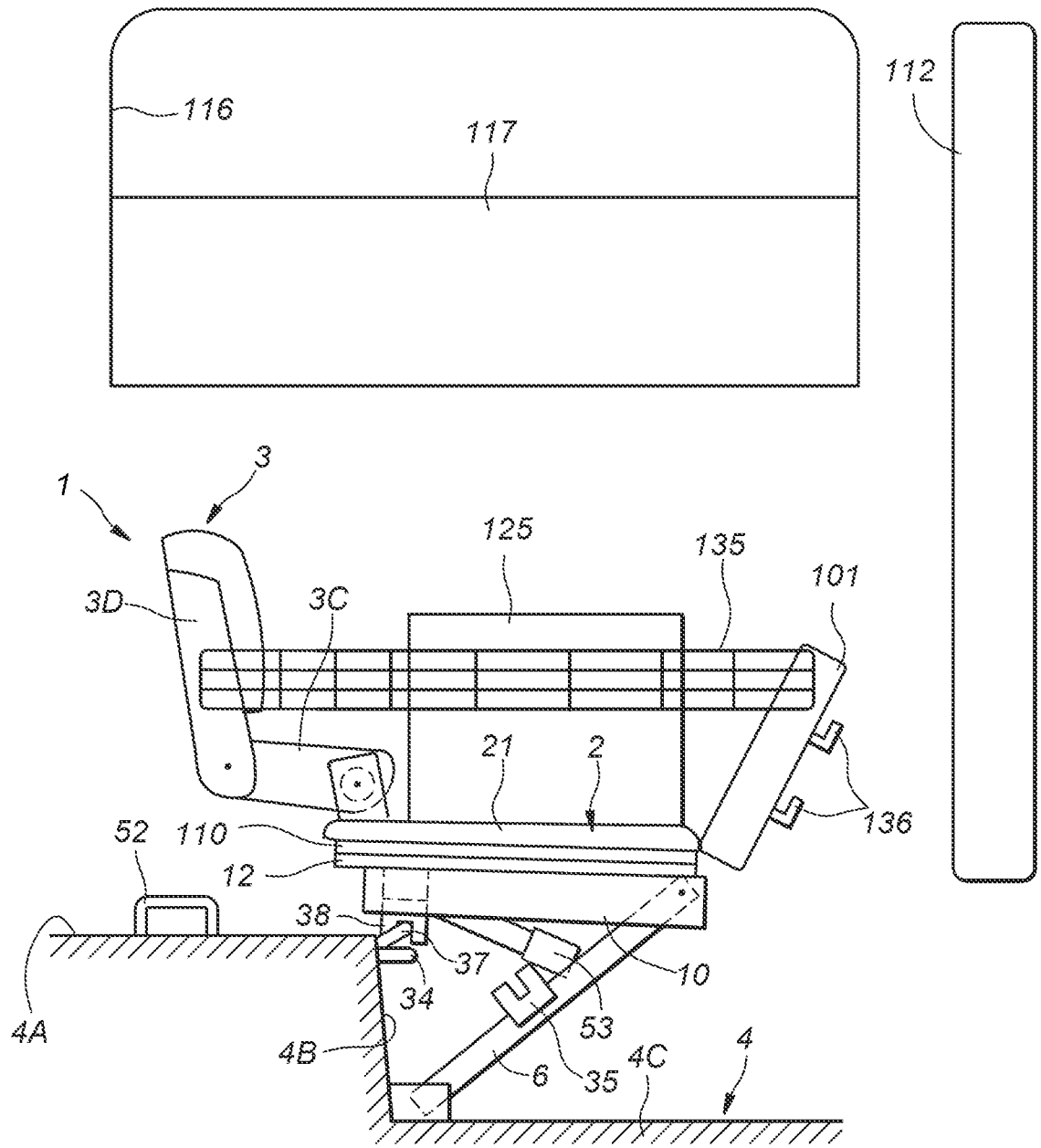
FIG. 29 is an explanatory diagram showing a seat according to a modification.

As shown in FIG. 29, the seatback 3 may include a seatback lower portion 3C pivotably joined to the seat cushion and a seatback upper portion 3D pivotably joined to the seatback lower portion 3C. The seatback 3 may be a so-called center-foldable seatback. By placing the seatback lower portion 3C to extend substantially horizontally and placing the seatback upper portion 3D to extend substantially vertically, it is possible to enlarge the space in which the luggage 125 can be placed. The luggage 125 may be placed on the seatback lower portion 3C. The net 135 is preferably provided to span between the seatback upper portion 3D and the ottoman 101.

The switching between the various forms of the seat 1 described above is preferably performed by manual operation of the user. Also, it is possible to provide the seat 1 with actuators including an electric motor and a driving mechanism and to change the angles of the seatback 3 and the ottoman 101 relative to the seat cushion 2. Also, the slide device 11, the rotating member 110, and the slide member 131 may be driven by actuators.

Figure 30:
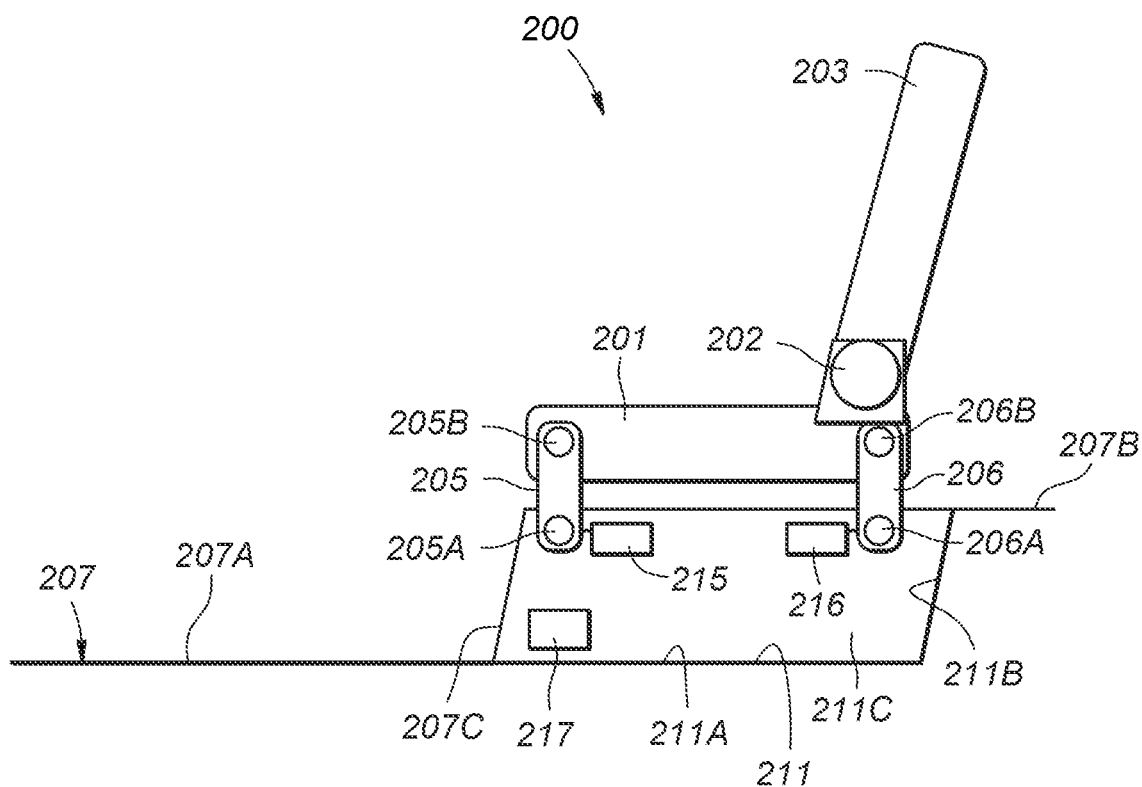
FIG. 30 is an explanatory diagram showing a seat according to an embodiment.

With reference to FIGS. 30 to 36, a seat 200 according to another embodiment will be described. As shown in FIG. 30, the seat 200 includes a seat cushion 201 and a seatback 203 pivotably joined to the rear portion of the seat cushion 201 via a support member 202. The seat cushion 201 is joined to the floor 207 by a pair of left and right front links 205 and a pair of left and right rear links 206.

The floor 207 includes a floor front portion 207A and a floor rear portion 207B that is raised upward relative to the floor front portion 207A. At the boundary between the floor front portion 207A and the floor rear portion 207B, a floor vertical wall 207C is provided. The floor rear portion 207B is formed with a storage recess 211 that is recessed downward. The storage recess 211 extends in the fore and aft direction and opens out in the floor vertical wall 207C. The storage recess 211 includes a bottom wall 211A, a rear wall 211B that faces forward, and a pair of left and right side walls 211C. The bottom wall 211A is continuous with the floor front portion 207A.

Each front link 205 is pivotably joined to the front portion of the laterally corresponding side wall 211C via a first shaft 205A. Also, each front link 205 is pivotably joined to the front portion of the laterally corresponding side portion of the seat cushion 201 via a second shaft 205B. The first shaft 205A and the second shaft 205B are provided at both ends of the front link 205.

Each rear link 206 is pivotably joined to the rear portion of the laterally corresponding side wall 211C via a third shaft 206A. Also, each rear link 206 is pivotably joined to the rear portion of the laterally corresponding side portion of the seat cushion 201 via a fourth shaft 206B. The third shaft 206A and the fourth shaft 206B are provided at both ends of the rear link 206.

The first shaft 205A, the second shaft 205B, the third shaft 206A, and the fourth shaft 206B extend laterally in parallel to each other. The third shaft 206A is spaced rearward with respect to the first shaft 205A. The fourth shaft 206B is spaced rearward with respect to the second shaft 205B.

The floor 207, the left and right front links 205, the left and right rear links 206, and the seat cushion 201 cooperate with each other to form a four-section link.

The first shaft 205A is provided with a front driving mechanism 215 for adjusting the rotation angle of the first shaft 205A. The third shaft 206A is provided with a rear driving mechanism 216 for adjusting the rotation angle of the third shaft 206A. Preferably, the front driving mechanism 215 and the rear driving mechanism 216 each include an electric motor and a transmission mechanism that decelerates the driving force of the electric motor and transmits it to the first shaft 205A or the third shaft 206A. The front driving mechanism 215 and the rear driving mechanism 216 may each include a holding mechanism for holding the rotation position of the first shaft 205A or the third shaft 206A. The front driving mechanism 215 and the rear driving mechanism 216 are preferably controlled by a control device 217. The control device 217 is an electronic control unit including a microprocessor and a memory. The front driving mechanism 215, the rear driving mechanism 216, and the control device 217 are preferably mounted on the side wall of the storage recess 211.

By controlling the front driving mechanism 215 and the rear driving mechanism 216 with the control device 217 to place the front links 205 and the rear links 206 at predetermined angles, the form of the seat 200 is changed.

Figure 31:
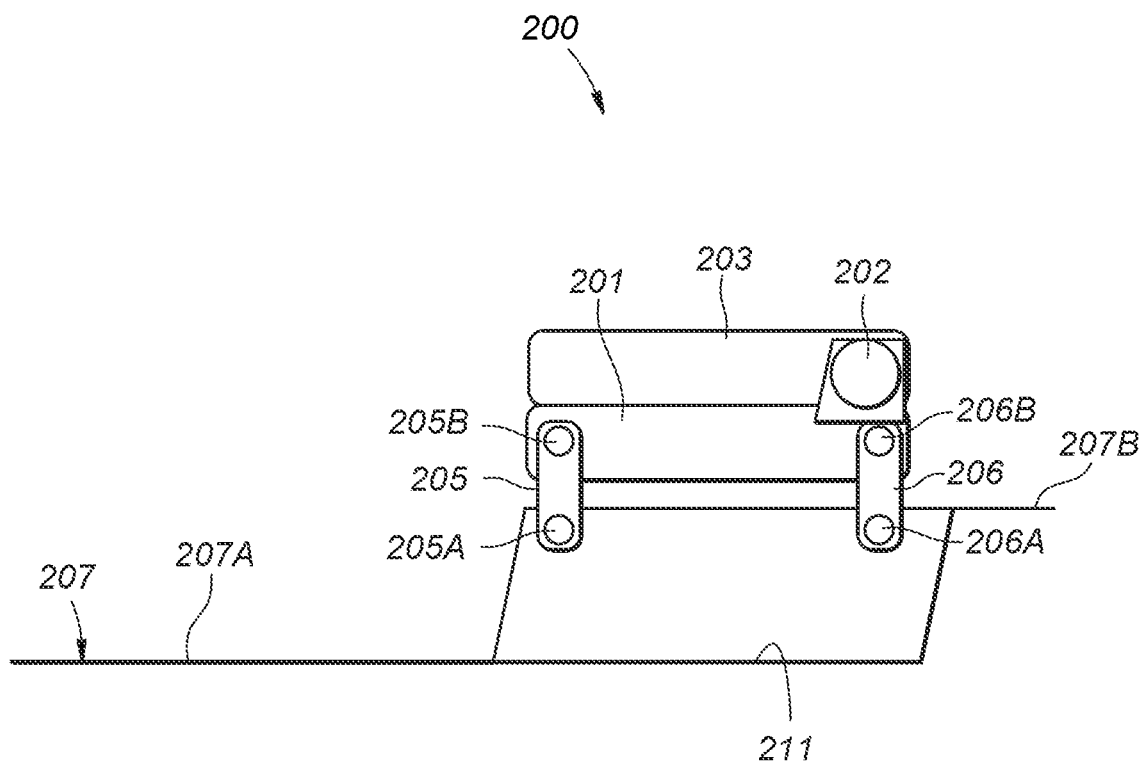
FIG. 31 is an explanatory diagram showing the seat according to the embodiment.

As shown in FIG. 30, when the front links 205 extend upward from the first shaft 205A to the second shaft 205B and the rear links 206 extend upward from the third shaft 206A to the fourth shaft 206B, the seat 200 is put into a high position form. As shown in FIG. 31, in the high position, the seat 200 can assume a folded form in which the seatback 203 and the seat cushion 201 are folded over each other.

Figure 32:
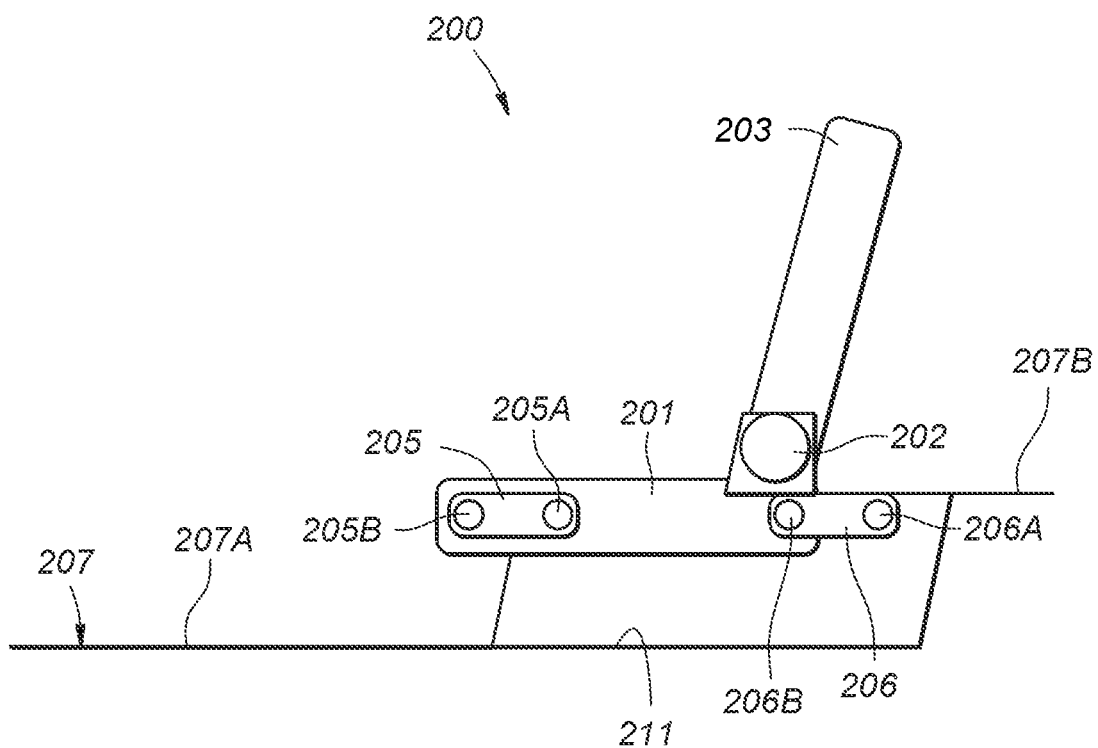
FIG. 32 is an explanatory diagram showing the seat according to the embodiment.
Figure 33:
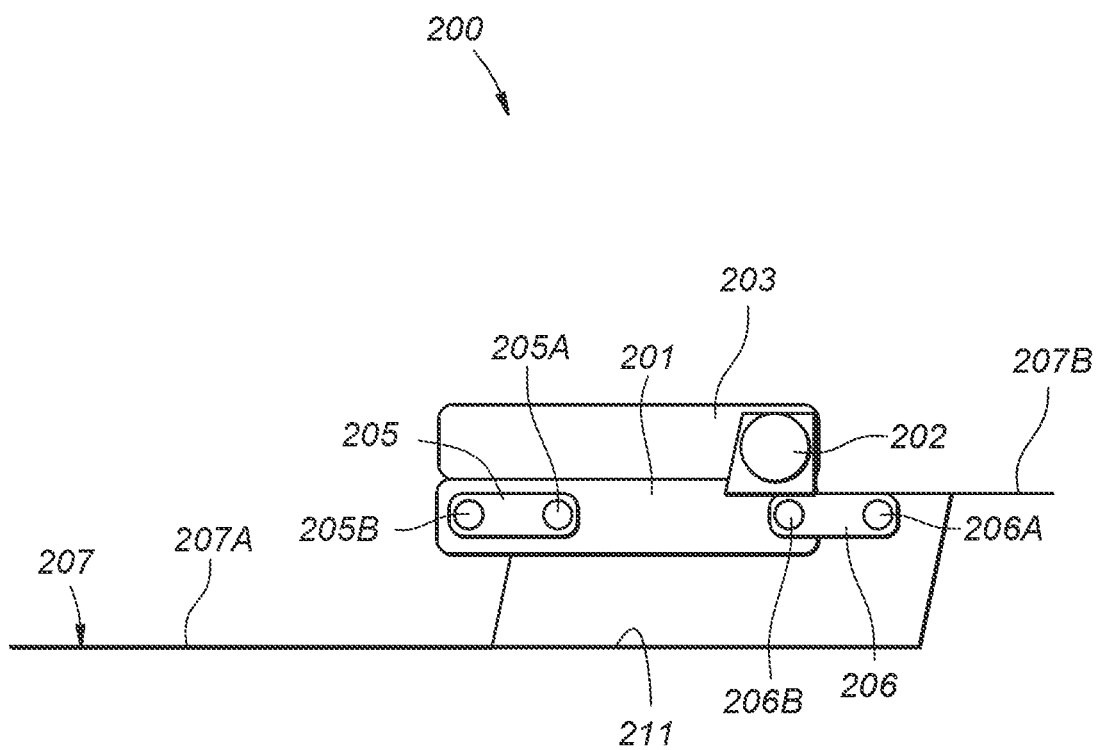
FIG. 33 is an explanatory diagram showing the seat according to the embodiment.

As shown in FIG. 32, when the front links 205 extend forward from the first shaft 205A to the second shaft 205B and the rear links 206 extend forward from the third shaft 206A to the fourth shaft 206B, the seat 200 is put into a front position form. In the front position form, the height of the seat cushion 201 is lower than in the high position form. As shown in FIG. 33, in the front position form, the seat 200 can assume a folded form in which the seatback 203 and the seat cushion 201 are folded over each other.

Figure 34:
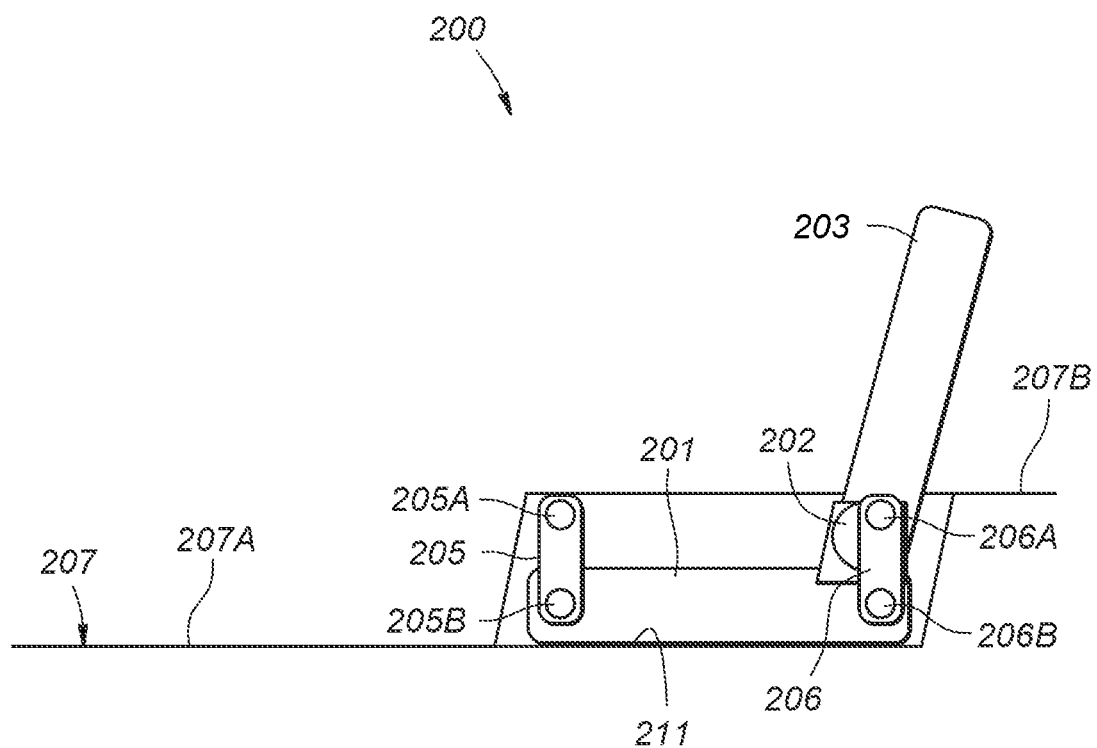
FIG. 34 is an explanatory diagram showing the seat according to the embodiment.
Figure 35:
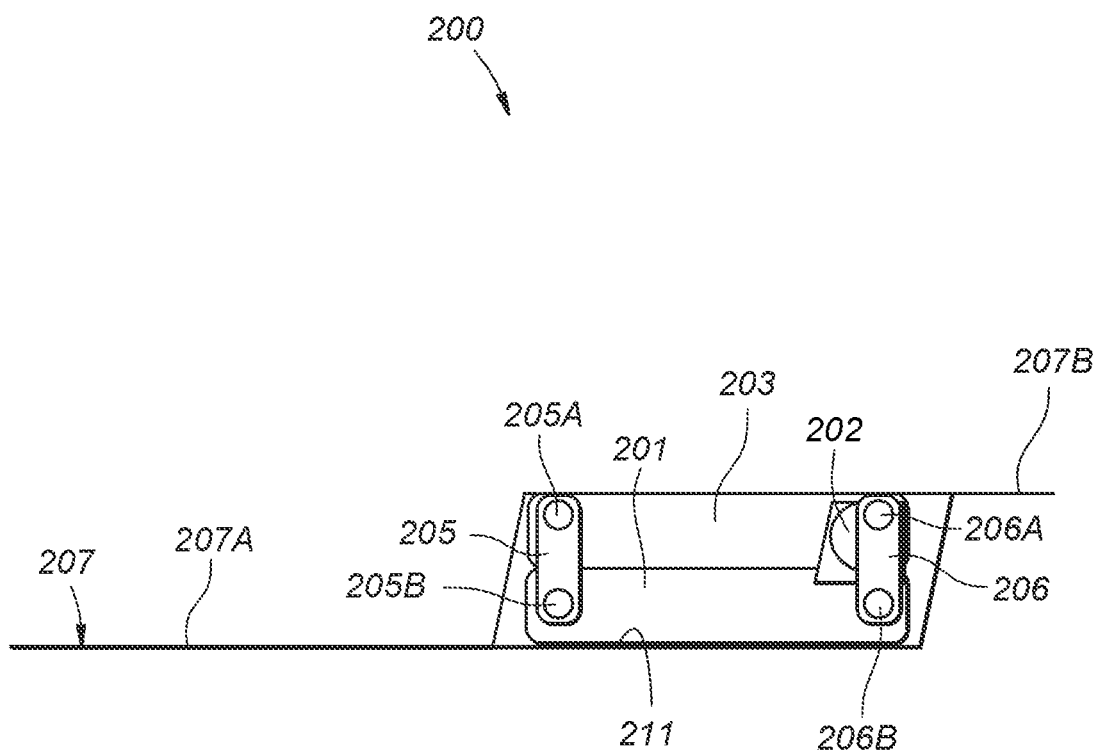
FIG. 35 is an explanatory diagram showing the seat according to the embodiment.

As shown in FIG. 34, when the front links 205 extend downward from the first shaft 205A to the second shaft 205B and the rear links 206 extend downward from the third shaft 206A to the fourth shaft 206B, the seat 200 is put into a low position form. In the low position form, the height of the seat cushion 201 is lower than in the front position form. In the low position form, the seat cushion 201 is disposed in the storage recess 211. As shown in FIG. 35, in the low position form, the seat 200 can assume a folded form in which the seatback 203 and the seat cushion 201 are folded over each other. Thereby, the seatback 203 is disposed in the storage recess 211, and the seat 200 is brought into the stowed form. In the stowed form of the seat 200, the rear surface of the seatback 203 is preferably placed on the same plane as the floor rear portion 207B.

Figure 36:
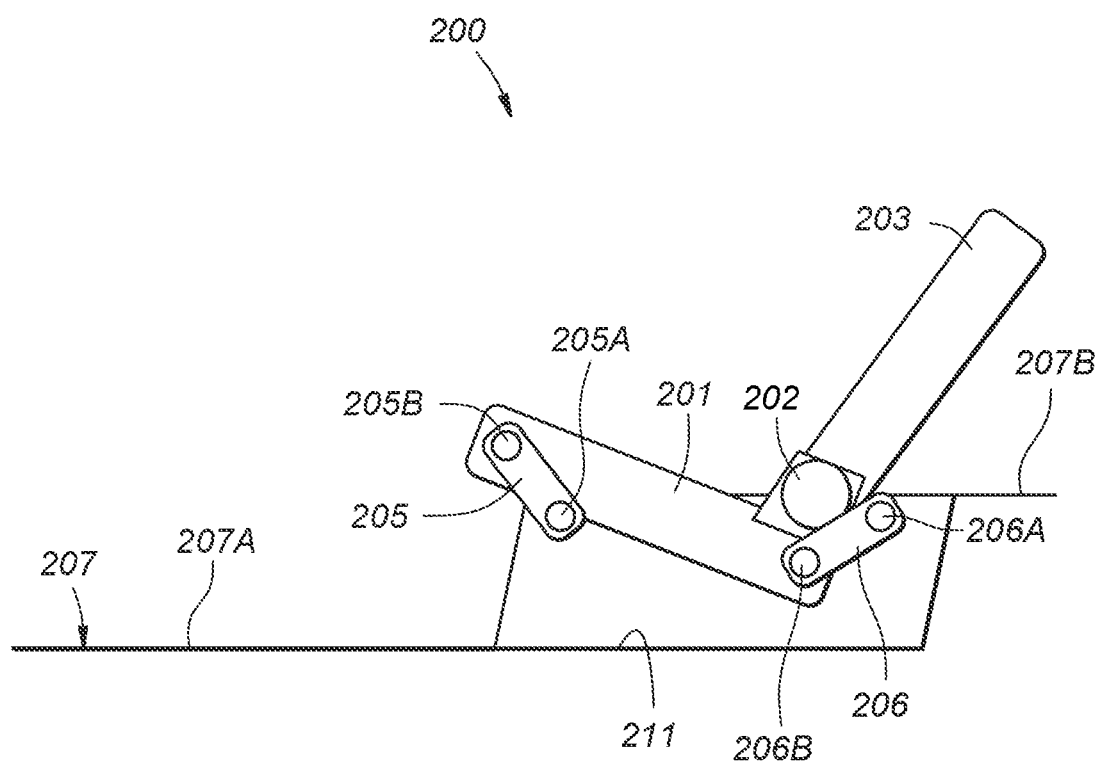
FIG. 36 is an explanatory diagram showing the seat according to the embodiment.

By making the angle of the front link 205 and the angle of the rear link 206 different from each other, it is possible to change the angle of the seat cushion 201 arbitrarily. For example, as shown in FIG. 36, when the front links 205 extend forward and upward from the first shaft 205A to the second shaft 205B and the rear links 206 extend forward and downward from the third shaft 206A to the fourth shaft 206B, the seat 200 is put into a relax form. In the relax form, the seat cushion 201 is inclined so as to become lower toward the rear.

In the seat 200, the left and right front links 205 and the left and right rear links 206 are caused to rotate by the control device 217, the front driving mechanism 215, and the rear driving mechanism 216, but the left and right front links 205 and the left and right rear links 206 may be configured to such that their angles can be adjusted by manual operation of the user.

Another embodiment relates to a tuck-in structure in a seat that includes a pad and a skin material covering the pad and is provided with a tuck-in portion, and an assembly method thereof.

In a seat such as a vehicle seat that includes a pad and a skin material covering the pad, the seating surfaces of the seat cushion and the seatback may be provided with tuck-in portions which are recessed linearly to maintain an external shape. The skin material is tucked in the tuck-in portions and is secured to engagement members fixed to the pad.

A tuck-in groove may have a curved portion which is curved or bent sideways as viewed from the front side of the seat. Conventionally, various efforts have been made to adapt the tuck-in structure to the tuck-in groove having a curved portion. Patent Document 2 (JPS62-066600U) describes a tuck-in structure including: a bag-shaped hanging cloth connected to a tuck-in edge part of the skin material; and a string inserted in the hanging cloth and is fixed in the tuck-in groove, wherein a part of the hanging cloth inserted in a curved portion of the tuck-in groove is provided with a cutout. Since the bag-shaped hanging cloth has a cutout in a position corresponding to the curved portion, a difference in length between the inner side and the outer side of the bag-shaped hanging cloth is adjusted, so that no wrinkles occur in the hanging cloth. Also, Patent Document 3 (JPH2-092800U) describes a tuck-in structure including: clips fixed to a bottom portion of a tuck-in groove of a pad; and a tuck-in member having a first edge part connected to a tuck-in edge part of the skin material by sewing and a second edge part configured to be engaged with the clips, wherein a slit is provided in the first edge part. Due to the slit, the tuck-in member can be bent to conform to the curved portion.

In the tuck-in structure described in Patent Document 2, since the string is not fixed to the hanging cloth, the hanging cloth may slip relative to the string in the longitudinal direction (extension direction) of the tuck-in groove during assembly of the tuck-in structure, whereby the tuck-in edge part of the skin material may be installed in a position shifted from the correct position. In the tuck-in structure described in Patent Document 3, since it is necessary to provide a slit, the work efficiency is poor. In addition, since the second edge part has a stiffness capable of being engaged with the clips, the second edge part is difficult to bend, and it is difficult to connect the tuck-in member in a bent state to the tuck-in edge part of the skin material by sewing or the like.

In view of such problems, an object of the present disclosure is to provide a tuck-in structure having a curved portion and an assembly method thereof, wherein relative positions of the components are stable and the tuck-in edge part of the skin material can be installed in a correct position of the tuck-in groove. Also, an object of one embodiment is to provide an assembly method of a tuck-in structure using a tuck-in member that is resistant to bending deformation, wherein the tuck-in member in a bent state can be easily connected to the tuck-in edge part of the skin material.

One embodiment provides a tuck-in structure (310) of a seat (301), comprising: a pad (305) having a tuck-in groove (311) that extends along a surface so as to include a curved portion (309) which is bent or curved; a skin material (306) including a tuck-in edge part (312) that extends along a longitudinal direction of the tuck-in groove (311) in a section of the tuck-in groove (311) including the curved portion (309) and covers the surface of the pad (305); a loop member (313) connected to the tuck-in edge part (312); an engagement member (314) fixed to the pad (305) at a bottom portion of the tuck-in groove (311); and a tuck-in member (315) which is inserted in the loop member (313, 330) and is engaged with the engagement member (314) to secure the tuck-in edge part (312) to the engagement member (314), wherein the tuck-in member (315) includes a first edge part (319) which is cloth-like and a second edge part (320) which is engaged with the engagement member (314) and has a higher bending stiffness than the first edge part (314), and the first edge part (314) is connected to the loop member (313, 330).

According to this configuration, since the loop member is connected to the tuck-in edge part and the tuck-in member is connected to the loop member, the position of the tuck-in member relative to the loop member and the tuck-in edge part becomes stable, and the tuck-in edge part can be installed in the correct position of the tuck-in groove.

One embodiment is characterized by that, in the above configuration, the loop member (313) includes a bag-shaped cloth which extends in the longitudinal direction and has a cutout portion (321) in which the second edge part (320) and/or the engagement member (314) is inserted.

According to this configuration, the engagement member is directly engaged with the second edge part without the cloth of the loop member therebetween, and thus, the loop member does not hinder the engagement between the engagement member and the second edge part.

One embodiment is characterized by that, in the above configuration, a position and a size of the cutout portion (321) are defined so as to expose a part of the engagement member (314) that is engaged with the second edge part (320).

According to this configuration, the cloth of the loop member does not obstruct the work of engaging the second edge part with the engagement member, and thus workability is not impaired even when the loop member is used.

One embodiment is characterized by that the first edge part (319) is connected to the loop member (313) by sewing to be continuous along the longitudinal direction.

According to this configuration, mutual connection between the first edge part and the loop member becomes firm by continuous sewing.

One embodiment is characterized by that, in the above configuration, a sewing line (322) for connection of the first edge part (319) to the loop member (313) crosses the cutout portion.

According to this configuration, since the sewing line crosses the cutout portion, checking of the mutually connected state of the first edge part and the loop member is easy.

One embodiment is characterized by that, instead of the above configuration, the sewing line for the connection of the first edge part to the loop member is provided at an edge part of the cutout portion on a side of the skin material or at a part slightly shifted therefrom toward the skin material.

According to this configuration, since the first edge part and the loop member are sewn continuously, the mutual connection between the first edge part and the loop member becomes firm.

One embodiment is characterized by that, in the above first configuration, the loop member (330) includes multiple tape cloths, and the multiple tape cloths are connected to the tuck-in edge part (312) by sewing to be spaced apart from one another in the longitudinal direction so as to define a cutout portion (331) that exposes the second edge part (320) from the loop member (330).

According to this configuration, by arranging the cutout portion to correspond to the most bent part or the center of bending in the longitudinal direction, the first edge part and the loop member can be sewn to avoid the most bent part, whereby the connecting work becomes easy.

One embodiment is characterized by that, in any one of the above configurations, the first edge part (319) has a color different from the loop member (13, 30).

According to this configuration, since the color of the first edge part exposed from the cutout portion is different from the color of the loop member, visibility of the first edge part is enhanced, and workability improves.

One embodiment is characterized by that, in any one of the above configurations, the section of the tuck-in groove (311) includes a straight portion (308), the tuck-in edge part (312) includes a straight section (323) which is tucked in the straight portion (308), the tuck-in structure (310) of the seat (301) further comprises a straight portion tuck-in member (324) engaged with the engagement member (314) to secure the straight section (323) to the engagement member (314), the straight portion tuck-in member (324) includes a straight portion first edge part (325) which is cloth-like and a straight portion second edge part (326) having a stiffness capable of being engaged with the engagement member (314), and the straight portion first edge part (325) is directly connected to the straight section (323).

According to this configuration, in the straight section, the straight portion tuck-in member is directly connected to the tuck-in edge part without using the loop member, and thus, an increase in the number of components can be suppressed.

One embodiment provides an assembly method of a tuck-in structure (310) of a seat (301), wherein the tuck-in structure comprises: a pad (305) having a tuck-in groove (311) that extends along a surface so as to include a curved portion (309) which is bent or curved; a skin material (306) including a tuck-in edge part (312) that extends along a longitudinal direction of the tuck-in groove (311) in a section of the tuck-in groove (311) including the curved portion (309) and covers the surface of the pad (305); a loop member (313) connected to the tuck-in edge part (312); an engagement member (314) fixed to the pad (305) at a bottom portion of the tuck-in groove (311); and a tuck-in member (315) including a first edge part (319) which is cloth-like and a second edge part (320) which has a stiffness capable of being engaged with the engagement member (314) to secure the tuck-in edge part (312) to the engagement member (314) and has a higher bending stiffness than the loop member (13, 30) and the first edge part (319), the assembly method comprising: a step of connecting the loop member (313, 330) to the tuck-in edge part (312) so as to form a ring shape around the longitudinal direction and to have an opening (316) on at least one side of the longitudinal direction; a step of inserting the tuck-in member (315) into the loop member (313, 330) from the opening (316) such that the second edge part (320) is positioned on an opposite side of the tuck-in edge part (312) with respect to the first edge part (319); a step of connecting the first edge part (319) to the loop member (313, 330); and a step of engaging the second edge part (320) with the engagement member (314).

According to this configuration, since the loop member is connected to the tuck-in edge part and the tuck-in member is connected to the loop member, the position of the tuck-in member relative to the loop member and the tuck-in edge part becomes stable, and the tuck-in edge part can be installed in the correct position of the tuck-in groove. In addition, since the tuck-in member is connected to the loop member after the loop member is connected to the tuck-in edge part, the tuck-in member before being connected to the loop member is stable in a state bent in the loop member. Therefore, the work of connecting the tuck-in member to the loop member is easy.

Figure 37:
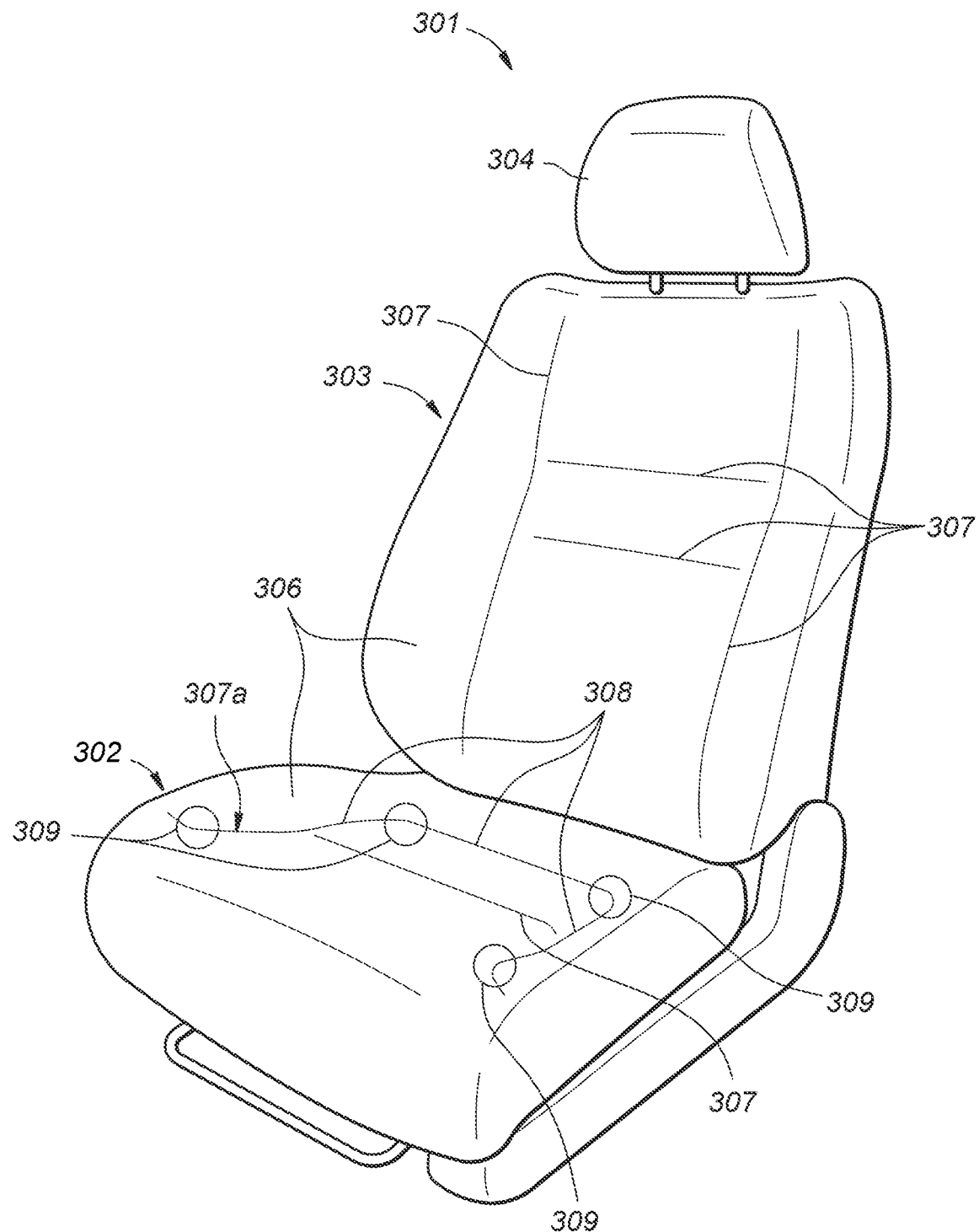
FIG. 37 is a perspective view showing a vehicle seat according to an embodiment.

FIG. 37 is a perspective view of a vehicle seat 301 according to an embodiment (hereinafter referred to as "the seat 301"). The seat 301 includes a seat cushion 302 supported on a vehicle body, a seatback 303 connected to the seat cushion 302, and a headrest 304 connected to the seatback 303. Each of the seat cushion 302, the seatback 303, and the headrest 304 includes a pad 305 (see FIG. 38) made of foamed resin, such as urethane foam, and a skin material 306 covering a seating surface side of the pad 305. The surfaces of the seat cushion 302 and the seatback 303 on the seating surface side are formed with multiple tuck-in portions 307, 307a which are recessed linearly as the skin material 306 is tucked in the pad 305. A tuck-in portion 307a which extends in the lateral direction in a rear portion of the seat cushion 302, then extends forward from both ends of the laterally extending part, and is bent laterally outward at the front end part of each forward extending part includes, as viewed in a direction perpendicular to the seating surface, straight portions 308 each extending substantially linearly and curved portions 309 each being bent or curved to a side with respect to the straight portions 308. In the illustrated example, the tuck-in portion 307a including the curved portions 309 is provided on the seat cushion 302, but it may be provided on the seatback 303.

Figure 38:
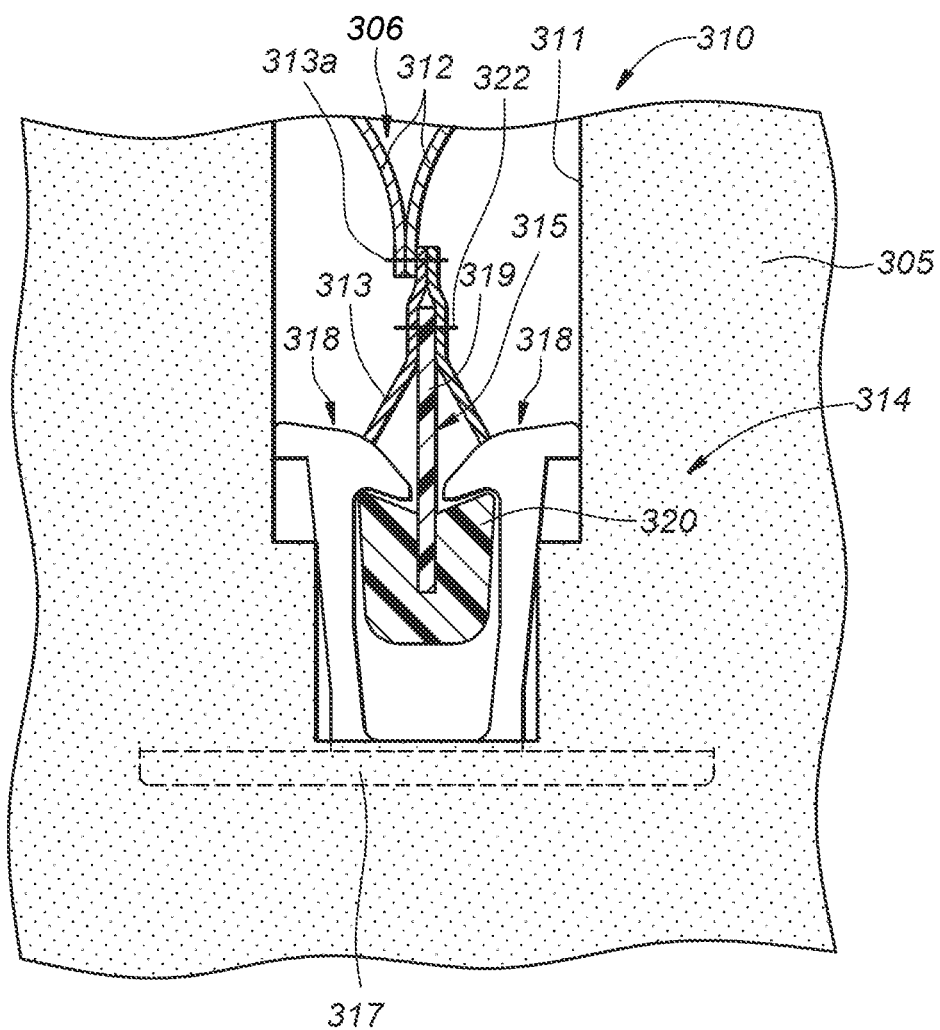
FIG. 38 is a sectional view of a tuck-in structure according to the embodiment.

FIG. 38 shows a tuck-in structure 310 of the seat 301 according to the embodiment. The tuck-in structure 310 includes: a pad 305 having a tuck-in groove 311 extending along the surface thereof so as to include a curved portion 309 (see FIG. 37) that is bent or curved; a skin material 306 which includes a tuck-in edge part 312 extending in a section of the tuck-in groove 311 including the curved portion 309 along the longitudinal direction of the tuck-in groove 311 (in the following, "the longitudinal direction" means the longitudinal direction (extension direction including the curved portion 309) of the tuck-in groove 311, except as otherwise mentioned) and covers the surface of the pad 305; a loop member 313 disposed on the tuck-in edge part 312; an engagement member 314 fixed to the pad 305 at the bottom portion of the tuck-in groove 311; and a tuck-in member 315 inserted in the loop member 313 and engaged with the engagement member 314 to secure the tuck-in edge part 312 to the engagement member 314.

The pad 305 is made of foamed resin such as urethane foam. The tuck-in groove 311 opens toward the seating surface.

The tuck-in edge part 312 of the skin material 306 is formed by bringing the edge parts of two sheets of the skin material 306 into contact with each other in a mutually aligned relationship, and connecting them by sewing or the like. Note that the tuck-in edge part 312 may be formed by folding one sheet of the skin material 306 so as to form a trough having an open side facing upward, and connecting the mutually contacting portions thereof by sewing or the like.

As shown in FIG. 39, the loop member 313 is constituted of a bag-shaped cloth having an opening 316 on each both end portion in the longitudinal direction. The loop member 313 is connected to the tuck-in edge part 312 along the longitudinal direction by sewing or the like (a reference sign "313a" indicates a sewing line). The size of the opening 316 is set such that the tuck-in member 315 can be inserted into the loop member 313. The two end portions of the loop member 313 in the longitudinal direction are inclined such that the distance between the two end portions of the loop member 313 in the longitudinal direction becomes shorter from the side of the tuck-in edge part 312 toward the bottom portion of the tuck-in groove 311.

The engagement member 314 is a clip including a base plate 317 embedded in the bottom portion of the tuck-in groove 311 and a pair of locking claws 318 extending from the base plate 317 into the tuck-in groove 311. The engagement member 314, which consists of a clip, is embedded in the pad 305 when foaming the pad 305.

As shown in FIG. 38, the tuck-in member 315 includes a first edge part 319 constituted of a cloth-like member such as a nonwoven fabric and extending in the longitudinal direction to be connected to the loop member 313 by sewing or the like and a second edge part 320 made of resin or the like, extending in the longitudinal direction, and connected to an end portion of the first edge part 319 on the side of the tuck-in groove 311. The tuck-in member 315 extends linearly when no force is applied, but can undergo bending deformation. To be engaged with the locking claws 318 of the engagement member 314, the second edge part 320 swells on both sides of the first edge part 319 in the thickness direction thereof and has an enough stiffness to enable the engagement with the locking claws 318. The second edge part 320 has a higher bending stiffness than the loop member 313 and the first edge part 319. The second edge part 320 is made by injection molding, and the first edge part 319 is connected to the second edge part 320 by being set in a cavity of a mold when molding the second edge part 320. Note that when making the first edge part 319 and the second edge part 320 of the same resin, the tuck-in member 315 may be made by extrusion molding.

Figure 40:
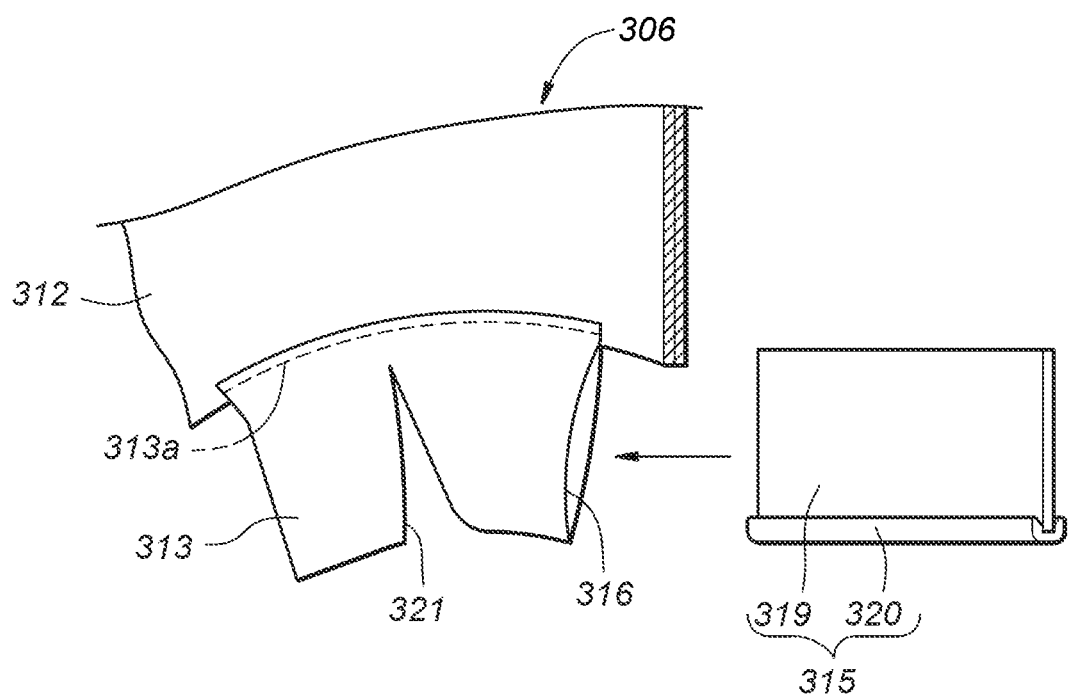
FIG. 40 is an explanatory diagram showing an assembly method of the tuck-in structure according to the embodiment.
Figure 41:
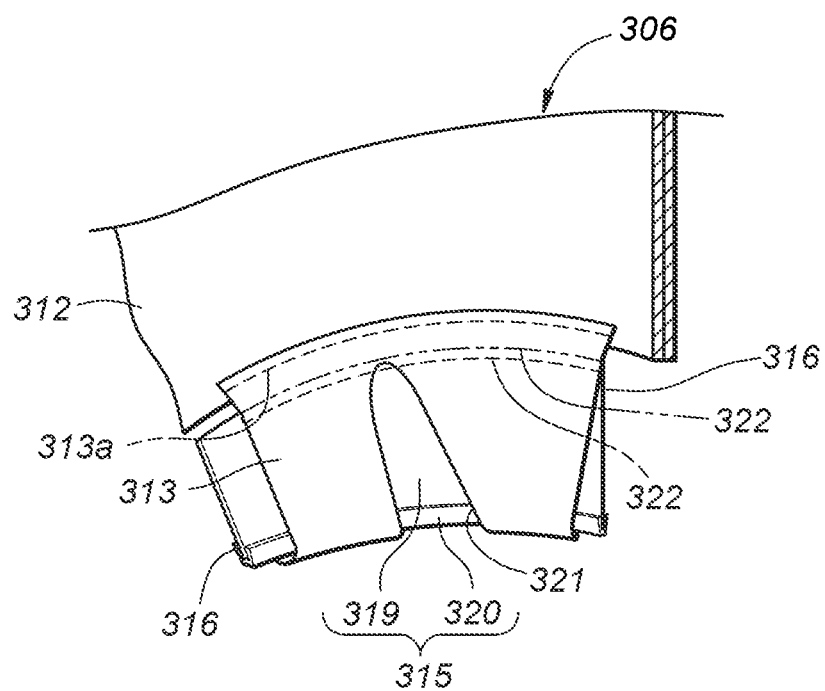
FIG. 41 is an explanatory diagram showing the assembly method of the tuck-in structure according to the embodiment.

As shown in FIGS. 39 to 41, to allow the second edge part 320 to be directly engaged with the engagement member 314, the loop member 313 has a cutout portion 321 on the side opposite from the connecting part with the tuck-in edge part 312. The engagement member 314 is inserted in the cutout portion 321 and is engage with the second edge part 320. Note that, instead of or in addition to the engagement member 314 being inserted in the cutout portion 321, configuration may be made such that the second edge part 320 is partially inserted in the cutout portion 321. The cutout portion 321 is provided in a position corresponding to the curved portion 309.

The position and the size of the cutout portion 321 are preferably defined so as to expose the part where the engagement member 314 is engaged with the second edge part 320 and to expose a portion of the first edge part 319 adjacent to the second edge part 320. In this case, it is preferred that the first edge part 319 has a color different from the loop member 313. A sewing line 322 for connecting the first edge part 319 to the loop member 313 may extend in the longitudinal direction to cross the cutout portion 321 (the line indicated by a broken line in FIGS. 39 and 41), and may be provided at the edge part of the cutout portion 321 on the side of the skin material 306 or at a part slightly shifted therefrom toward the skin material 306 (the line indicated by a two-dot chain line in FIGS. 39 and 41). The sewing line 322 may be continuous or discontinuous in the longitudinal direction.

As shown in FIG. 39, the tuck-in edge part 312 includes not only the curved portion 309 but also a straight section 323 corresponding to the straight portion 308. A straight portion tuck-in member 324 is connected to the straight section 323. The straight portion tuck-in member 324 includes a straight portion first edge part 325 which is cloth-like and a straight portion second edge part 326 which is engaged with the engagement member 314. The straight portion first edge part 325 is directly connected to the straight section 323 of the tuck-in edge part 312 by suture or the like. A reference sign 327 indicates the sewing line thereof. The straight portion second edge part 326 is joined to an edge of the straight portion first edge part 325 on the side of the tuck-in groove 311. To be engaged with the locking claws 318 of the engagement member 314, the straight portion second edge part 326 swells on both sides of the straight portion first edge part 325 in the thickness direction thereof and has an enough stiffness to enable the engagement with the locking claws 318. The straight portion second edge part 326 has a higher bending stiffness than the straight portion first edge part 325. The straight portion tuck-in member 324 may be a member having the same configuration as the tuck-in member 315.

With reference to FIGS. 38 to 41, an assembly method of the tuck-in structure 310 is described. First, as shown in FIG. 39, the worker connects the straight portion tuck-in member 324 to the straight section 323 of the tuck-in edge part 312 by sewing or the like, and then, as shown in FIG. 40, directly connects the loop member 313 to the part of the tuck-in edge part 312 corresponding to the curved portion 309 (see FIG. 39) by sewing or the like. Next, the worker inserts the tuck-in member 315 into the loop member 313 through the opening 316. The tuck-in member 315 is inserted in the loop member 313 so that the second edge part 320 is positioned on the opposite side from the tuck-in edge part 312 with respect to the first edge part 319. Subsequently, as shown in FIG. 41, the worker connects the first edge part 319 and the loop member 313 to each other by sewing or the like. Then, as shown in FIGS. 38 and 39, the worker inserts the tuck-in edge part 312 into the tuck-in groove 311, makes the second edge part 320 engaged with the engagement member 314 in the curved portion 309, and makes the straight portion second edge part 326 engaged with the engagement member 314 in the straight portion 308. Note that in the above procedure, the step of connecting the straight portion tuck-in member 324 to the tuck-in edge part 312 may be performed any time before the engagement with the engagement member 314.

The operation and effect of the above embodiment will be described.

Since the first edge part 319 is connected to the loop member 313 by sewing or the like, the tuck-in member 315 is maintained in position with respect to the loop member 313 and the tuck-in edge part 312, and thus, the tuck-in edge part 312 can be installed in the right position of the tuck-in groove 311. Particularly, in the case where the sewing line 322 is continuous in the longitudinal direction, the tuck-in member 315 is made even more difficult to shift in the longitudinal direction relative to the loop member 313.

Since the tuck-in member 315 is connected to the loop member 313 after the loop member 313 is connected to the tuck-in edge part 312, the tuck-in member 315 before being connected to the loop member 313 is stable in a state bent in the loop member 313. Therefore, the work of connecting the tuck-in member 315 to the loop member is easy.

Since the loop member 313 has the cutout portion 321, the second edge part 320 of the tuck-in member 315 is directly engaged with the engagement member 314 through the cutout portion 321. This engagement is stronger compared to when the engagement is made via the cloth of the loop member 313. Since the position and the size of the cutout portion 321 are defined so as to expose the part where the engagement member 314 is engaged with the second edge part 320, the work of engaging the second edge part 320 with the engagement member 314 is not obstructed by the cloth of the loop member 313 and thus is easy. Since the color of the first edge part 319 exposed from the cutout portion 321 is different from the color of the loop member 313, visibility of the first edge part 319 exposed from the cutout portion 321 is enhanced, and workability improves.

In the case where the sewing line 322 crosses the cutout portion 321, checking of the mutually connected state of the first edge part 319 and the loop member 313 is easy. Also, in the case where the sewing line 322 does not cross the cutout portion 321 and instead passes the edge part of the cutout portion 321 or the vicinity thereof, the mutual connection between the first edge part 319 and the loop member 313 becomes firm.

In the straight section 323, the straight portion tuck-in member 324 is directly connected to the tuck-in edge part 312 without using the loop member 313, and thus, an increase in the number of components can be suppressed.

Figure 42:
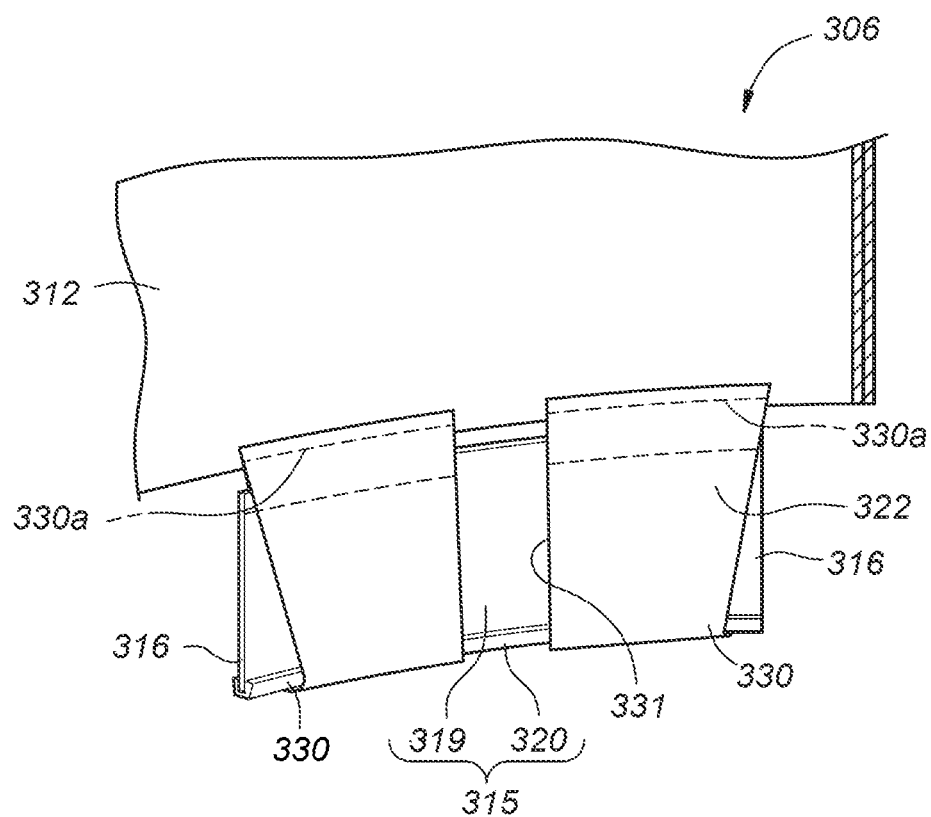
FIG. 42 is a perspective view showing a loop member according to a modification of the embodiment.

With reference to FIG. 42, a loop member 330 according to a modification of the above embodiment is described. In the following description, configurations common to the above embodiment are denoted by identical reference signs and the description thereof will be omitted.

Two loop members 330 are connected to the tuck-in edge part 312. Each loop member 330 includes a tape cloth. With the two end portions of the tape cloth in the vertical direction placed to overlap each other and connected to the tuck-in edge part 312 by sewing or the like, the loop member 330 is formed in a loop shape, with the opening 316 being formed on each side thereof in the longitudinal direction (the lateral direction of the tape cloth). A reference sign 330a indicates a sewing line for connecting the loop member 330 to the tuck-in edge part 312. The two end portions of each loop member 330 in the longitudinal direction are inclined such that the distance between the two end portions of each loop member 330 in the longitudinal direction becomes shorter from the side of the tuck-in edge part 312 toward the bottom portion of the tuck-in groove 311 (see FIG. 38).

The two loop members 330 are disposed at a predetermined spacing in the longitudinal direction, and therefore, the spacing between the two loop members 330 forms a cutout portion 331 that expose the tuck-in member 315. The tuck-in member 315 is received in the loop members 330 at two ends thereof in the longitudinal direction and is exposed from the loop members 330 at the central part in the longitudinal direction.

By arranging the cutout portion 331 to correspond to the most bent part or the center of bending in the longitudinal direction, the work of connecting the first edge part 319 and the loop member 330 by sewing or the like can be performed to avoid the most bent part, whereby the connecting work becomes easy.

The present embodiment can be applied not only to road vehicle seats, but also to other vehicle seats and seats for use in houses and the like, as long as the seat includes a pad and a skin material.

In the following, an embodiment of a vehicle seat is described. Patent Document 4 (JP2019-104315A) discloses a monitor device provided in a vehicle cabin. The monitor device is connected to a computer of the vehicle. The monitor device is movably supported in the cabin. The monitor device includes a supporting column which can be inclined relative to the floor and a touch panel display supported by the supporting column via a link mechanism. However, there is a problem that, in the case where the seat is movably provided in the cabin, the monitor device may be placed distant from the seat so that the operation thereof becomes difficult. Also, there is a problem that the monitor device may limit the movement range of the seat.

To solve the above problems, a vehicle seat according to an embodiment is provided, on the rear surface of the seatback thereof, with an operation switch for operating various predetermined devices installed in the vehicle. The vehicle includes multiple vehicle seats in the cabin. The operation switch is provided on the rear surface of the seatback of at least one vehicle seat.

The operation switch preferably is a touch panel for receiving a touch operation of an occupant. Each vehicle seat includes a movement mechanism that can move or rotate in a predetermined direction on the floor surface of the vehicle. In the first seat arrangement, the rear surface of the seatback of one of the multiple vehicle seats is positioned to the left or right side of another one of the multiple vehicle seats.

The movement mechanism includes a rail provided on the floor surface, a slider which is slidingly movable relative to the rail, and a rotating member which is rotatable about an axis extending in the up-down direction through the slider. The rotating member is joined to the seat cushion.

The seatback of the vehicle seat with the operation switch is provided to be pivotable relative to the seat cushion. Therefore, the angle of the operation switch can be adjusted.

The devices that can be operated by the operation switch include a height adjustment device and a reclining angle adjustment device of the vehicle seat, an air conditioner, an audio system, a car navigation system, a lighting system, etc. of the vehicle. A side wall configuring the vehicle cabin may be provided with a display. When the vehicle seat is disposed to face the display on the side wall, the operation switch may receive an operation related to the operation of the display.

The vehicle seat may have a headrest speaker on the headrest. In this case, the sound volume of the headrest speaker can be changed with the operation switch. The touch panel is provided on an upper portion of the seatback rear surface. A lower portion of the seatback rear surface constitutes a footrest. By folding the seatback over the seat cushion, the footrest faces upward. The user seated on a certain vehicle seat can preferably place the legs on the footrest of another vehicle seat that is folded.

Patent Document 5 (JP2020-192829A) discloses a mobile cabin set including a rail arranged on a wall surface defining an interior space of a moving body, and an attachment, such as a seat and a table, that can be attached to and detached from the rail. However, it does not take into account adjustment of the attachment in the height direction. Therefore, there is a problem with regard to the ease of use for occupants and securing of a living space.

To solve the above problems, a vehicle seat according to an embodiment includes a seat part mounted on a cabin-side wall portion of a vehicle so as to be movable in the up-down direction along the wall portion. An interior trim configuring the wall portion of the vehicle may constitute a backrest for the seat part. Also, a seatback having an upper end part mounted on the cabin-side wall portion of the vehicle via a rotating part that rotates about a rotation axis extending in the horizontal direction may be further provided.

The height of the seat part can be adjusted. The seat part may function as a table for a user seated on another vehicle seat. Preferably, the another vehicle seat is movably supported on the floor surface of the vehicle via a movement mechanism. The movement mechanism preferably supports the vehicle seat to be slidingly movable relative to the floor surface. Also, the movement mechanism preferably supports the vehicle seat to be pivotable relative to the floor surface.

The seat part is preferably mounted on the wall portion such that the seating surface angle is adjustable. When the tip end portion of the seating surface is raised, the seat part is brought into a seating form suitable for the user to be seated. Also, when the seating surface is placed horizontally, the seat part is brought into a table form suitable as a table. When switching from the seating form to the table form, it is preferred that the angle of the seat part is changed as the seat part is raised.

In the case where the interior trim of the wall portion of the vehicle constitutes the backrest, the interior trim may further include an HMI such as a monitor device and a touch switch. Also, the interior trim may have a storage recess which can accommodate the seat part. Preferably, the seat part is pivotably supported on the wall portion. The seat part is preferably configured to be flipped up to the storage recess.

Figure 43:
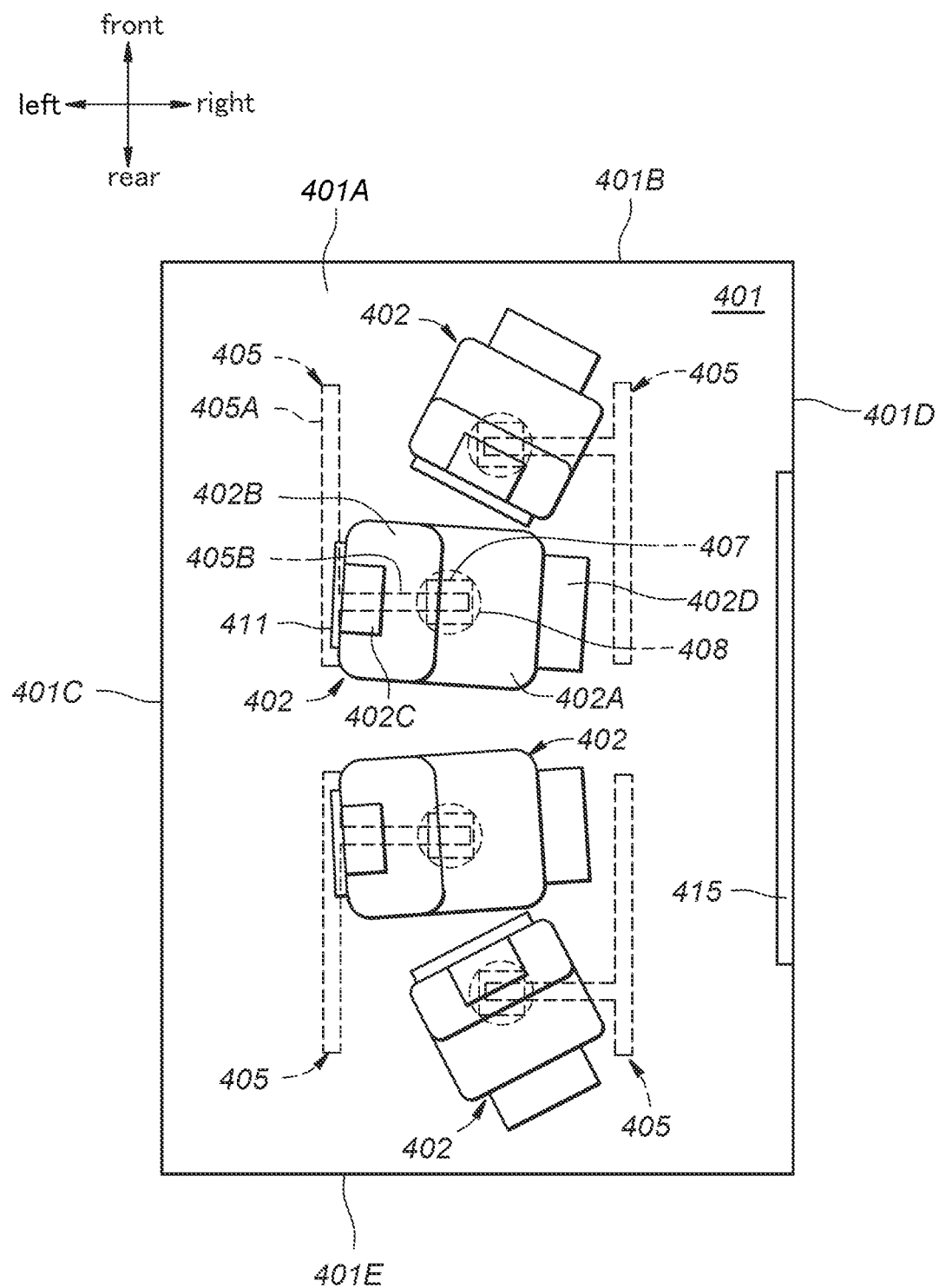
FIG. 43 is an explanatory diagram showing an arrangement of vehicle seats in a tourist mode according to an embodiment.

As shown in FIG. 43, four vehicle seats 402 are provided in a cabin 401 of an automobile. The cabin 401 is defined by a floor 401A, a front wall 401B, a left wall 401C, a right wall 401D, a rear wall 401E, and a roof. The front wall 401B is preferably provided with a front windshield. The left wall 401C and the right wall 401D are preferably provided with doors. Also, the rear wall 401E is preferably provided with a tailgate.

Each vehicle seat 402 includes a seat cushion 402A, a seatback 402B pivotably joined to the rear portion of the seat cushion 402A, a headrest 402C provided at the upper end of the seatback 402B, and an ottoman 402D provided on the front portion of the seat cushion.

Four rails 405 are provided on the floor 401A. Each rail 405 includes a main rail 405A extending in the fore and aft direction and a sub-rail 405B branching from the main rail 405A to extend laterally. The rails 405 may be disposed on the upper surface of the floor 401A or may be disposed in the recesses formed in the floor 401A.

In the present embodiment, the main rail 405A of the front left rail 405 and the main rail 405A of the rear left rail 405 are disposed on the same straight line extending in the fore and aft direction. The main rail 405A of the front right rail 405 and the main rail 405A of the rear right rail 405 are disposed on the same straight line extending in the fore and aft direction. In the front left rail 405, the sub-rail 405B extends rightward from a rear portion of the main rail 405A. In the front right rail 405, the sub-rail 405B extends leftward from a front portion of the main rail 405A. In the rear left rail 405, the sub-rail 405B extends rightward from a front portion of the main rail 405A. In the rear right rail 405, the sub-rail 405B extends leftward from a rear portion of the main rail 405A. The sub-rail 405B of the front left rail 405 is disposed rearward of the sub-rail 405B of the front right rail 405. The sub-rail 405B of the rear left rail 405 is disposed forward of the sub-rail 405B of the rear right rail 405.

Each rail 405 supports a slider 407 to be slidingly movable. The slider 407 can slidingly move along the main rail 405A and the sub-rail 405B. The seat cushion 402A is joined to an upper portion of the slider 407 via a rotation device 408. The rotation device 408 joins the seat cushion 402A to the slider 407 such that the seat cushion 402A is rotatable relative to the slider 407 about a vertically extending axis. Preferably, the rotation device 408 includes a lower member joined to the slider and an upper member joined to the lower member to be rotatable about an axis extending in the up-down direction and joined to the seat cushion 402A.

Figure 44:
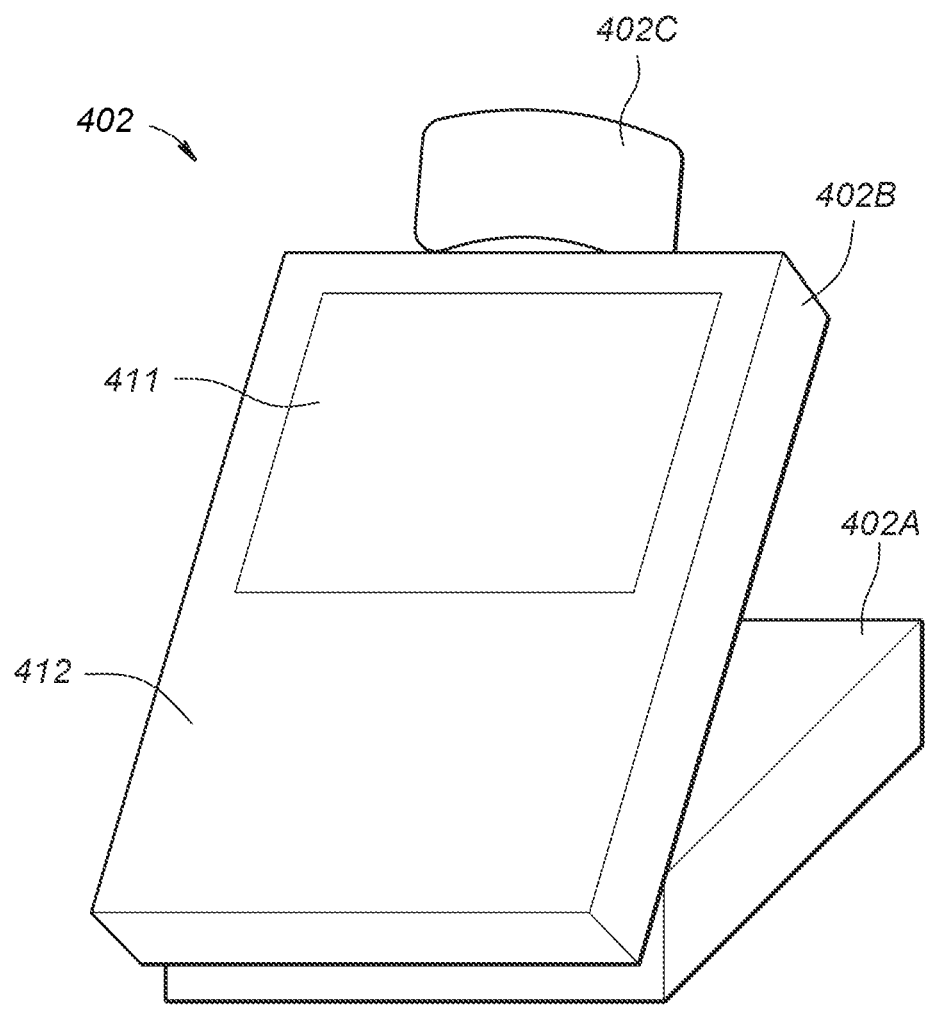
FIG. 44 is a perspective view of the vehicle seat as seen from a rear side.

As shown in FIG. 44, an upper portion the rear surface of each seatback 402B is provided with a touch panel display 411 constituting an operation switch. The devices that can be operated by the touch panel display 411 include a height adjustment device and a reclining angle adjustment device of the vehicle seat 402 and an air conditioner, an audio system, a car navigation system, a lighting system, etc. of the vehicle. Preferably, the touch panel display 411 displays an HMI (human machine interface) for operating the various devices.

A lower portion of the rear surface of each seatback 402B preferably constitutes a footrest 412. The footrest 412 may be constituted by a stain-resistant skin covering the lower portion of the rear surface of the seatback 402B. Also, the footrest 412 may be constituted by a resin plate covering the lower portion of the rear surface of the seatback 402B.

Figure 45:
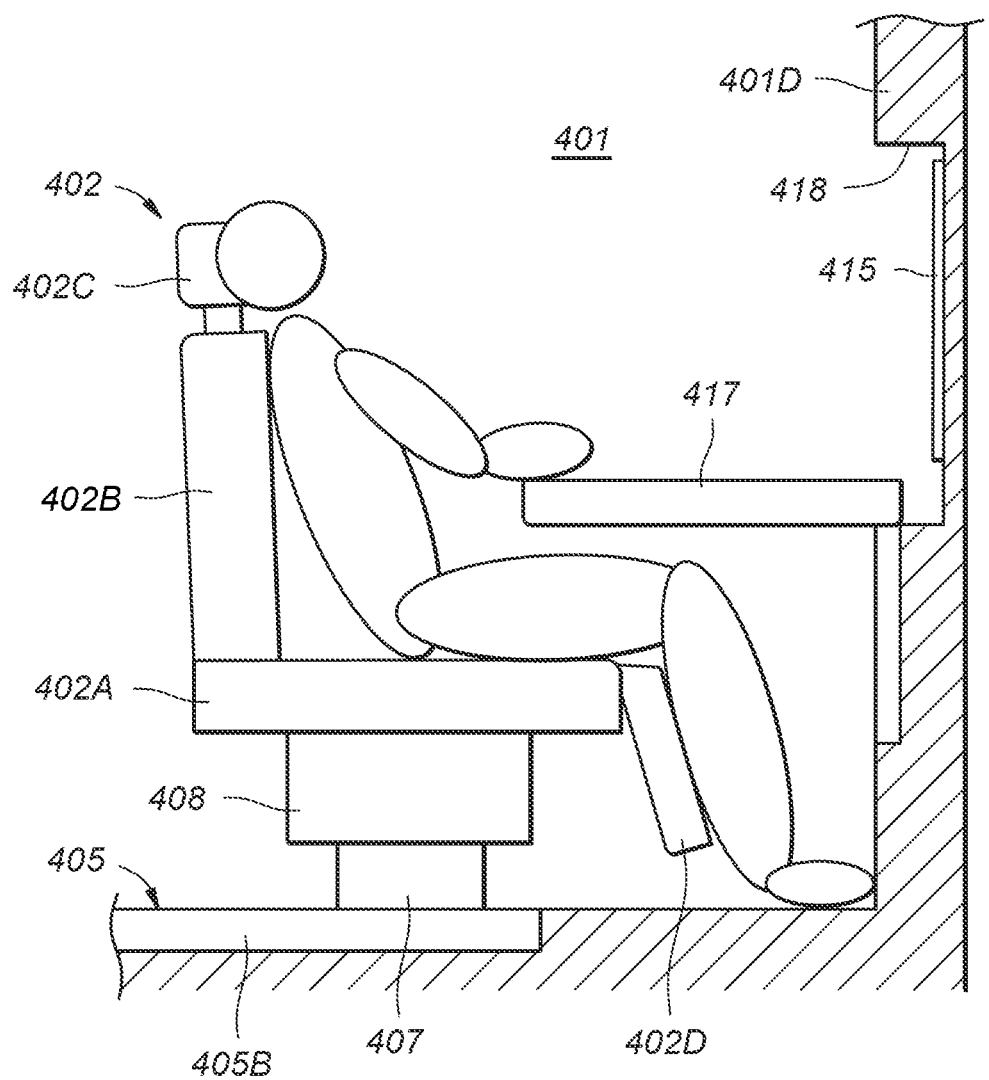
FIG. 45 is an explanatory diagram showing an example of use of the vehicle seat.

As shown in FIG. 45, at least one of the front wall 401B, the left wall 401C, the right wall 401D, and the rear wall 401E may be provided with a display 415. In the present embodiment, the right wall 401D is provided with a display 415.

At least one the front wall 401B, the left wall 401C, the right wall 401D, and the rear wall 401E may be provided with a plate-shaped table 417 which protrudes toward an inboard side. Preferably, the table 417 is provided to be movable in the up-down direction relative to each wall 401B, 401C, 401D, 401E. Also, the table 417 is preferably supported on each wall 401B, 401C, 401D, 401E in a tiltable manner. Also, the table 417 is preferably supported on each wall 401B, 401C, 401D, 401E in a pivotable manner.

Preferably, each wall 401B, 401C, 401D, 401E is provided with a storage recess 418 for storing the table 417 therein. Preferably, the table 417 is pivotably supported on each wall 401B, 401C, 401D, 401E at a lower end thereof, and the storage recess 418 is provided above the table 417. The table 417 is preferably pulled upward to be stored in the storage recess 418. The display 415 may be disposed in the storage recess 418. Thereby, the display 415 is hidden when the table 417 is disposed in the storage recess 418.

The table 417 may function as a seat part on which the user is seated. By adjusting the height of the table 417, it is possible to adjust the height of the user who is seated thereon. A pad may be disposed on the upper surface of the table 417.

Figure 46:
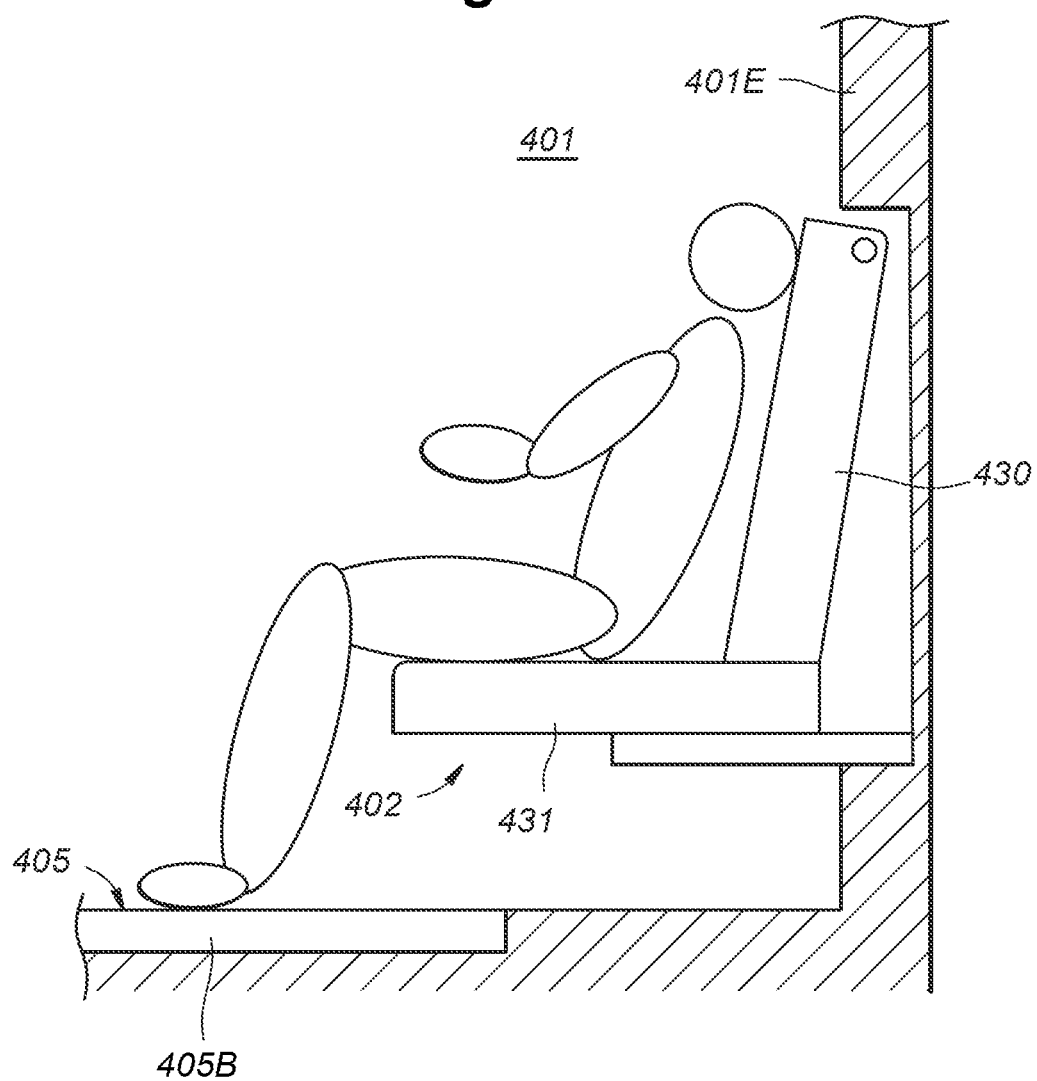
FIG. 46 is an explanatory diagram showing an example of use of the vehicle seat.

In another embodiment, as shown in FIG. 46, a seatback 430 and a seat cushion 431 may be supported on the rear wall 401E. The seatback 430 may function as a trim constituting the inner surface of the rear wall 401E. The seatback 430 is pivotably supported on the rear wall 401E at an upper end thereof so that the angle thereof relative to the rear wall 401E can be changed. Preferably, the seat cushion 431 is provided to be slidingly movable forward and backward relative to the rear wall 401E. In another embodiment, the seatback 430 may be provided on the front wall 401B, the left wall 401C, the right wall 401D.

FIG. 43 shows a seat arrangement in a tourist mode. In the tourist mode, the front left vehicle seat 402 faces rightward and is disposed at the center of the cabin 401. The rear left vehicle seat 402 is disposed behind the front left vehicle seat 402. The front right vehicle seat 402 is disposed in front of the front left vehicle seat 402. The front right vehicle seat 402 faces forward so that the touch panel display 411 on the back thereof faces the front left vehicle seat 402. The seatback 402B of the front right vehicle seat 402 is preferably tilted forward. The rear left and rear right vehicle seats 402 are arranged to be front-rear symmetrical to the front left and front right vehicle seats 402.

In the tourist mode, users are seated on the front left vehicle seat 402 and the rear left vehicle seat 402. The user seated on the front left vehicle seat 402 can operate the touch panel display 411 on the back of the front right vehicle seat 402. The user seated on the rear left vehicle seat 402 can operate the touch panel display 411 on the back of the rear right vehicle seat 402. In front of the users seated on the front left vehicle seat 402 and the rear left vehicle seat 402, the display 415 provided on the right wall 401D is disposed.

Figure 47:
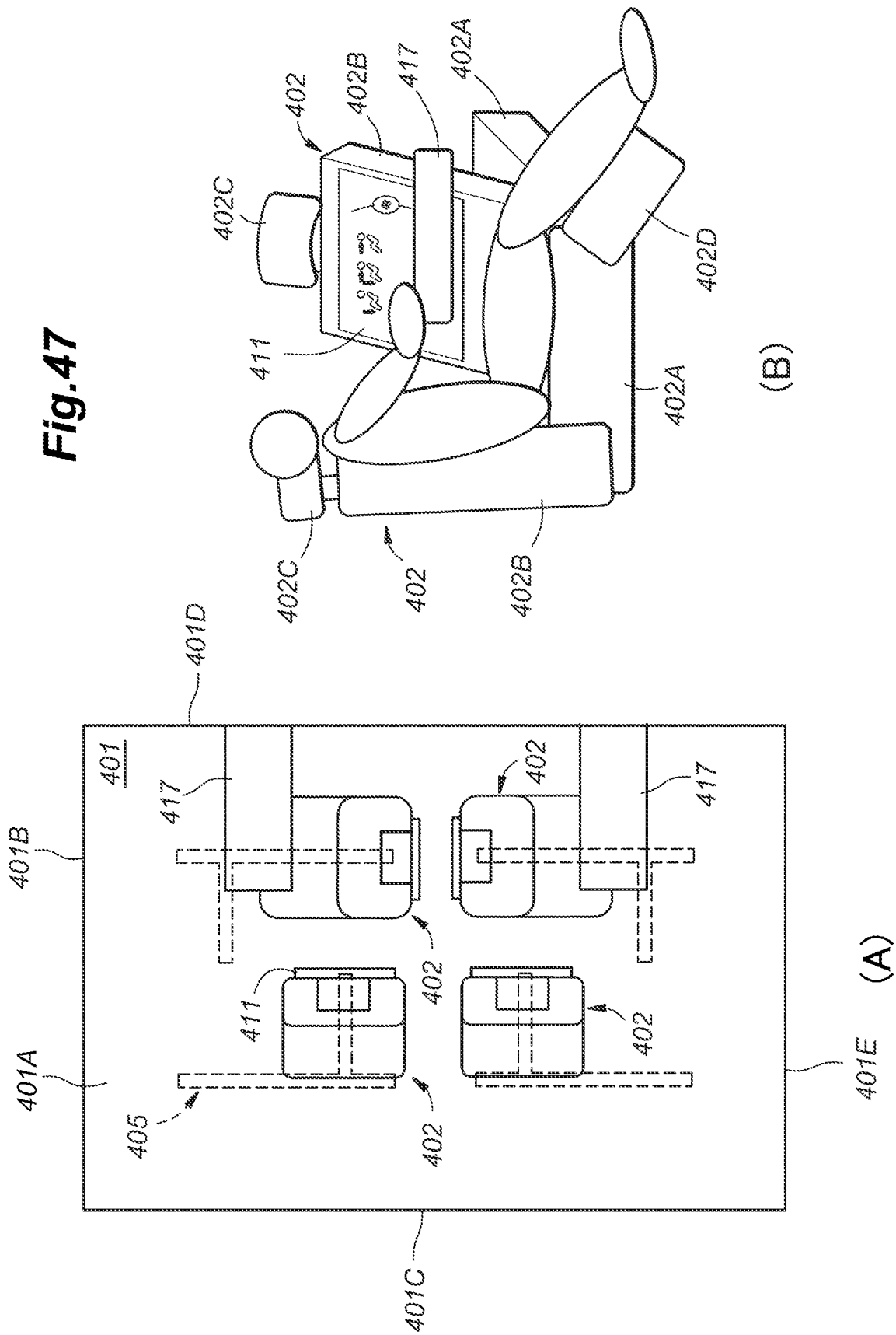
FIG. 47 is (A) an explanatory diagram showing an arrangement of vehicle seats in a work mode, and (B) an explanatory diagram showing an example of use of the vehicle seat in the work mode.

FIG. 47(A) shows a seat arrangement in a work mode. In the work mode, the front right vehicle seat 402 faces forward. In front of the front right vehicle seat 402, a table 417 extending from the right wall 401D is disposed. The front left vehicle seat 402 is disposed to the left of the front right vehicle seat 402. The front left vehicle seat 402 faces leftward so that the touch panel display 411 on the back thereof faces the front right vehicle seat 402. The seatback 402B of the front left vehicle seat 402 is preferably tilted forward. The rear left and rear right vehicle seats 402 are arranged to be front-rear symmetrical to the front left and front right vehicle seats 402.

In the work mode, users are seated on the front right vehicle seat 402 and the rear right vehicle seat 402. As shown in FIG. 47(B), the user seated on the front right vehicle seat 402 can operate the touch panel display 411 on the back of the front left vehicle seat 402. Also, the user seated on the front right vehicle seat 402 can use the table 417. The user seated on the rear right vehicle seat 402 can likewise use the touch panel display 411 on the rear left vehicle seat 402 and the table 417. In the work mode, the front right vehicle seat 402 and the rear right vehicle seat 402 face in opposite directions, and thus, the privacy of each user is enhanced.

Figure 48:
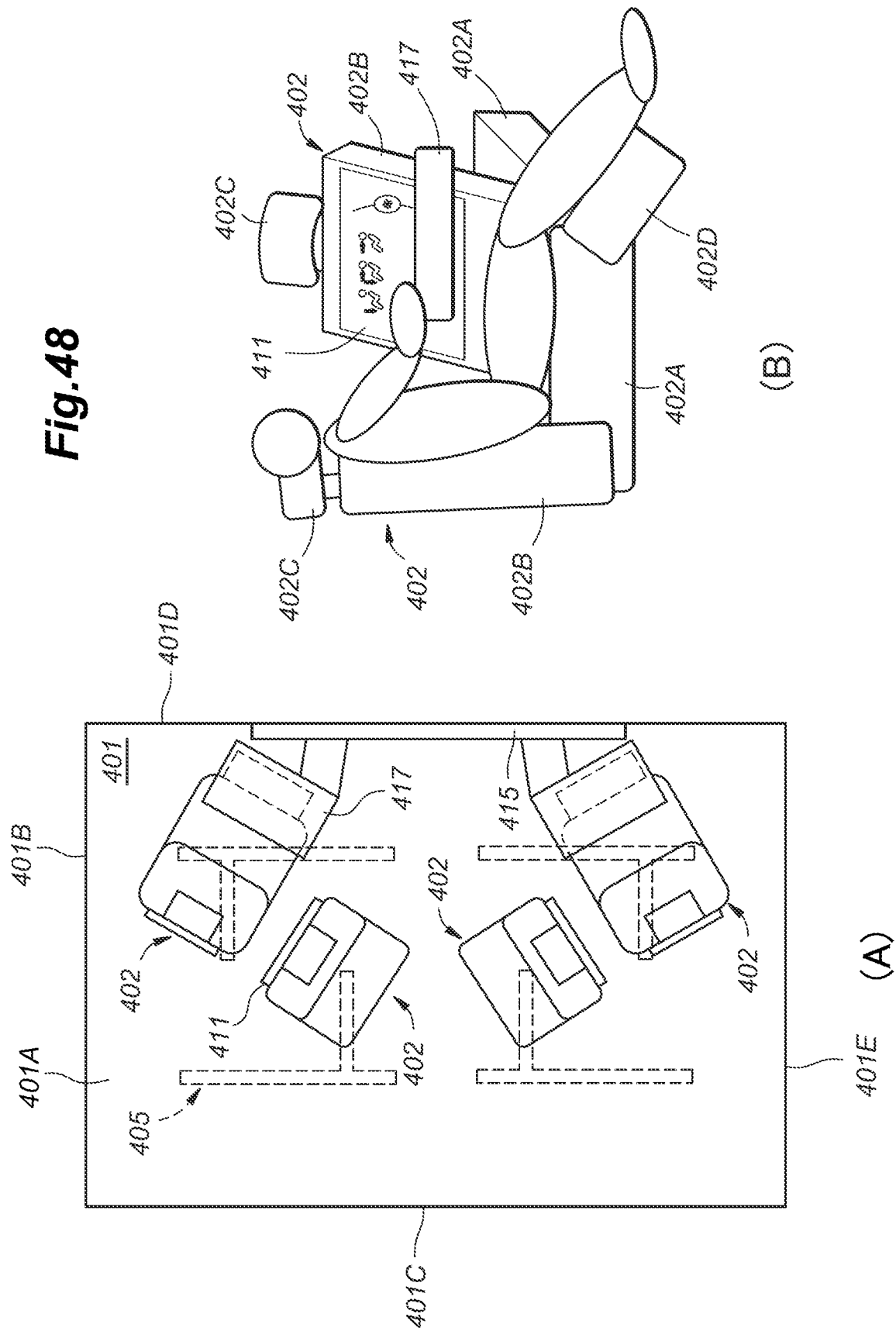
FIG. 48 is (A) an explanatory diagram showing an arrangement of vehicle seats in a twin work mode, and (B) an explanatory diagram showing an example of use of the vehicle seat the twin work mode.

FIG. 48(A) shows a seat arrangement in a twin work mode. In the twin work mode, the front left vehicle seat 402 faces rightward. In front of the front right vehicle seat 402, a table 417 extending from the right wall 401D is disposed. The front left vehicle seat 402 is disposed rearward of the front right vehicle seat 402. The front left vehicle seat 402 faces rearward so that the touch panel display 411 on the back thereof faces the front right vehicle seat 402. The seatback 402B of the front left vehicle seat 402 is preferably tilted forward. The rear left and rear right vehicle seats 402 are arranged to be front-rear symmetrical to the front left and front right vehicle seats 402.

In the twin work mode, users are seated on the front right vehicle seat 402 and the rear right vehicle seat 402. As shown in FIG. 48(B), the user seated on the front right vehicle seat 402 can operate the touch panel display 411 on the back of the front left vehicle seat 402. The user seated on the rear right vehicle seat 402 can likewise use the touch panel display 411 on the rear left vehicle seat 402. Also, the users seated on the front right vehicle seat 402 and the rear right vehicle seat 402 can view the display 415 provided on the right wall 401D. In addition, the users seated on the front right vehicle seat 402 and the rear right vehicle seat 402 can use the tables 417. In the twin work mode, the front left vehicle seat 402 and the rear left vehicle seat 402 are arranged to face the display 415, it is easy for the users to converse.

Figure 49:
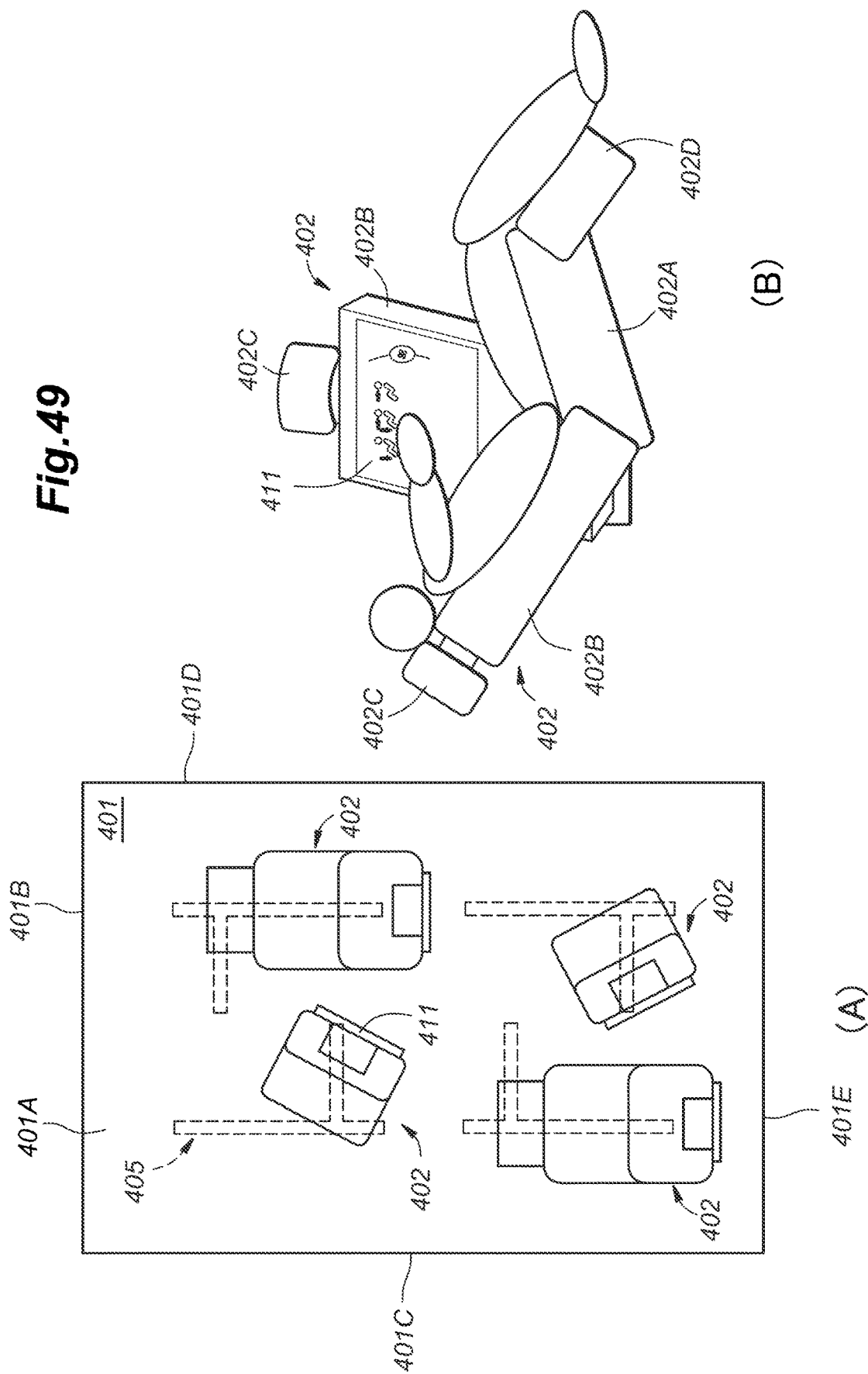
FIG. 49 is (A) an explanatory diagram showing an arrangement of vehicle seats in a rest mode, and (B) an explanatory diagram showing an example of use of the vehicle seat in the rest mode.

FIG. 49(A) shows a seat arrangement in a rest mode. In the rest mode, the front right vehicle seat 402 faces forward. Preferably, the front right vehicle seat 402 is put in a relax form. In the relax form, the seatback 402B is tilted backward, the seat cushion 402A is inclined upward toward the front, and the ottoman 402D extends forward. The front left vehicle seat 402 is disposed to the left of the front right vehicle seat 402. The front left vehicle seat 402 faces forward and leftward so that the touch panel display 411 on the back thereof faces the front right vehicle seat 402. The seatback 402B of the front left vehicle seat 402 is preferably tilted forward. The rear left and rear right vehicle seats 402 are arranged to be bilaterally symmetrical to the front left and front right vehicle seats 402.

In the rest mode, users are seated on the front right vehicle seat 402 and the rear left vehicle seat 402. As shown in FIG. 49(B), the user seated on the front right vehicle seat 402 can operate the touch panel display 411 on the back of the front left vehicle seat 402. The user seated on the rear left vehicle seat 402 likewise can use the touch panel display 411 on the rear right vehicle seat 402. In the rest mode, since the front right vehicle seat 402 and the rear left vehicle seat 402 are put in the relax form, the comfort of each user is enhanced. Also, in the rest mode, since the front right vehicle seat 402 and the rear left vehicle seat 402 on which the users are seated are far apart, the privacy of each user is enhanced.

Figure 50:
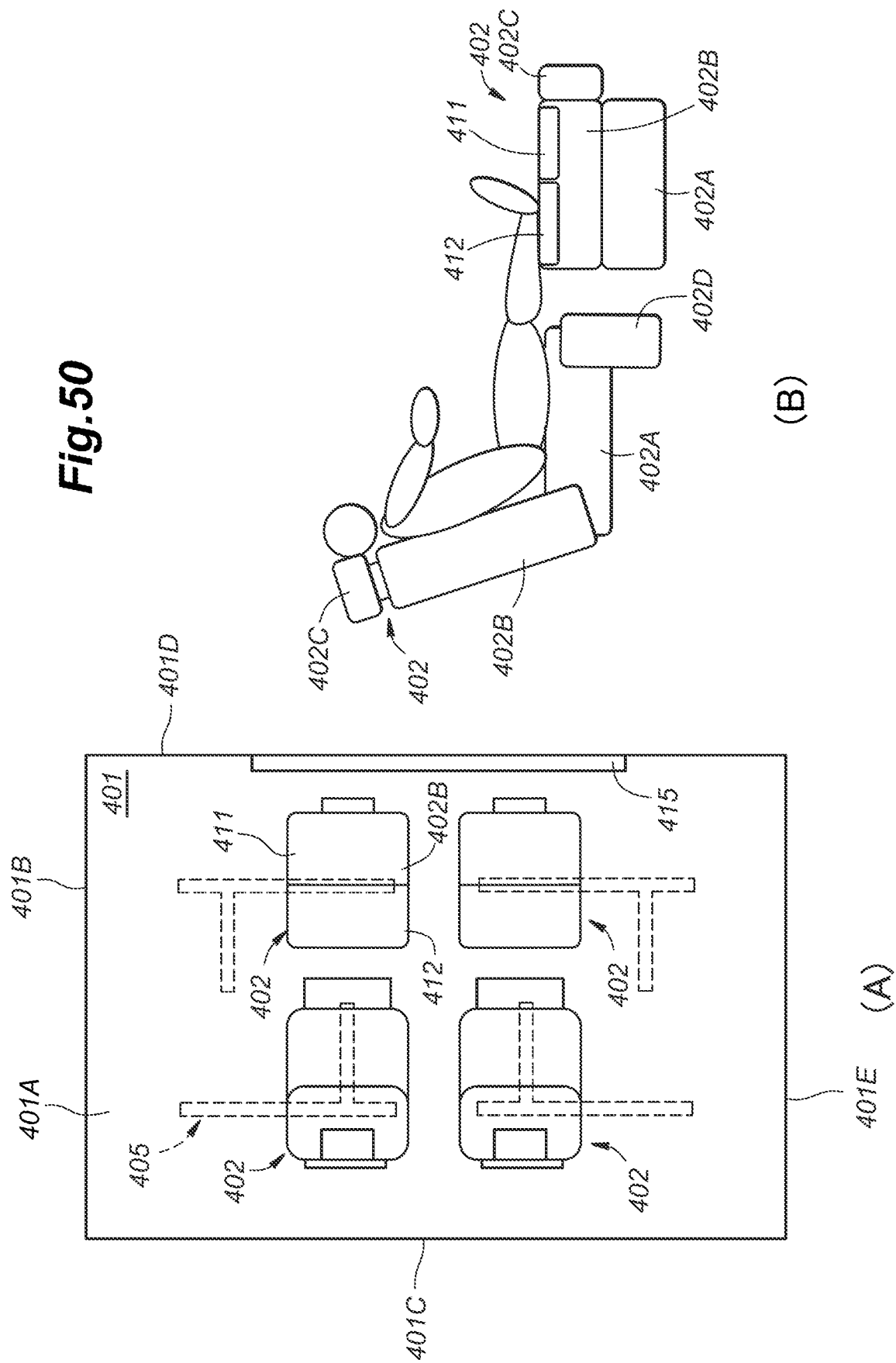
FIG. 50 is (A) an explanatory diagram showing an arrangement vehicle seats in a theater mode, and (B) an explanatory diagram showing an example of use of the vehicle seat in the theater mode.

FIG. 50(A) shows a seat arrangement in a theater mode. In the theater mode, the front left vehicle seat 402 faces rightward. The seatback 402B of the front left vehicle seat 402 is preferably tilted backward. The front right vehicle seat 402 is disposed to the right of the front left vehicle seat 402. The front right vehicle seat 402 faces rightward. The seatback 402B of the front right vehicle seat 402 is folded onto the seat cushion 402A. The rear left and rear right vehicle seats 402 are arranged to be front-rear symmetrical to the front left and front right vehicle seats 402.

In the theater mode, users are seated on the front left vehicle seat 402 and the rear left vehicle seat 402. As shown in FIG. 50(B), the user seated on the front left vehicle seat 402 can place the legs on the footrest 412 of the front right vehicle seat 402. Similarly, the user seated on the rear left vehicle seat 402 can place the legs on the footrest 412 of the rear right vehicle seat 402. In this way, the user seated on one vehicle seat 402 can use another vehicle seat 402 as a footrest (ottoman). In front of the users seated on the front left vehicle seat 402 and the rear left vehicle seat 402, the display 415 provided on the right wall 401D is disposed.

Figure 51:
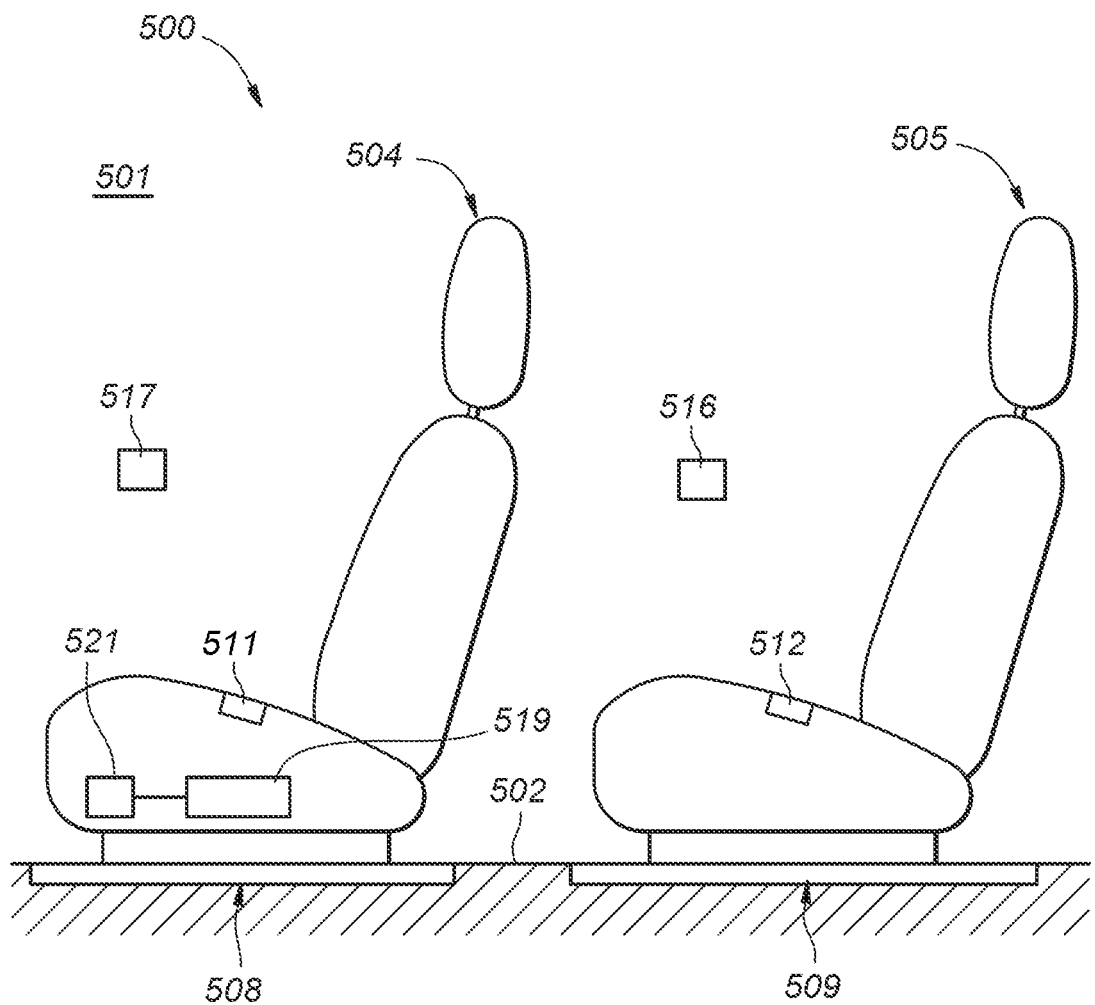
FIG. 51 is an explanatory diagram of s vehicle seat system according to an embodiment.

A vehicle seat system 500 according to an embodiment will be described. As shown in FIG. 51, multiple seats including a first seat 504 and a second seat 505 are provided on a floor 502 of a vehicle 501. In the present embodiment, the first seat 504 is a seat in the first row, and the second seat 505 is a seat in the second row. The first seat 504 is supported on the floor 502 via the first electric slide rail 508. The second seat 505 is supported on the floor 502 via a second electric slide rail 509. The first and second electric slide rails 508, 509 each include a rail, a slider supported on the rail, an electric motor, and a driving mechanism for moving the slider relative to the rail with the driving force of the electric motor. The rails are joined to the floor 502, and the sliders are respectively joined to the first and second seats 504, 505. The driving mechanism preferably is a known feed screw mechanism or a known rack-and-pinion mechanism. The first and second electric slide rails 508, 509 move the first seat 504 and the second seat 505 forward and backward relative to the floor 502.

The first and second seats 504, 505 are provided with seating sensors 511, 512, respectively. The seating sensors 511, 512 preferably include known load sensors, pressure sensors, or membrane switches.

In a position of the vehicle 501 corresponding to the second seat 505, a first switch 516 for manipulating the front-rear position of the first seat 504. The first switch 516 is used by the user seated on the second seat 505 to move the first seat 504. In a position of the vehicle 501 corresponding to the first seat 504, a second switch 517 for manipulating the front-rear position of the second seat 505 is provided. The second switch 517 is used by the user seated on the first seat 504 to move the second seat 505. The first and second switches 516, 517 receive operations corresponding to "forward movement" and "rearward movement." The first and second switches 516, 517 output a forward movement signal when receiving the operation corresponding to "forward movement". The first and second switches 516, 517 output a rearward movement signal when receiving the operation corresponding to "rearward movement."

The vehicle 501 is provided with a control device 519 for controlling the first and second electric slide rails 508, 509. The control device 519 is an electronic control unit including a microprocessor, a memory, and an interface. The control device 519 is connected to the first and second electric slide rails 508, 509, the seating sensors 511, 512, the first switch 516, the second switch 517, and a notification device 521. The notification device 521 may be a sound output device, such as a speaker, or a display.

When the forward movement signal or the rearward movement signal is received from the first switch 516, the control device 519 determines whether a person is seated on the first seat 504 based on the signal from the seating sensor 511 of the first seat 504. When it is determined that a person is not seated on the first seat 504, the control device 519 drives the first electric slide rail 508 to move the first seat 504 forward or backward. On the other hand, when it is determined that a person is seated on the first seat 504, the control device 519 does not drive the first electric slide rail 508 and hence does not move the first seat 504. At this time, the control device 519 may activate the notification device 521 to make a notification to the user.

When the forward movement signal or the rearward movement signal is received from the second switch 517, the control device 519 determines whether a person is seated on the second seat 505 based on the signal from the seating sensor 512 of the second seat 505. When it is determined that a person is not seated on the second seat 505, the control device 519 drives the second electric slide rail 509 to move the second seat 505 forward or backward. On the other hand, when it is determined that a person is seated on the second seat 505, the control device 519 does not drive the second electric slide rail 509 and hence does not move the second seat 505. At this time, the control device 519 may activate the notification device 521 to make notification to the user.

The first seat 504 and the second seat 505 can make the seatback pivot forward and backward relative to the seat cushion. Also, the first seat 504 and the second seat 505 can make the headrest pivot forward and backward relative to the seatback. When the first seat 504 and the second seat 505 are moved forward or backward, the front-rear position of the seatback relative to the seat cushion may be changed, and the front-rear position of the headrest relative to the seatback may be changed.

In the first and second seats 504, 505, side portions of the seat cushion and/or the backrest in the seat width direction are configured to be movable between a protruding position in which the seating surface protrudes more than the central part in the seat width direction and a retracted position which is retracted from the protruding position. Thereby, it is possible to prevent the side portions from obstructing the user when boarding or alighting from the vehicle. Also, by retracting the side portions when the use is seated, it is possible to reduce the user's feeling of pressure caused by protrusion of the side portions. Further, the movement of the side portions between the protruding position and the retracted position may be performed in conjunction with sliding of the seat in the front-rear direction, for example.

In the first and second seats 504, 505, the central part of the seat cushion and/or the backrest in the seat width direction is configured to be movable between a normal position for forming a normal seating surface and a protruding position which protrudes toward the user than the normal position. Thus, by causing the central part to protrude when the user sits on the seat and displacing the central part from the protruding position to the normal position after the user is seated, it becomes unnecessary for the user to sit down deeply. Therefore, the user can board and alight from the vehicle easily. The movement of the central part between the normal position and the protruding position may be performed by a pressing device configured to press the pad toward the seating surface side from the side opposite from the seating surface. The pressing device may include a predetermined link mechanism supported on the seat frame or may use an air bag supplied with fluid from a predetermined pump and configured to inflate/deflate, for example.

Figure 52:
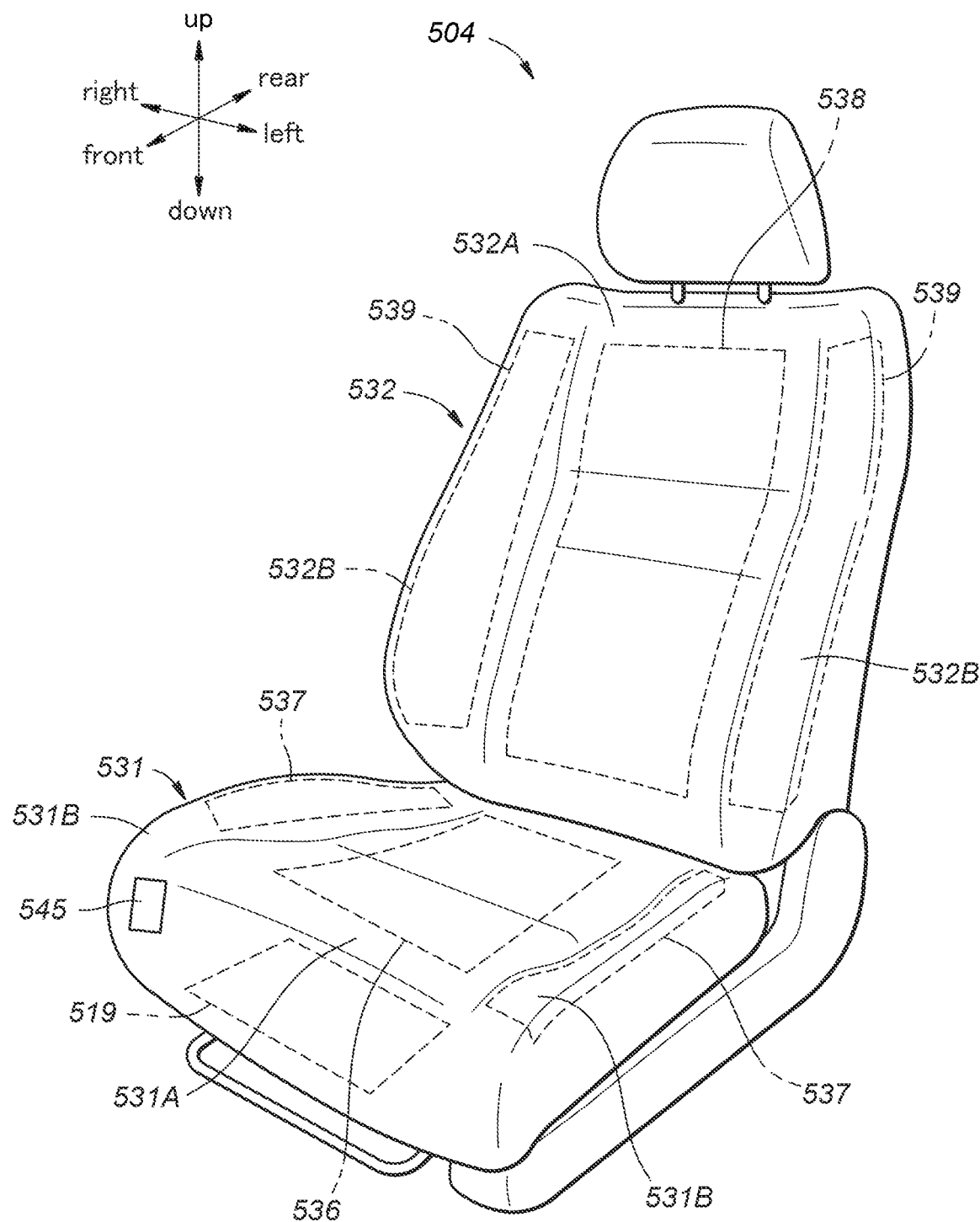
FIG. 52 is a perspective view of the vehicle seat.

As one example, an example of the first seat 504 is described. As shown in FIG. 52, the first seat 504 includes a seat cushion 531 and a seatback 532. A central part 531A of the seat cushion 531 in the left-right direction is provided with a first pressing device 536, and each of left and right side portions 531B of the seat cushion 531 is provided with a second pressing device 537. A central part 532A of the seatback 532 in the left-right direction is provided with a third pressing device 538, and each of left and right side portions 532B of the seatback 532 is provided with a fourth pressing device 539. In the present embodiment, the first to fourth pressing devices 536 to 539 are air cells provided between the pad and the skin material. The air cells are connected to a compressed air supply device. The compressed air supply device is connected to the control device 519. The control device 519 controls the compressed air supply device thereby to control inflation and deflation of each air cell. In another embodiment, the first to fourth pressing devices 536 to 539 may be driving mechanisms for moving the pad forward and backward.

The control device 519 is connected to a boarding/alighting switch 545 provided in the vehicle. The user operates the boarding/alighting switch 545 when boarding or alighting from the vehicle 501. At normal times, the control device 519 controls the first pressing device 536 and the second pressing device 537 to make the left and right side portions 531B of the seat cushion 531 protrude more upward than the central part 531A. Also, at normal times, the control device 519 controls the third pressing device 538 and the fourth pressing device 539 to make the left and right side portions 532B of the seatback 532 protrude more forward than the central part 532A.

When a signal is received from the boarding/alighting switch 545, the control device 519 controls the first pressing device 536 and the second pressing device 537 to make the upward protrusion amounts of the central part 531A and the left and right side portions 531B of the seat cushion 531 smaller than normal times. For example, it is preferred if the up-down position of the upper surface of the central part 531A of the seat cushion 531 and the up-down positions of the upper surfaces of the left and right side portions 531B become the same. Also, the upper surface of the central part 531A of the seat cushion 531 may be positioned higher than the upper surfaces of the left and right side portions 531B.

When a signal is received from the boarding/alighting switch 545, the control device 519 controls the third pressing device 538 and the fourth pressing device 539 to make the forward protrusion amounts of the central part 532A and the left and right side portions 532B of the seatback 532 smaller than normal times. For example, it is preferred if the front-rear position of the front surface of the central part 532A of the seatback 532 and the front-rear positions of the front surfaces of the left and right side portions 532B become the same. Also, the front surface of the central part 532A of the seat cushion 531 may be positioned more forward than the front surfaces of the left and right side portions 532B.

The boarding/alighting switch 545 may be an opening/closing sensor provided on the door of the vehicle 501. The control device 519 may detect the user's intention to board or alight based on the signal from the opening/closing sensor.

In the following, with reference to FIGS. 53 to 57, description will be made of an embodiment of a seat 603 which is provided to be rotatable relative to a floor 601 of the vehicle about a rotation axis 602 extending in the up-down direction.

A seat that is rotatable about a vertically extending rotation axis needs to avoid interference with other structural bodies when rotated. Also, in the case where the seat is rotated by an electric device, reduction of electric power consumption is required.

Figure 53:
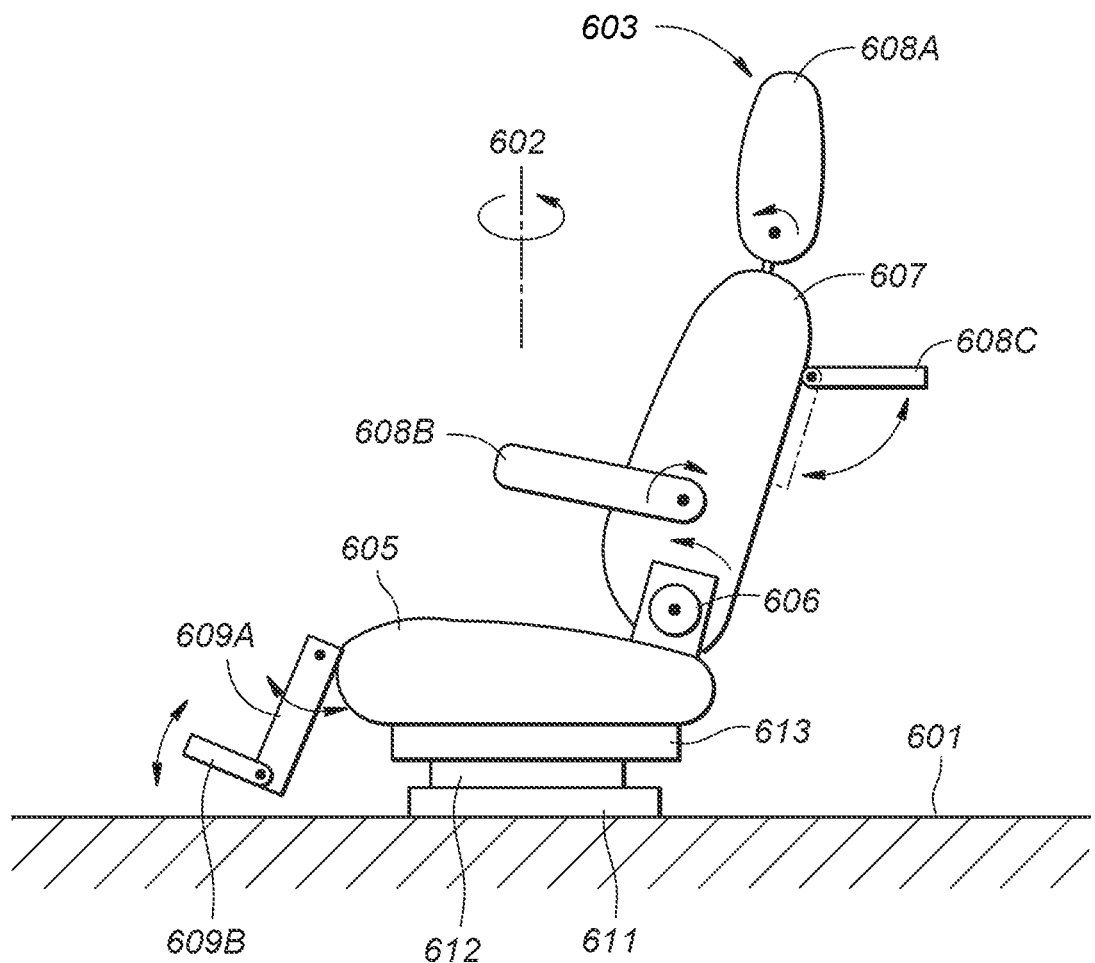
FIG. 53 is an explanatory diagram of the vehicle seat according to an embodiment.

As shown in FIG. 53, the seat 603 includes a seat cushion 605 and a seatback 607 joined to the seat cushion 605 via an electric reclining device 606. The electric reclining device 606 includes an electric motor and changes the angle of the seatback 607 relative to the seat cushion 605.

An electric headrest 608A is provided on an upper end of the seatback 607. Left and right electric armrests 608B may be respectively provided on left and right side portions of the seatback 607. Each electric armrest 608B is pivotable between a use position in which the electric armrest 608B extends from the seatback 607 in the horizontal direction and a stowed position in which the electric armrest 608B extends in the longitudinal direction of the seatback 607. Each electric armrests 608B is driven by a driving force of an electric motor. An electric table 608C is provided on the rear surface of the seatback 607. The electric table 608C is pivotable between a use position in which the electric table 608C extends perpendicularly to the rear surface of the seatback 607 and a stowed position in which the electric table 608C extends along the rear surface of the seatback 607.

An electric ottoman 609A may be provided at the front end of the seat cushion 605. An electric footrest 609B may be provided at the lower end of the electric ottoman 609A. The electric ottoman 609A is pivotable between a use position in which the electric ottoman 609A extends forward from the seat cushion 605 and a stowed position in which the electric ottoman 609A extends downward from the seat cushion 605.

The seat cushion 605 is supported on the floor 601 via an electric rotation device 611, an electric tilting device 612, and an electric slide device 613.

The electric rotation device 611 is joined to the floor 601. The electric rotation device 611 supports the seat cushion 605, the electric tilting device 612, and the electric slide device 613 to be rotatable relative to the floor 601 about an axis extending vertically. The electric rotation device 611 includes an electric motor.

The electric tilting device 612 is interposed between the electric rotation device 611 and the electric slide device 613. The electric tilting device 612 changes the angle of the seat cushion 605 and the electric slide device 613 relative to the electric rotation device 611 and the floor 601. The electric tilting device 612 changes the up-down position of the front end of the seat cushion 605 or the up-down position of the rear end of the same. The electric tilting device 612 includes an electric motor. Preferably, it includes an electric power cylinder, a feed screw mechanism, and a link mechanism.

The electric slide device 613 is interposed between the electric tilting device 612 and the seat cushion 605. The electric slide device 613 supports the seat cushion 605 to be slidingly movable relative to the electric tilting device 612. The electric slide device 613 includes an electric motor.

Figure 54:
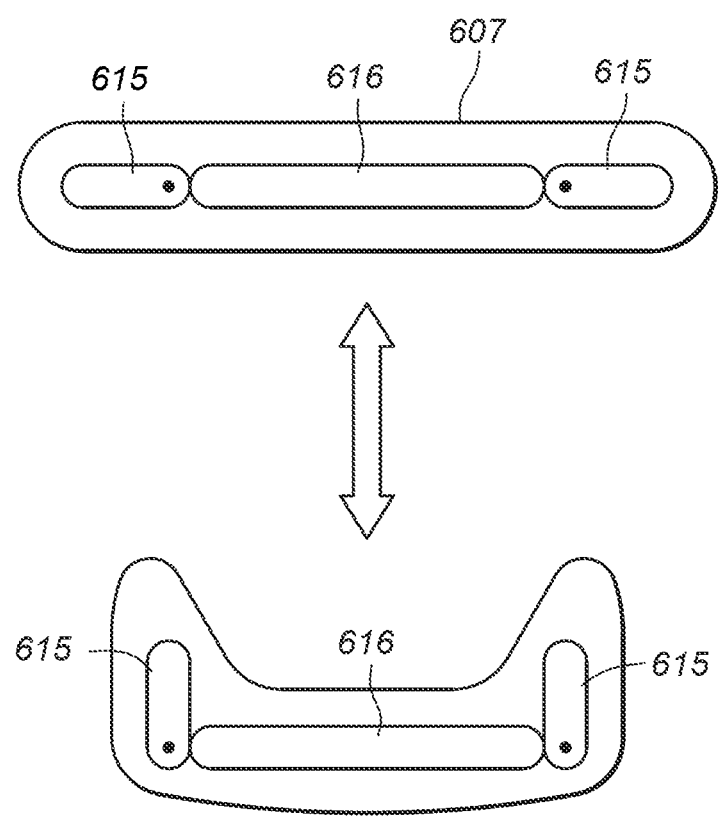
FIG. 54 is an explanatory diagram showing a horizontal section of the seatback.

As shown in FIG. 54, left and right electric side supports 615 are respectively provided in left and right side portions of the seatback 607. Each electric side support 615 is supported on a seatback frame 616 to be rotatable about an axis extending in the longitudinal direction of the seatback 607 (the up-down direction). The seatback frame 616 constitutes a central part of the seatback 607 in the left-right direction. The left and right electric side supports 615 and the seatback frame 616 are covered with a pad and a skin material. Each electric side support 615 pivots between a forward position in which the electric side support 615 extends forward from the seatback frame 616 and a lateral position in which the electric side support 615 extends laterally outward from the seatback frame 616. When each side support is in the forward position, each side support protrudes forward relative to the central part. When each side support is in the lateral position, the front surface of the seatback 607 becomes substantially flat. The left-right width of the seatback 607 when each side support is in the lateral position is larger than the left-right width of the seatback 607 when each side support is in the forward position.

Figure 55:
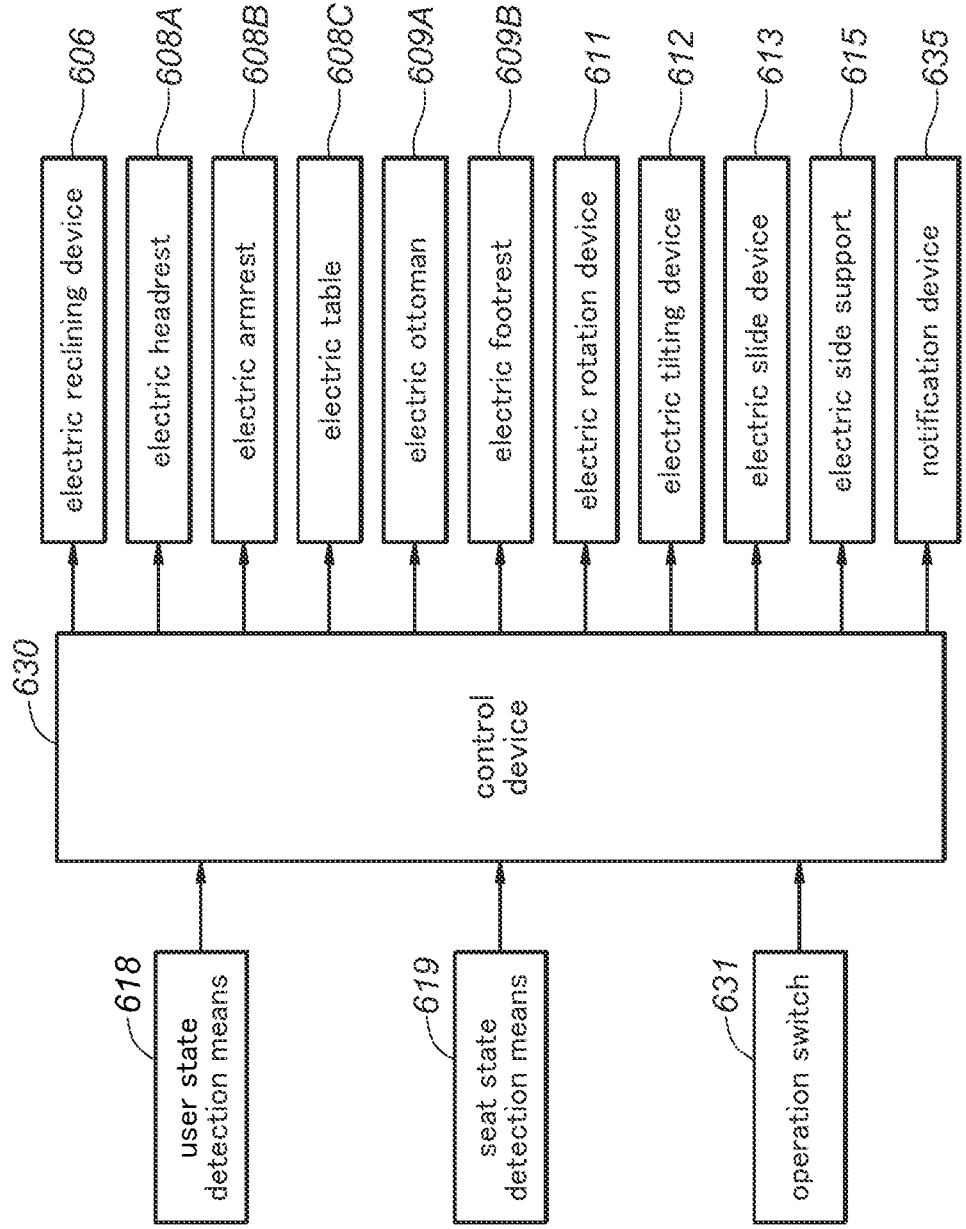
FIG. 55 is an explanatory diagram of a vehicle seat according to an embodiment.

As shown in FIG. 55, the seat 603 is provided with a user state detection means 618 for detecting the state of the user seated thereon. The user state detection means 618 preferably includes at least one of a temperature sensor for measuring the body temperature of the user, a pulse sensor for detecting the pulse rate of the user, a humidity sensor for detecting the perspiration state of the user, a contact sensor for detecting contact with the user, a load sensor (pressure sensor) for detecting the load received from the user, an odor sensor for detecting the odor of the user, an electroencephalogram sensor for detecting the electroencephalogram of the user, a camera for capturing images of the user, and so on. The user state detection means 618 is preferably provided in the seat, for example. The user state detection means 618 is preferably provided in the seat cushion 605, the seatback 607, the electric headrest 608A, the electric armrests 608B, the electric ottoman 609A, or the electric footrest 609B.

The seat 603 is provided with a seat state detection means 619 for detecting the state of the seat 603. The seat state detection means 619 includes a seatback angle sensor for detecting a seatback angle which is an angle of the seatback 607 relative to the seat cushion 605, a side support angle sensor for detecting a side support angle which is an angle of left and right side support parts of the seatback 607 relative to the central part, an ottoman angle sensor for detecting an ottoman angle which is an angle of the electric ottoman 609A relative to the seat cushion 605, and a table angle sensor for detecting a table angle which is an angle of the electric table 608C.

The electric reclining device 606, the electric rotation device 611, the electric tilting device 612, the electric slide device 613, and the multiple user state detection means 618 are connected to a control device 630. The control device 630 is an electronic control unit including a microprocessor, a memory, and an interface. An operation switch 631 for receiving user operations is connected to the control device 630. The operation switch receives operations corresponding to rotation of the seat 603 about a vertically extending axis, tilting of the seat 603, sliding movement of the seat 603, and reclining of the seatback 607.

When a rotation command signal which is a signal corresponding to rotation of the seat 603 about the vertical axis is received from the operation switch 631, the control device 630 drives the electric rotation device 611 to rotate the seat 603. When a tilt command signal which is a signal corresponding to tilting of the seat 603 is received from the operation switch 631, the control device 630 drives the electric tilting device 612 to tilt the seat 603. When a slide command signal which is a signal corresponding to sliding movement of the seat 603 is received from the operation switch 631, the control device 630 drives the electric slide device 613 to slidingly move the seat 603. When a reclining command signal which is a signal corresponding to reclining of the seatback 607 is received from the operation switch 631, the control device 630 drives the electric reclining device 606 to tilt the seatback 607.

Preferably, the control device 630 limits or prohibits the rotation of the seat 603 about the vertical axis when the seatback angle is greater than a predetermined determination threshold value. For example, when the seatback angle is greater than the predetermined determination threshold value, the control device 630 preferably prohibits control of the electric rotation device 611 even if the rotation command signal is received from the operation switch 631. Also, when the seatback angle is greater than the predetermined determination threshold value, the control device 630 may preferably lower the control amount of the electric rotation device 611 relative to the rotation command signal from the operation switch 631.

The control device 630 may perform the determination of whether the seatback angle is greater than the predetermined determination threshold value at a predetermined time interval or immediately after the vehicle travel control is switched to autonomous driving or immediately after it is determined that the vehicle travel control will be switched to autonomous driving.

When the side support angle is greater than a predetermined determination threshold value, the control device 630 preferably limits or prohibits the rotation of the seat 603 about the vertical axis. For example, when the side support angle is greater than the predetermined determination threshold value, the control device 630 preferably prohibits control of the electric rotation device 611 even if the rotation command signal is received from the operation switch 631. Also, when the side support angle is greater than the predetermined determination threshold value, the control device 630 may preferably lower the control amount of the electric rotation device 611 relative to the rotation command signal from the operation switch 631.

When the side support angle is greater than a predetermined determination threshold value, the control device 630 preferably limits or prohibits the rotation of the seat 603 about the vertical axis. For example, when the side support angle is greater than the predetermined determination threshold value, the control device 630 preferably prohibits control of the electric rotation device 611 even if the rotation command signal is received from the operation switch 631. Also, when the side support angle is greater than the predetermined determination threshold value, the control device 630 may preferably lower the control amount of the electric rotation device 611 relative to the rotation command signal from the operation switch 631.

When the electric ottoman 609A is not in the stowed position, the control device 630 preferably limits or prohibits the rotation of the seat 603 about the vertical axis. Namely, the control device 630 enables the rotation of the seat 603 about the vertical axis only when the electric ottoman 609A is in the stowed position. For example, when the ottoman angle is greater than a predetermined determination threshold value, the control device 630 preferably prohibits control of the electric rotation device 611 even if the rotation command signal is received from the operation switch 631. Also, when the ottoman angle is greater than the predetermined determination threshold value, the control device 630 may preferably lower the control amount of the electric rotation device 611 relative to the rotation command signal from the operation switch 631.

When the angle of the electric ottoman 609A is greater than or equal to a predetermined determination value, the control device 630 preferably limits the rotatable angle (rotation range) of the seat 603 about the vertical axis. For example, preferably, the control device 630 sets the rotatable angle of the seat 603 about the vertical axis to 90 degrees when the electric ottoman 609A is in the stowed position, and sets the rotatable angle of the seat 603 about the vertical axis to a value smaller than normal times, such as 30 degrees, when the angle of the electric ottoman 609A is greater than or equal to the predetermined determination value.

When the electric table 608C is not in the stowed position, the control device 630 preferably limits or prohibits the rotation of the seat 603 about the vertical axis. Namely, the control device 630 enable the rotation of the seat 603 about the vertical axis only when the electric table 608C is in the stowed position. For example, when the table angle is greater than a predetermined determination threshold value, the control device 630 preferably prohibits control of the electric rotation device 611 even if the rotation command signal is received from the operation switch 631. Also, when the table angle is greater than the predetermined determination threshold value, the control device 630 may preferably lower the control amount of the electric rotation device 611 relative to the rotation command signal from the operation switch 631.

When the angle of the electric table 608C is greater than or equal to the predetermined determination value, the control device 630 preferably limits the rotatable angle (rotation range) of the seat 603 about the vertical axis. For example, preferably, the control device 630 sets the rotatable angle of the seat 603 about the vertical axis to 90 degrees when the electric table 608C is in the stowed position, and sets the rotatable angle of the seat 603 about the vertical axis to a value smaller than normal times, such as 30 degrees, when the angle of the electric table 608C is greater than or equal to the predetermined determination value.

The control device 630 may perform the determination of whether the side support angle is greater than the predetermined determination threshold value at a predetermined time interval or immediately after the vehicle travel control is switched to autonomous driving or immediately after it is determined that the vehicle travel control will be switched to autonomous driving.

When the rotation command signal from the operation switch 631 is received, the control device 630 may control the electric reclining device 606, the electric side support 615, etc. so that the seat 603 is placed in a predetermined state. Thereby, when the seat 603 rotates about the vertical axis, it is possible to prevent the seatback 607 from contacting other structural bodies. For example, when the tilt of the seatback 607 relative to the vertical direction is small and the side support parts extend forward, the rotation locus of the seat 603 becomes small and the possibility of contacting other structural bodies is lowered. Also, the control device 630 may control the electric slide device 613 to make the rotation locus of the seat 603 smaller.

Figure 56:
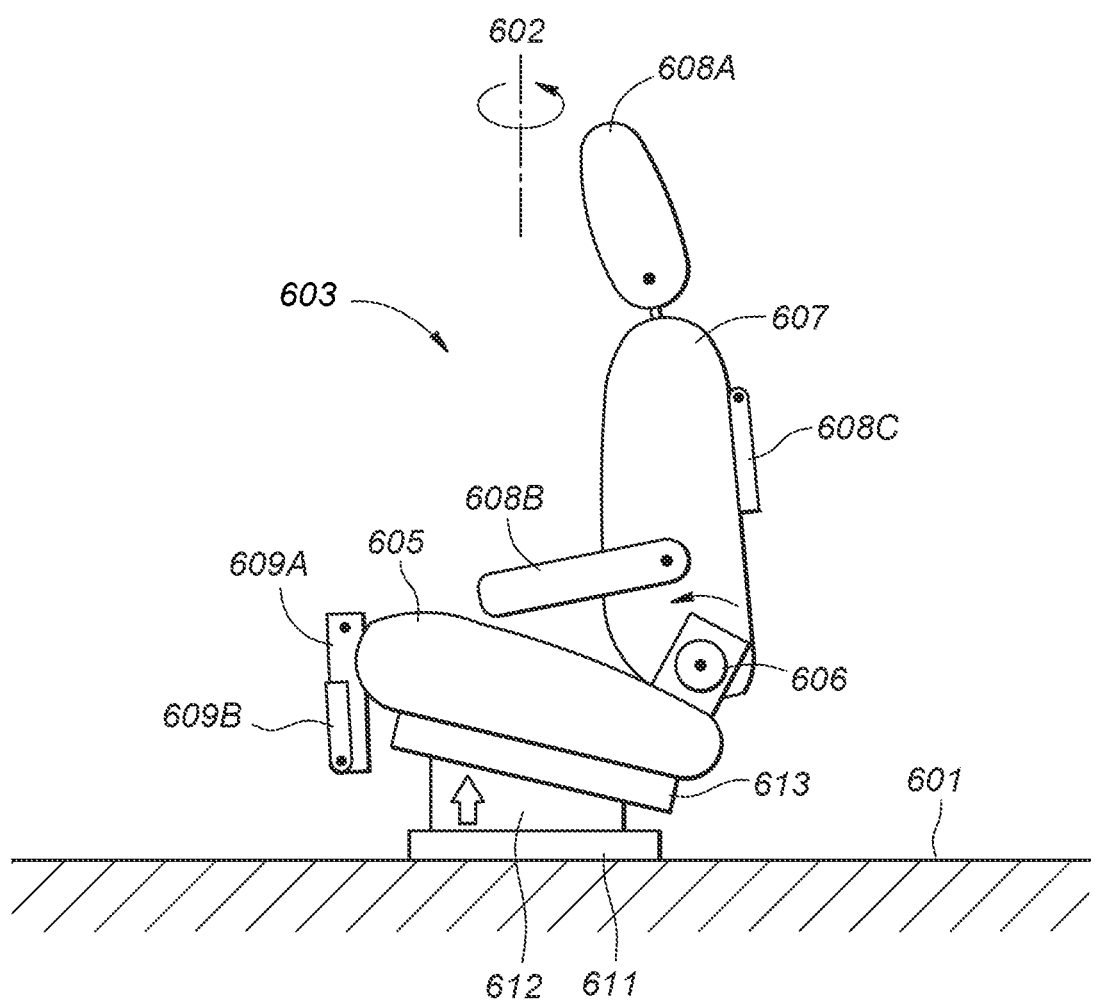
FIG. 56 is an explanatory diagram showing a vehicle seat in a state in which the front portion thereof is lifted up.

As shown in FIG. 56, when the rotation command signal from the operation switch 631 is received, the control device 630 may control the electric tilting device 612 to tilt the seat 603. For example, the electric tilting device 612 may raise the front end part of the seat cushion 605 to tilt the seat cushion 605 backward. Thereby, the area of the seat 603 as seen from above becomes small, and the rotation locus of the seat 603 becomes small. Therefore, when the seat 603 is rotated, the seat 603 is less likely to contact other structural bodies. When controlling the electric tilting device 612 to tilt the seat cushion 605 backward, it is preferable if the control device 630 additionally controls the electric reclining device 606 to tilt the seatback 607 forward. Thereby, the area of the seat 603 as seen from above becomes even smaller, and the rotation locus of the seat 603 becomes even smaller. By increasing the overlap between the seat cushion 605 and the seatback 607 as seen from above, it is possible to reduce the area of the seat 603 as seen from above.

Figure 57:
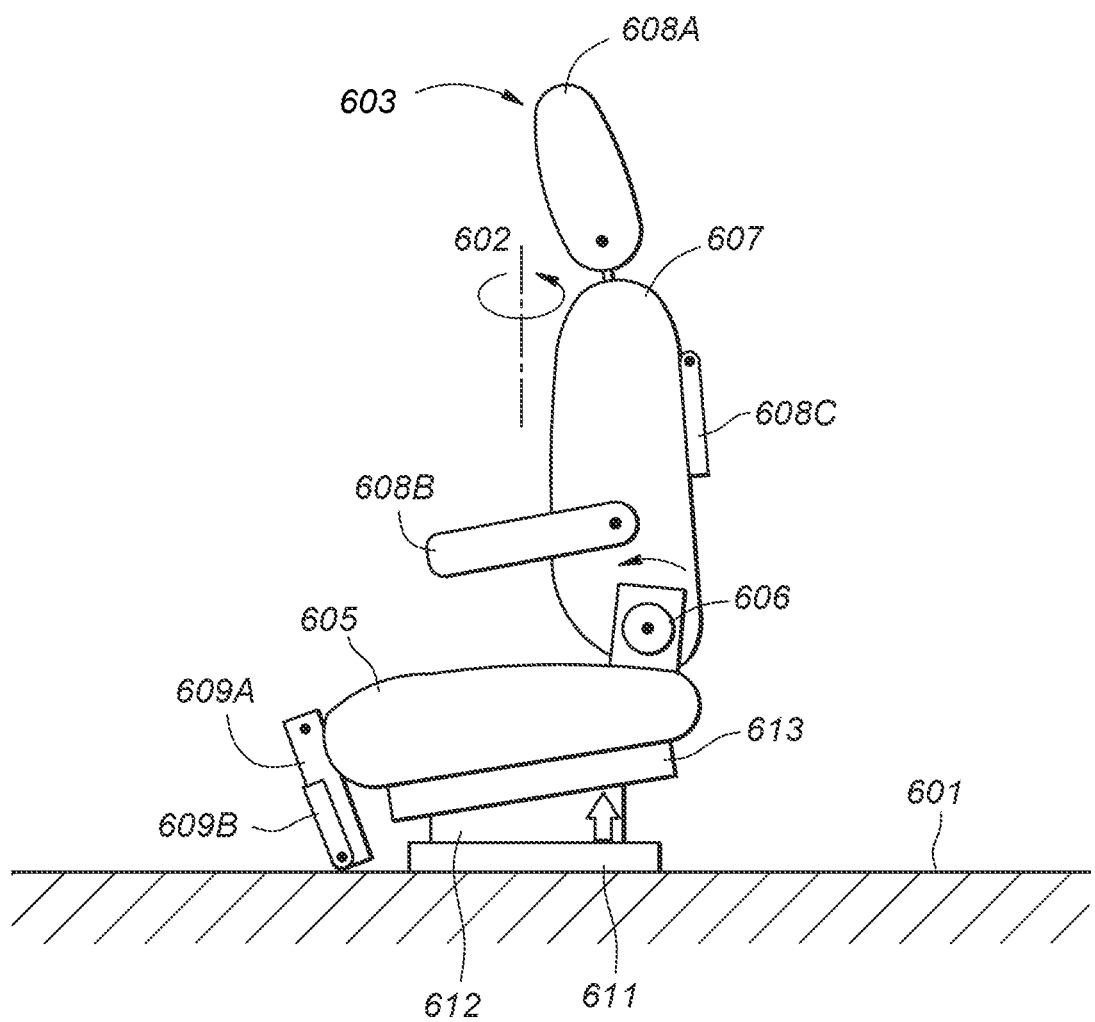
FIG. 57 is an explanatory diagram showing a vehicle seat in a state in which the rear portion thereof is lifted up.

As shown in FIG. 57, the electric tilting device 612 may raise the rear end part of the seat cushion 605 to tilt the seat cushion 605 forward, for example. Thereby, the area of the seat 603 as seen from above becomes small, and the rotation locus of the seat 603 becomes small. Therefore, when the seat 603 is rotated, the seat 603 is less likely to contact other structural bodies. At this time, the control device 630 may additionally control the electric reclining device 606 to tilt the seatback 607 forward.

The seat 603 may include an electric headrest device for changing at least one of the angle and the position of the electric headrest 608A relative to the seatback 607. In this case, when the rotation command signal from the operation switch 631 is received, the control device 630 may control the electric headrest device to move the electric headrest 608A toward the front end of the seat cushion 605.

The seatback 607 may be a center-foldable seatback having at least one pivoting part (joint part). In this case, the seatback 607 preferably includes an actuator for causing the at least one pivoting part to pivot. When the rotation command signal from the operation switch 631 is received, the control device 630 may control the actuator of the seatback 607 to cause the seatback 607 to bend toward the front end of the seat cushion 605.

When the rotation command signal from the operation switch 631 is received, the control device 630 may control the electric armrests 608B to move the electric armrests 608B to the use position. Thereby, during rotation of the seat 603, the electric armrests 608B can support the seated user or the luggage placed on the seat cushion 605.

The control device 630 may determine an abnormality of the seat 603 based on the signal from the seat state detection means 619 and, when it is determined that there is an abnormality in the seat 603, may prohibition or limit the rotation of the seat 603 about the vertical axis. Also, the control device 630 may decide the abnormality level of the seat 603 based on the signal from the seat state detection means 619, and may prohibit or limit the rotation of the seat 603 about the vertical axis based on the abnormality level. Also, the control device 630 may detect the location of the abnormality of the seat 603 based on the signal from the seat state detection means 619, and may prohibit or limit the rotation of the seat 603 about the vertical axis based on the location of the abnormality.

The control device 630 controls the rotation of the seat 603 about the vertical axis depending on the state of the user seated on the seat 603. The state of the user includes physical condition and alertness. The control device 630 acquires the state of the user based on the signal from the user state detection means 618. For example, the control device 630 preferably acquires the physical condition and alertness of the user seated on the seat 603 from the heart rate, pulse, and odor acquired by the user state detection means 618. The control device 630 may decide the physical condition and alertness of the user seated on the seat 603 from the heart rate, pulse, and odor acquired by the user state detection means 618 by using a machine learning model, for example. Also, the control device 630 may decide the physical condition and alertness of the user seated on the seat 603 from numerical values of the heart rate, pulse, odor, etc. acquired by the user state detection means 618. The control device 630 may set the physical condition level and the alertness level of the user based on each state quantity acquired by the user state detection means 618.

The control device 630 may limit or prohibit the rotation of the seat 603 about the vertical axis based on the physical condition of the user. The control device 630 may limit or prohibit the rotation of the seat 603 about the vertical axis when it is determined that the physical condition of the user is not good. The control device 630 may limit or prohibit the rotation of the seat 603 about the vertical axis based on the physical condition level of the user.

The control device 630 may limit or prohibit the rotation of the seat 603 about the vertical axis when the alertness of the user is lower than a predetermined determination value. The control device 630 may limit or prohibit the rotation of the seat 603 about the vertical axis based on the alertness level of the user.

In another embodiment, the control device 630 may acquire road information which is the information related to the road on which the vehicle is traveling or the road on which the vehicle will travel several seconds later, and may limit or prohibit the rotation of the seat 603 about the vertical axis based on the road information. The road information preferably includes the curvature of the road and the road surface condition, for example. Preferably, the control device 630 prohibits the rotation of the seat 603 about the vertical axis or limit the rotation angle (rotation range) when the curvature of the road included in the road information is greater than or equal to a predetermined determination value.

In another embodiment, the control device 630 may limit or prohibit the rotation of the seat 603 about the vertical axis based on the position and angle of the seat 603 relative to the floor 601. The control device 630 may limit or prohibit the rotation of the seat 603 about the vertical axis when the position of the seat 603 relative to the floor 601 is not within a predetermined range. Also, the control device of the vehicle may limit the vehicle travel control based on the position and angle of the seat 603 relative to the floor 601. For example, the control device of the vehicle preferably lowers the upper limit value of the travel speed of the vehicle when the position and angle of the seat 603 relative to the floor 601 are not within predetermined ranges.

In another embodiment, the control device 630 may rotate the seat 603 about the vertical axis based on the direction of sun light entering the cabin. For example, the direction of sun light may be acquired by a light sensor provided in the cabin or may be acquired based on the direction of the vehicle and the date and time.

In another embodiment, the control device 630 includes a target rotation position setting means for setting a target rotation position of the seat 603 based on the driving state, a command of the occupant, etc., a rotation control means for controlling the rotation of the seat based on the target rotation position, a comparison means for comparing the target rotation position with an actual rotation position, and a correction means for correcting the control amount of the electric rotation device 611 based on the comparison result. Due to the correction means, the accuracy of the rotation control of the electric rotation device 611 improves. The rotation control may be limited or prohibited when the difference between the target rotation position and the current rotation position obtained by the comparison means is greater than or equal to a predetermined value. Thereby, when the difference between the target rotation position and the current rotation position is large and it can be inferred that an abnormality is occurring in the seat 603, the rotation of the seat 603 can be prohibited or limited.

The operation switch 631 is preferably provided on left and right side portions of the upper surface of the seat cushion 605 and on the left and right electric armrests 608B. For example, the control device 630 preferably controls the electric rotation device 611 so as to rotate the seat 603 in the right direction when the operation switch 631 provided on the right side portion of the seat cushion 605 or the operation switch 631 provided on the right electric armrest 608B is operated. Also, the control device 630 preferably controls the electric rotation device 611 so as to rotate the seat 603 in the left direction when the operation switch 631 provided on the left side portion of the seat cushion 605 or the operation switch 631 provided on the left electric armrest 608B is operated.

The seat 603 is provided with a notification device 633 for indicating the rotational direction at the time of rotation of the seat 603 about the vertical axis. The notification device 633 includes indicators for indicating the rotational direction, a speaker for notifying the rotational direction by voice, vibrators for vibrating a part corresponding to the rotational direction, and the like. For example, the notification device 633 is preferably provided on front parts of the left and right side portions of the upper surface of the seat cushion 605 or on the left and right electric armrests 608B.

The control device 630 may control the heater and/or the air conditioner provided in the seat 603 based on the rotation angle of the seat 603. For example, when the heater provided in the seat 603 is on, the rotation angle of the seat 603 is in a predetermined angle range suitable for boarding or alighting from the vehicle, and an alighting condition that the seating sensor provided on the seat 603 does not detect a user is satisfied, the control device 630 preferably turns off the heater and the air conditioner. The alighting condition may include opening of a door of the vehicle within a predetermined period.

In another embodiment, the control device 630 preferably controls the comfort devices based on the state information of the user acquired by the user state detection means 618. The state information of the user includes the heart rate, respiratory rate, blood pressure, perspiration state, etc. of the user. The comfort devices preferably include the electric ottoman 609A and the heater, the blower, the electric reclining device 606, the electric rotation device 611, the electric tilting device 612, etc. provided in the seat 603. Preferably, the control device 630 uses a machine learning model to control the comfort devices according to the state information of the user. Also, the control device 630 may acquire utterances of the user with a microphone and may control the comfort devices based on the utterances. For example, when the outside temperature is higher than or equal to a predetermined temperature and "cold" is included in the content of utterances of the user, the control device 630 preferably turns on the heater. Also, when "hot" is included in the content of utterances of the user and the humidity is higher than or equal to a predetermined determination value, the control device 630 preferably stops the heater. Also, when utterances of multiple users are detected more than a predetermined determination value, the control device 630 may activate the electric rotation devices 611 of multiple seats 603 to make the multiple seats 603 face each other.

LIST OF REFERENCE NUMERALS

1: seat
2: seat cushion
3: seatback
4 floor
4A: floor front portion
4B: floor middle portion
4C: floor rear portion
6: first support leg
10: base member
11: slide device
34: first coupling part
35: first coupling device
37: second coupling part
38: second coupling device
41: first reinforcement plate
41A: horizontal plate part
41B: vertical plate part
42: reinforcement member
42A: first part
42B: second part
44: second reinforcement plate
45: third reinforcement plate
52: third coupling part
53: third coupling device
61: support wall
A1: first axis
A2: second axis
A3: third axis

The invention claimed is:
1. A vehicle seat, comprising:
a support leg connected to a vehicle body to be pivotable about a first axis extending in a horizontal direction;
a seat cushion connected to the support leg to be pivotable about a second axis which is parallel to the first axis;

a first coupling device provided on the support leg and configured to be detachably coupled with a first coupling part provided on the vehicle body; and a second coupling device provided on the seat cushion and configured to be detachably coupled with a second coupling part provided on the vehicle body, wherein the seat cushion is movable between a stowed position in which the seat cushion is in a lowest position, a first use position in which the first coupling device is coupled with the first coupling part, and a second use position in which the second coupling device is coupled with the second coupling part.

2. The vehicle seat according to claim 1, wherein the seat cushion in the second use position is disposed higher than the seat cushion in the stowed position, and the seat cushion in the first use position is disposed higher than the seat cushion in the second use position.

3. The vehicle seat according to claim 2, wherein the vehicle body includes a floor, the floor includes a floor front portion, a floor middle portion which extends downward from a rear end of the floor front portion, and a floor rear portion which extends rearward from a lower end of the floor middle portion and is disposed lower than the floor front portion, a lower end of the support leg is connected to the floor rear portion to be pivotable about the first axis which extends laterally, the first coupling part is provided on the floor middle portion, and a large part of the seat cushion is disposed above the floor rear portion when in the stowed position and is disposed above the floor front portion when in the first use position.

4. The vehicle seat according to claim 3, wherein the second coupling part is provided on a rear end part of the floor front portion or an upper end part of the floor middle portion.

5. The vehicle seat according to claim 4, wherein the seat cushion includes a base member connected to the support leg and an upper member supported on the base member, and the second coupling device is movable in a front-rear direction relative to the base member.

6. The vehicle seat according to claim 5, wherein the upper member is supported on the base member via a slide device to be movable in the front-rear direction, and the second coupling device is provided on the upper member.

7. The vehicle seat according to claim 5 or 6, wherein the second coupling device is configured to be coupled with the second coupling part when the second coupling device is in a predetermined coupling position with respect to the base member and the seat cushion is in the second use position, and the second coupling device is configured not to be coupled with the second coupling part when the second coupling device is not in the coupling position and the seat cushion is in the second use position.

8. The vehicle seat according to claim 3, wherein when the seat cushion is in the stowed position, an upper surface of the seat cushion is positioned lower than an upper surface of the floor front portion, and when the seat cushion is in the second use position, the upper surface of the seat cushion is positioned higher than the upper surface of the floor front portion.

* * * * *